US012029951B2

(12) United States Patent
Rouzier et al.

(10) Patent No.: US 12,029,951 B2
(45) Date of Patent: Jul. 9, 2024

(54) HOCKEY STICK AND BLADE FOR HOCKEY STICK

(71) Applicant: Bauer Hockey LTD, Blainville (CA)

(72) Inventors: Edouard Rouzier, Montreal (CA); Martin Chambert, Piedmont (CA)

(73) Assignee: Bauer Hockey, LLC, Exeter, NH (US)

(*) Notice: Subject to any disclaimer, the term of this patent is extended or adjusted under 35 U.S.C. 154(b) by 0 days.

(21) Appl. No.: 16/830,896

(22) Filed: Mar. 26, 2020

(65) Prior Publication Data
US 2020/0222772 A1 Jul. 16, 2020

Related U.S. Application Data

(63) Continuation-in-part of application No. 16/220,893, filed on Dec. 14, 2018, which is a (Continued)

(51) Int. Cl.
*A63B 59/70* (2015.01)
*A63B 102/22* (2015.01)
(Continued)

(52) U.S. Cl.
CPC ............ *A63B 59/70* (2015.10); *B29C 70/347* (2013.01); *B33Y 10/00* (2014.12); *B33Y 80/00* (2014.12);
(Continued)

(58) Field of Classification Search
CPC . A63B 59/70; A63B 2102/24; A63B 2209/02; A63B 60/52; A63B 59/55; A63B 69/0024; A63B 69/0026
See application file for complete search history.

(56) References Cited

U.S. PATENT DOCUMENTS 2,472,312 A * 6/1949 Parrish ............... A63B 53/0487
473/341
2,652,256 A * 9/1953 Thomas ............... A63B 53/047
473/333
(Continued)

FOREIGN PATENT DOCUMENTS

AU 197945680 10/1979
BE 901416 A2 4/1985
(Continued)

OTHER PUBLICATIONS

ISR in PCT/US19/65908 dtd Apr. 14, 2020.
(Continued)

*Primary Examiner* — Melba Bumgarner
*Assistant Examiner* — Amir A Klayman
(74) *Attorney, Agent, or Firm* — Banner & Witcoff, Ltd.

(57) ABSTRACT

A hockey stick apparatus may include a molded blade structure coupled to the proximal end of a hollow shaft structure. The molded blade structure can include: a top edge spaced apart from a bottom edge by a blade height, a heel spaced apart from a toe by a blade length, a front face spaced apart from a back face, and an optional slot defining an aperture extending through front face and the back face. A stiffness of the blade may vary along the blade height by changing the shape of the blade and changing a quadratic momentum of the cross-section along the blade height.

20 Claims, 45 Drawing Sheets

Related U.S. Application Data continuation-in-part of application No. 15/842,033, filed on Dec. 14, 2017, now Pat. No. 10,456,640.

(51) Int. Cl.
  *A63B 102/24* (2015.01)
  *B29C 70/34* (2006.01)
  *B29L 31/52* (2006.01)
  *B33Y 10/00* (2015.01)
  *B33Y 80/00* (2015.01)

(52) U.S. Cl.
  CPC ....... *A63B 2102/22* (2015.10); *A63B 2102/24* (2015.10); *A63B 2209/023* (2013.01); *B29K 2995/0082* (2013.01); *B29L 2031/52* (2013.01)

(56) References Cited

U.S. PATENT DOCUMENTS

| | | | |
|---|---|---|---|
| 2,774,596 A * | 12/1956 | Bredenberg | A63B 60/52 473/561 |
| 2,932,515 A * | 4/1960 | May | F16B 5/06 473/248 |
| 3,003,768 A * | 10/1961 | Clements | A63B 60/52 473/328 |
| D206,234 S | 11/1966 | Sasse | |
| 3,294,887 A * | 12/1966 | Altermatt | H01B 3/48 264/266 |
| 3,377,065 A * | 4/1968 | White, Sr. | A63B 59/70 473/328 |
| 3,489,412 A | 1/1970 | Franck et al. | |
| 3,561,760 A | 2/1971 | Klay | |
| 3,720,410 A * | 3/1973 | Saytar | A63B 59/70 473/562 |
| D237,514 S | 11/1975 | Miller | |
| D237,636 S | 11/1975 | Leclerc | |
| 3,982,760 A | 9/1976 | Tiitola | |
| 3,997,171 A | 12/1976 | Currie | |
| 4,013,288 A | 3/1977 | Goverde | |
| D244,219 S | 5/1977 | Poirier | |
| D244,220 S | 5/1977 | De brey | |
| 4,116,440 A | 9/1978 | Takeshima | |
| 4,124,208 A | 11/1978 | Burns | |
| 4,128,240 A * | 12/1978 | Berokoff | A63B 60/10 473/551 |
| 4,291,876 A * | 9/1981 | Hasegawa | A63B 60/00 473/535 |
| 4,343,468 A | 8/1982 | Lindgren | |
| 4,369,970 A * | 1/1983 | Salminen | A63B 59/70 473/561 |
| 4,398,965 A | 8/1983 | Campau | |
| 4,470,599 A | 9/1984 | Usher, Jr. | |
| 4,488,721 A | 12/1984 | Franck et al. | |
| 4,491,320 A | 1/1985 | Smith | |
| 4,504,344 A * | 3/1985 | Helle | A63B 60/50 156/185 |
| 4,575,447 A | 3/1986 | Hariguchi | |
| 4,591,155 A * | 5/1986 | Adachi | A63B 59/70 473/561 |
| 4,629,191 A | 12/1986 | Mancuso | |
| 4,697,814 A * | 10/1987 | Yamada | A63B 53/047 473/348 |
| 4,736,951 A | 4/1988 | Grant | |
| 4,798,383 A * | 1/1989 | Nagasaki | A63B 60/00 473/348 |
| 4,883,623 A * | 11/1989 | Nagamoto | B29C 70/14 264/108 |
| 4,964,192 A | 10/1990 | Marui | |
| 4,988,104 A | 1/1991 | Shiotani et al. | |
| 5,016,883 A | 5/1991 | Kobayashi | |
| 5,127,649 A | 7/1992 | Carbonero | |
| 5,160,135 A * | 11/1992 | Hasegawa | A63B 59/70 473/561 |
| 5,217,380 A | 6/1993 | Martinet | |
| D344,559 S | 2/1994 | Ilacqua et al. | |
| 5,306,003 A | 4/1994 | Pagotto | |
| 5,407,195 A | 4/1995 | Tiitola et al. | |
| 5,411,264 A * | 5/1995 | Oku | A63B 53/04 473/332 |
| D360,443 S | 7/1995 | Berghash | |
| 5,429,352 A | 7/1995 | Leclerc | |
| D363,326 S | 10/1995 | LeClerc | |
| 5,460,372 A | 10/1995 | Cook | |
| 5,467,983 A * | 11/1995 | Chen | A63B 53/0466 473/346 |
| 5,499,814 A | 3/1996 | Lu | |
| 5,511,776 A | 4/1996 | Huru | |
| 5,575,724 A | 11/1996 | Hannon et al. | |
| 5,577,725 A | 11/1996 | Pagotto et al. | |
| 5,607,154 A | 3/1997 | Meumann et al. | |
| 5,632,481 A * | 5/1997 | Unger | A63B 59/70 473/563 |
| 5,672,120 A * | 9/1997 | Ramirez | A63B 53/047 473/347 |
| 5,720,388 A | 2/1998 | King et al. | |
| 5,728,016 A * | 3/1998 | Hsu | A63B 59/70 473/563 |
| 5,810,684 A | 9/1998 | Ohman | |
| 5,816,962 A | 10/1998 | Etersque | |
| 5,827,141 A * | 10/1998 | Lukey | B63H 16/04 473/563 |
| 5,863,268 A | 1/1999 | Birch | |
| D418,182 S | 12/1999 | Krist | |
| D421,782 S | 3/2000 | Ryu | |
| 6,033,326 A | 3/2000 | Lee | |
| 6,062,996 A * | 5/2000 | Quigley | A63B 59/70 473/563 |
| D430,249 S | 8/2000 | Burger | |
| D431,273 S | 9/2000 | Burger | |
| D432,610 S | 10/2000 | Barila | |
| 6,129,962 A | 10/2000 | Quigley et al. | |
| 6,183,384 B1 | 2/2001 | Roberto | |
| 6,257,997 B1 * | 7/2001 | Doble | A01K 87/00 473/524 |
| 6,267,697 B1 | 7/2001 | Sulenta | |
| 6,348,013 B1 | 2/2002 | Kosmatka | |
| 6,355,339 B1 * | 3/2002 | Sherwood | B29C 44/1209 264/46.7 |
| 6,379,264 B1 | 4/2002 | Forzano | |
| D458,329 S | 6/2002 | Clark, Jr. et al. | |
| D476,049 S | 6/2003 | Sultenta | |
| D484,555 S | 12/2003 | Bellefleur et al. | |
| 6,817,957 B2 | 11/2004 | Flaum et al. | |
| 6,820,654 B2 | 11/2004 | Lindsay | |
| D504,166 S | 4/2005 | Bellefleur et al. | |
| D504,929 S | 5/2005 | Bellefleur et al. | |
| 6,939,257 B2 * | 9/2005 | Tiitola | A63B 60/08 473/561 |
| 6,953,405 B2 | 10/2005 | LeMire et al. | |
| 6,955,619 B1 | 10/2005 | Schutz et al. | |
| 7,008,338 B2 | 3/2006 | Pearson | |
| 7,008,687 B2 | 3/2006 | Wang | |
| 7,043,868 B2 | 5/2006 | Ahn | |
| 7,044,869 B2 * | 5/2006 | Mauser | A63B 49/028 473/524 |
| 7,044,870 B2 | 5/2006 | Pagotto | |
| 7,125,352 B2 * | 10/2006 | Gagnon | D04C 1/06 473/563 |
| D534,227 S | 12/2006 | Lee | |
| 7,144,343 B2 * | 12/2006 | Goldsmith | A63B 59/70 473/562 |
| 7,201,678 B2 | 4/2007 | Filice et al. | |
| D544,932 S | 6/2007 | Scott | |
| 7,285,063 B2 | 10/2007 | Ussier et al. | |
| 7,294,072 B2 | 11/2007 | Montecchia | |
| 7,303,487 B2 | 12/2007 | Kumamoto | |
| 7,326,136 B2 * | 2/2008 | Jean | B29C 70/086 473/563 |
| 7,331,876 B2 | 2/2008 | Klein | |
| D565,140 S | 3/2008 | Appleton et al. | |
| 7,404,775 B2 | 7/2008 | Morrow et al. | |
| D581,474 S | 11/2008 | Dickie et al. | |

(56) References Cited

U.S. PATENT DOCUMENTS

| | | |
|---|---|---|
| D581,475 S | 11/2008 | Dickie et al. |
| D589,099 S | 3/2009 | Purnell |
| D589,101 S | 3/2009 | Dickie et al. |
| D589,102 S | 3/2009 | Dickie et al. |
| 7,530,901 B2 | 5/2009 | Imamoto et al. |
| D594,516 S | 6/2009 | Giblin |
| D594,920 S | 6/2009 | Drouin et al. |
| D595,368 S | 6/2009 | Drouin et al. |
| D595,792 S | 7/2009 | Drouin et al. |
| 7,584,571 B2 | 9/2009 | Ryan |
| 7,614,969 B2 | 11/2009 | Meyer et al. |
| 7,651,418 B2 | 1/2010 | Appleton et al. |
| D610,641 S | 2/2010 | Solin |
| 7,867,105 B2 | 1/2011 | Moon |
| 7,914,403 B2 | 3/2011 | Ie |
| 7,931,549 B2 | 4/2011 | Pearson et al. |
| D654,129 S | 2/2012 | Garcia et al. |
| D688,342 S | 8/2013 | Tucker, Jr. et al. |
| 8,608,597 B2 | 12/2013 | Avnery et al. |
| 9,039,549 B2 | 5/2015 | Villar et al. |
| 9,044,657 B2 | 6/2015 | Jeanneau |
| 9,248,356 B2 * | 2/2016 | Pearson ............. A63B 60/00 |
| D752,167 S | 3/2016 | Chorne |
| 9,283,454 B2 | 3/2016 | Bond |
| D770,581 S | 11/2016 | Gosselin |
| D775,289 S | 12/2016 | Crouchen |
| 9,573,031 B2 | 2/2017 | Xun et al. |
| 9,630,080 B1 | 4/2017 | Lanyi |
| D792,930 S | 7/2017 | Lacey |
| 9,718,119 B2 * | 8/2017 | Zimmerman ....... A63B 53/047 |
| 9,757,631 B2 | 9/2017 | Acey et al. |
| D808,480 S | 1/2018 | Plug |
| D808,481 S | 1/2018 | Plug |
| 9,914,027 B1 | 3/2018 | Harbert et al. |
| 9,993,707 B2 | 6/2018 | Davis |
| 10,137,344 B2 | 11/2018 | Lacey et al. |
| D836,174 S | 12/2018 | Plug |
| D837,318 S | 1/2019 | Rouzier |
| D839,373 S | 1/2019 | Plug |
| D842,404 S | 3/2019 | Chambert |
| D842,405 S | 3/2019 | Chambert |
| D842,953 S | 3/2019 | Chambert |
| D844,726 S | 4/2019 | Rouzier |
| D845,410 S | 4/2019 | Rouzier |
| D845,416 S | 4/2019 | Rouzier |
| 10,398,921 B1 * | 9/2019 | Walsh ................. A63B 59/70 |
| 10,456,640 B2 | 10/2019 | Rouzier et al. |
| D900,263 S | 10/2020 | Rouzier |
| 2001/0041633 A1 * | 11/2001 | Tiitola .................. A63B 59/70 |
| | | 473/560 |
| 2001/0046909 A1 * | 11/2001 | Pagotto ................ A63B 59/70 |
| | | 473/563 |
| 2003/0004019 A1 | 1/2003 | Lussier et al. |
| 2003/0100390 A1 | 5/2003 | Bellefleur et al. |
| 2004/0043181 A1 * | 3/2004 | Sherwood ............ B32B 5/26 |
| | | 428/71 |
| 2004/0058758 A1 | 3/2004 | Kohler et al. |
| 2004/0087395 A1 | 5/2004 | Manory |
| 2004/0092330 A1 | 5/2004 | Meyer et al. |
| 2004/0157680 A1 | 8/2004 | Chen |
| 2004/0176181 A1 * | 9/2004 | Meyer .................. A63B 60/00 |
| | | 473/345 |
| 2004/0266550 A1 * | 12/2004 | Gilbert ............... A63B 53/047 |
| | | 473/345 |
| 2005/0043117 A1 * | 2/2005 | Gilbert ................. A63B 60/02 |
| | | 473/345 |
| 2005/0090339 A1 | 4/2005 | Gans et al. |
| 2005/0130759 A1 | 6/2005 | Hayden et al. |
| 2005/0164814 A1 * | 7/2005 | Tucker, Sr. ............. A63B 59/70 |
| | | 473/560 |
| 2005/0176529 A1 | 8/2005 | Frischmon et al. |
| 2005/0187046 A1 | 8/2005 | Kavanaugh |
| 2005/0215364 A1 | 9/2005 | Lussier et al. |
| 2005/0263417 A1 | 12/2005 | Pineiro et al. |
| 2006/0046866 A1 | 3/2006 | Rigoli |
| 2006/0089215 A1 * | 4/2006 | Jean .................... B29C 70/865 |
| | | 473/560 |
| 2007/0062630 A1 * | 3/2007 | Wilbur .................. B29C 73/04 |
| | | 156/94 |
| 2007/0281809 A1 | 12/2007 | Garcia |
| 2008/0026882 A1 | 1/2008 | Main |
| 2008/0197543 A1 * | 8/2008 | Davis .................. B29C 70/545 |
| | | 264/516 |
| 2008/0318714 A1 | 12/2008 | Kotula et al. |
| 2009/0005198 A1 | 1/2009 | Shiu |
| 2009/0149283 A1 * | 6/2009 | Garcia .................. A63B 59/70 |
| | | 473/563 |
| 2010/0035708 A1 | 2/2010 | Ie |
| 2011/0028250 A1 | 2/2011 | Pearson et al. |
| 2011/0237363 A1 | 9/2011 | Chang |
| 2012/0046136 A1 * | 2/2012 | Allen .................... A63B 60/08 |
| | | 473/563 |
| 2012/0058843 A1 | 3/2012 | Neufeld |
| 2012/0070301 A1 | 3/2012 | Gans |
| 2012/0190473 A1 | 7/2012 | Swist |
| 2012/0193021 A1 | 8/2012 | Botten et al. |
| 2012/0283054 A1 * | 11/2012 | Jeanneau ............. A63B 59/70 |
| | | 473/563 |
| 2013/0065714 A1 * | 3/2013 | Avnery ................ B29C 70/543 |
| | | 473/561 |
| 2013/0109503 A1 * | 5/2013 | Matsunaga ........... A63B 53/00 |
| | | 473/346 |
| 2013/0116070 A1 * | 5/2013 | Xun .................... B29C 70/682 |
| | | 473/561 |
| 2013/0172135 A1 * | 7/2013 | Jeanneau ............. A63B 59/70 |
| | | 473/561 |
| 2013/0237348 A1 | 9/2013 | West |
| 2014/0194231 A1 * | 7/2014 | Gans .................... B29C 70/78 |
| | | 473/563 |
| 2015/0018136 A1 | 1/2015 | Goldstein et al. |
| 2015/0038272 A1 * | 2/2015 | Davis .................. A63B 60/00 |
| | | 264/46.4 |
| 2015/0045154 A1 * | 2/2015 | Pearson ............. A63B 60/00 |
| | | 473/563 |
| 2015/0108681 A1 | 4/2015 | Deshmukh et al. |
| 2015/0126311 A1 | 5/2015 | Davis |
| 2015/0133244 A1 * | 5/2015 | Davis .................. A63B 60/00 |
| | | 473/563 |
| 2015/0196817 A1 * | 7/2015 | Garcia .................. A63B 59/70 |
| | | 473/563 |
| 2015/0246274 A1 * | 9/2015 | Xun .................... B29C 70/865 |
| | | 473/561 |
| 2015/0343281 A1 * | 12/2015 | Ban .................... A63B 60/52 |
| | | 473/332 |
| 2016/0236050 A1 | 8/2016 | Allard et al. |
| 2016/0303445 A1 * | 10/2016 | Mollner .............. A63B 59/70 |
| 2017/0003607 A1 | 1/2017 | Fujii |
| 2017/0036075 A1 | 2/2017 | Vrska, Jr. et al. |
| 2017/0052007 A1 | 2/2017 | Syverson et al. |
| 2017/0136718 A1 * | 5/2017 | Chang ................. B29C 70/745 |
| 2017/0246519 A1 | 8/2017 | Lacey et al. |
| 2017/0282025 A1 | 10/2017 | Petersen et al. |
| 2017/0282030 A1 * | 10/2017 | Foortse .............. A63B 60/50 |
| 2018/0185722 A1 * | 7/2018 | Miceli ............... B29C 33/30 |
| 2018/0200592 A1 | 7/2018 | Sinn |
| 2018/0333622 A1 * | 11/2018 | Plante ................ A63B 59/70 |
| 2019/0269986 A1 | 9/2019 | Mazursky et al. |
| 2020/0222772 A1 | 7/2020 | Rouzier et al. |
| 2021/0077865 A1 * | 3/2021 | Morales ............. A63B 53/04 |
| 2021/0252356 A1 * | 8/2021 | Thurman ............ A63B 59/42 |
| 2022/0161109 A1 | 5/2022 | Plante et al. |
| 2023/0181977 A1 | 6/2023 | Saito |

FOREIGN PATENT DOCUMENTS

| | | |
|---|---|---|
| CA | 72858 A | 8/1901 |
| CA | 73410 A | 10/1901 |
| CA | 933965 A | 9/1973 |
| CA | 1151693 A | 8/1983 |
| CA | 2071859 A1 | 6/1991 |
| CA | 2106178 A1 | 3/1995 |

(56) References Cited

FOREIGN PATENT DOCUMENTS

| | | | |
|---|---|---|---|
| CA | 2244610 | A1 | 2/1999 |
| CA | 2506213 | A1 | 11/2005 |
| CA | 2592784 | A1 | 12/2008 |
| CA | 2674172 | C | 2/2014 |
| CA | 2793353 | A1 | 4/2014 |
| CA | 2954993 | A1 | 1/2016 |
| CN | 201049183 | Y | 4/2008 |
| EM | 000639182-0001 | | 1/2007 |
| EM | 000639182-0003 | | 1/2007 |
| EM | 000821046-0001 | | 4/2008 |
| EP | 2133125 | A1 | 12/2009 |
| EP | 2628509 | A1 | 8/2013 |
| EP | 3012094 | A1 | 4/2016 |
| EP | 3056250 | A1 | 8/2016 |
| EP | 3894196 | A1 | 10/2021 |
| GB | 611028 | A | 10/1948 |
| GB | 1383949 | A | 2/1974 |
| SE | 522083 | C2 | 1/2004 |
| SU | 1750709 | A1 | 7/1992 |
| WO | 0234341 | A1 | 5/2002 |
| WO | 08054281 | A1 | 5/2008 |
| WO | 2017052675 | A1 | 3/2017 |

OTHER PUBLICATIONS

Nov. 22, 2019—(CA) Examiner's Report 3027838.
Nov. 24, 2021—(CA) Examiner's Report—App. No. 3077236.
https://www.bestech.com.au/wp-content/upl;oads/Modulus-of-Elasticity.pdf.
Sep. 28, 2022—(CA) Examiner's Report—App. No. 3,123,220.
Mar. 23, 2023—(CA) Examiner's Report—App. No. 3,123,220.
Nov. 20, 2023—(CA) Examiner's Report—App. No. 3,157,049.
Nov. 17, 2023—(CA) Examiner's Report—App. No. 3,104,485.

\* cited by examiner

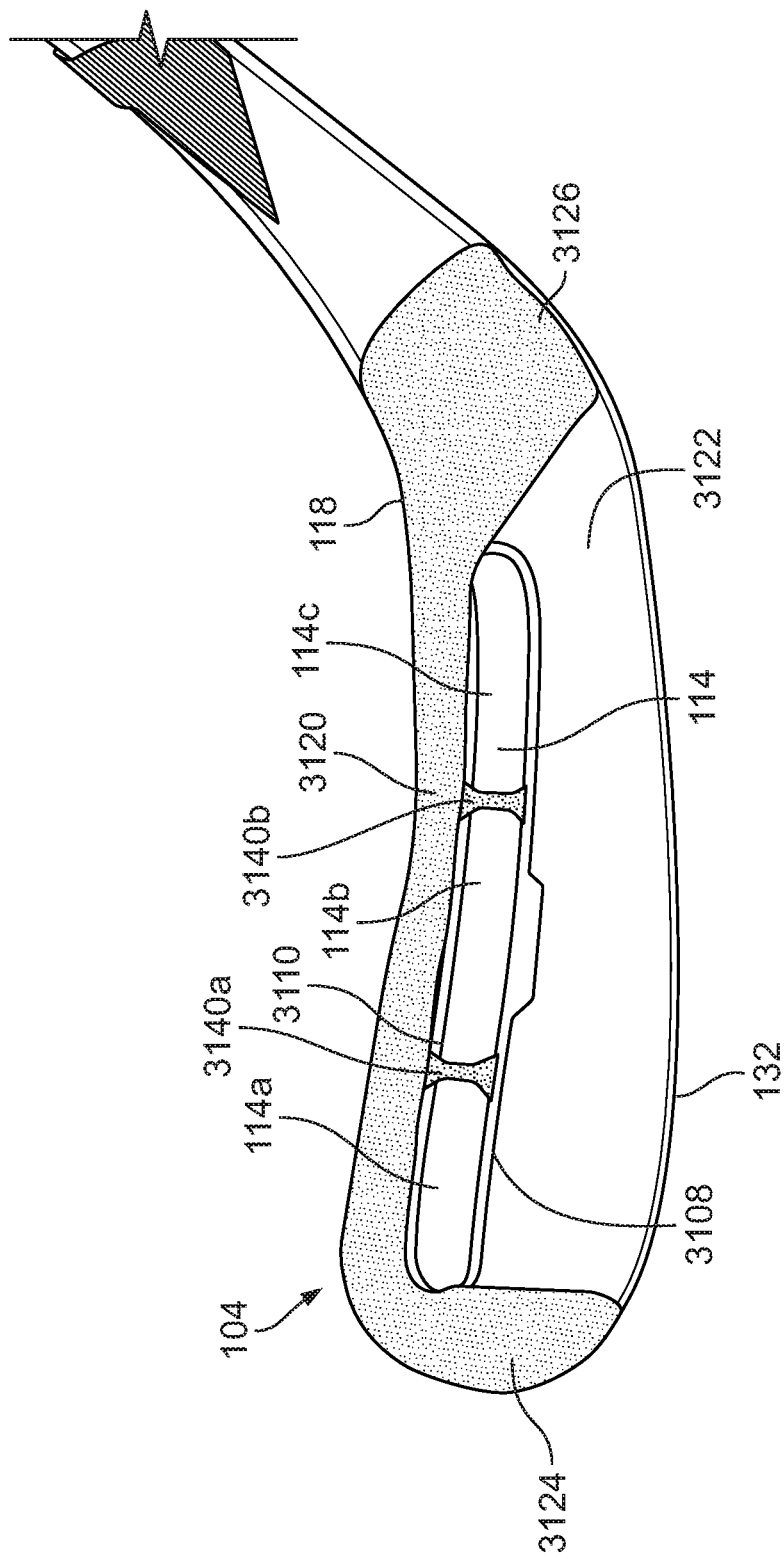

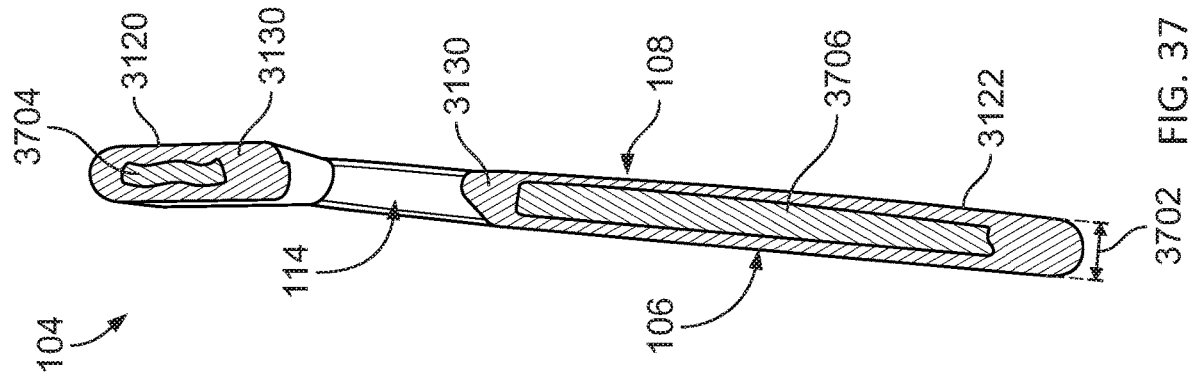
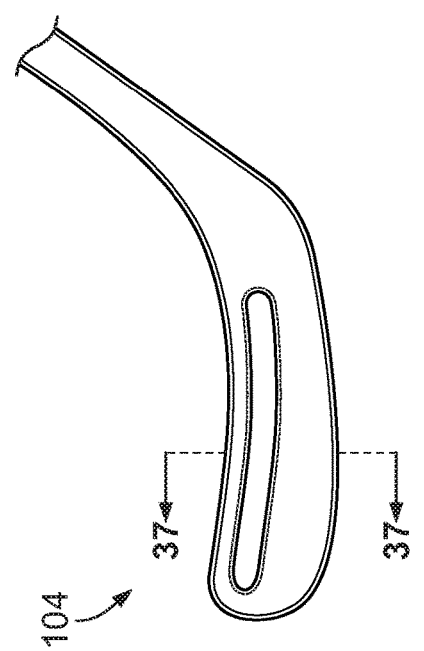

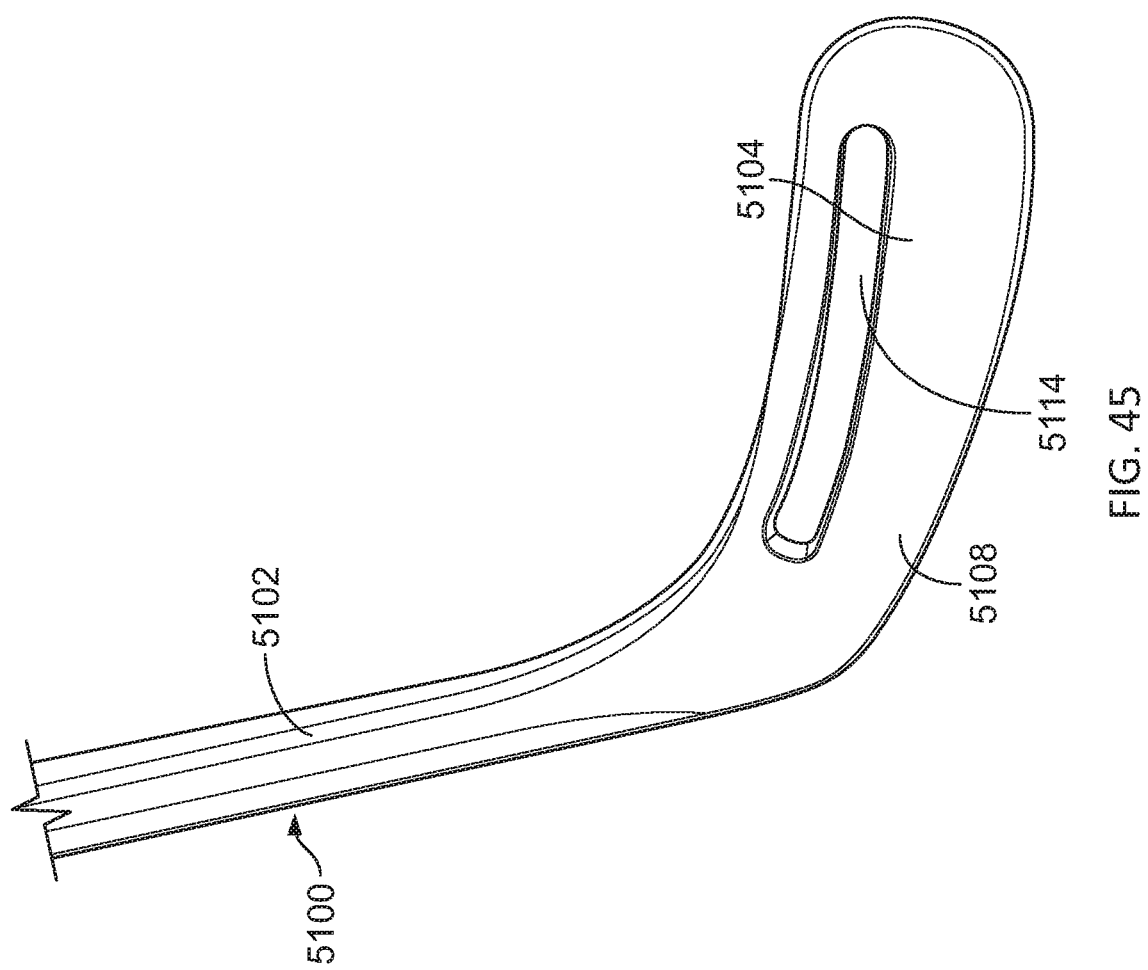

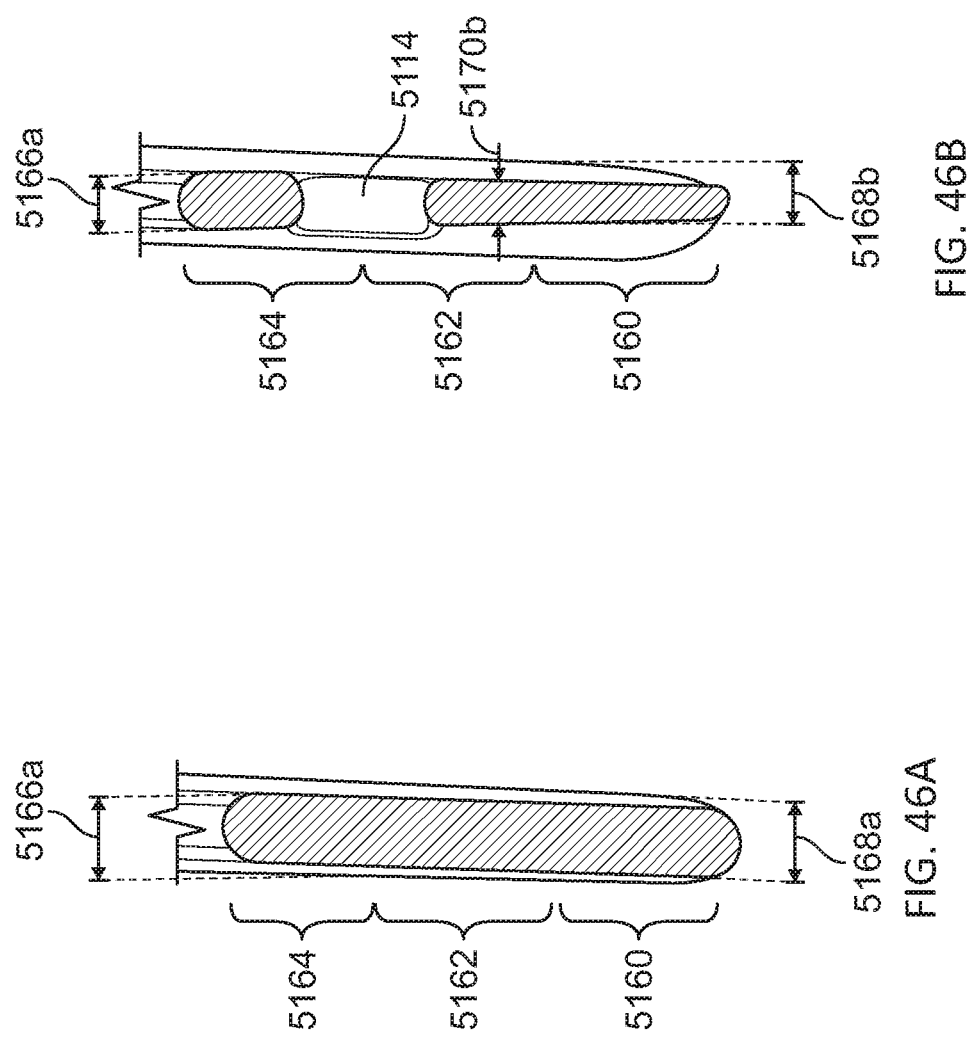

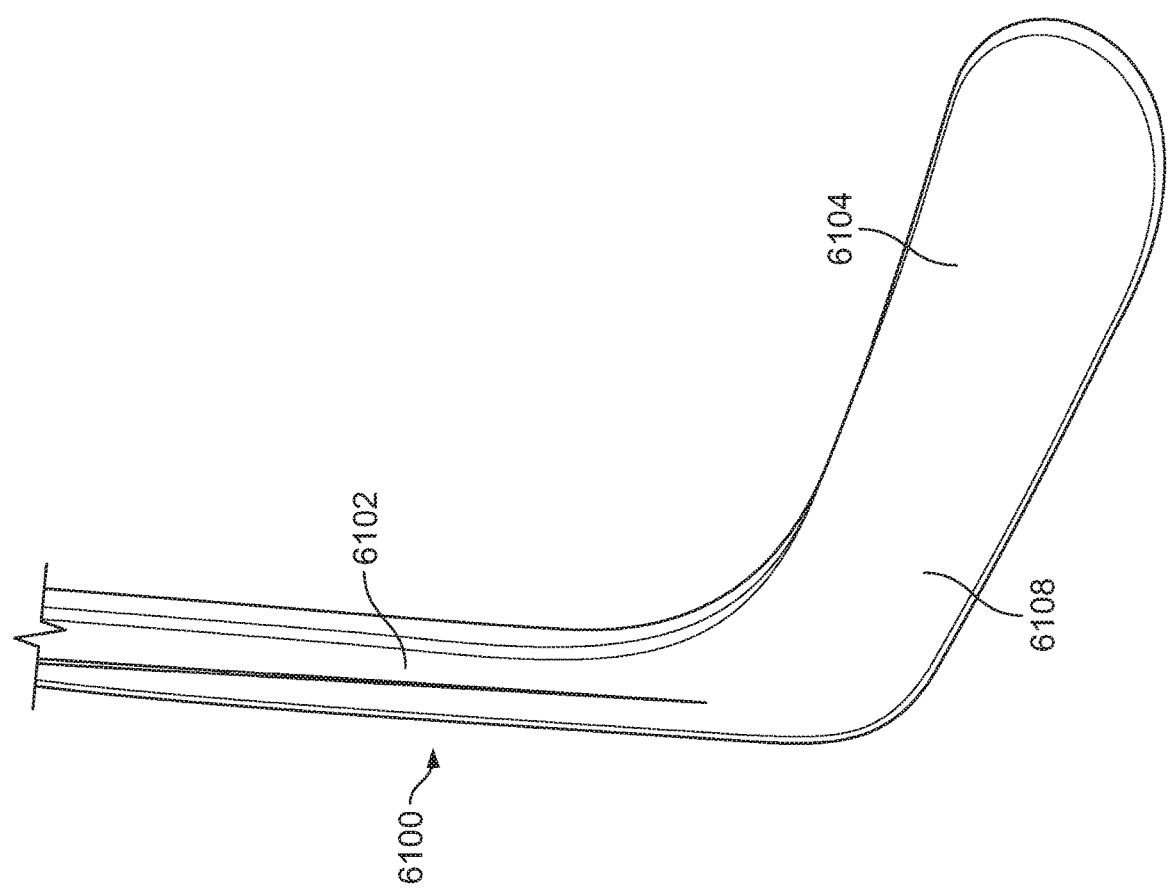

HOCKEY STICK AND BLADE FOR HOCKEY STICK

CROSS-REFERENCE TO RELATED APPLICATIONS

This application is a continuation-in-part of U.S. patent application Ser. No. 16/220,893 filed Feb. 26, 2019, which is a continuation-in-part of U.S. patent application Ser. No. 15/842,033, filed Dec. 14, 2017, both of which are incorporated herein by reference in their entirety for any and all non-limiting purposes.

FIELD

This disclosure relates generally to fabrication of molded structures. More particularly, aspects of this disclosure relate to molded hockey shafts having non-uniform cross-sectional geometries along the shaft length, as well as hockey stick blades molded from foam and wrapped with one or more layers of tape.

BACKGROUND

Hockey stick shafts may be constructed from one or more layers of synthetic materials, such as fiberglass, carbon fiber or Aramid. Aspects of this disclosure relate to improved methods for production of a hockey stick shaft with increased bending stiffness and/or decreased mass.

SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Aspects of the disclosure herein may relate to fabrication of a formed hockey stick structure. In one example, the formed hockey stick structure may include shaft that has a variable cross-sectional geometry. A method of fabricating a formed hockey stick structure that has variable shaft geometry may include forming a shaft structure. The formation of the shaft structure may include wrapping a mandrel with fiber tape to form a wrapped shaft structure, removing the mandrel from the wrapped shaft structure to form an internal shaft cavity, and inserting an inflatable bladder into the shaft cavity. The wrapped shaft structure may be positioned within a mold, and the mold may be heated and the bladder may be expanded within the cavity to exert an internal pressure on the cavity to urge the fiber tape toward the walls of the mold. The mold may be cooled and the bladder contracted and removed. The method of fabricating a formed hockey stick structure may additionally include forming a hockey stick blade structure, and coupling the shaft structure to the blade structure. The walls of the mold may impart an outer geometry on the shaft structure that includes a portion having a cross-sectional geometry with at least five sides along a length of the shaft structure.

BRIEF DESCRIPTION OF THE DRAWINGS

The present disclosure is illustrated by way of example and not limited in the accompanying figures in which like reference numerals indicate similar elements and in which:

FIG. 35 schematically depicts an alternative implementation of a hockey stick blade structure, according to one or more aspects described herein.

FIG. 36 depicts a hockey stick blade structure with a schematic cutting plane, according to one or more aspects described herein.

FIG. 37 depicts a cross-sectional view of a hockey stick blade structure, according to one or more aspects described herein.

FIG. 45 depicts a more detailed view of a back side of the hockey stick blade structure and a portion of the shaft structure of FIG. 1, according to one or more aspects described herein.

FIGS. 46A-46F show various cross-sections of the example hockey stick structure of FIG. 43.

FIG. 50B depicts a more detailed view of a back side of the hockey stick blade structure and a portion of the shaft structure of FIG. 49, according to one or more aspects described herein.

Further, it is to be understood that the drawings may represent the scale of different component of one single embodiment; however, the disclosed embodiments are not limited to that particular scale.

DETAILED DESCRIPTION

In the following description of various example structures, reference is made to the accompanying drawings, which form a part hereof, and in which are shown by way of illustration various embodiments in which aspects of the disclosure may be practiced. Additionally, it is to be understood that other specific arrangements of parts and structures may be utilized, and structural and functional modifications may be made without departing from the scope of the present disclosures. Also, while the terms "top" and "bottom" and the like may be used in this specification to describe various example features and elements, these terms are used herein as a matter of convenience, e.g., based on the example orientations shown in the figures and/or the orientations in typical use. Nothing in this specification should be construed as requiring a specific three-dimensional or spatial orientation of structures in order to fall within the scope of this invention.

Aspects of this disclosure relate to systems and methods for production of a hockey stick structure using variable cross-sectional geometries.

Figure 1:
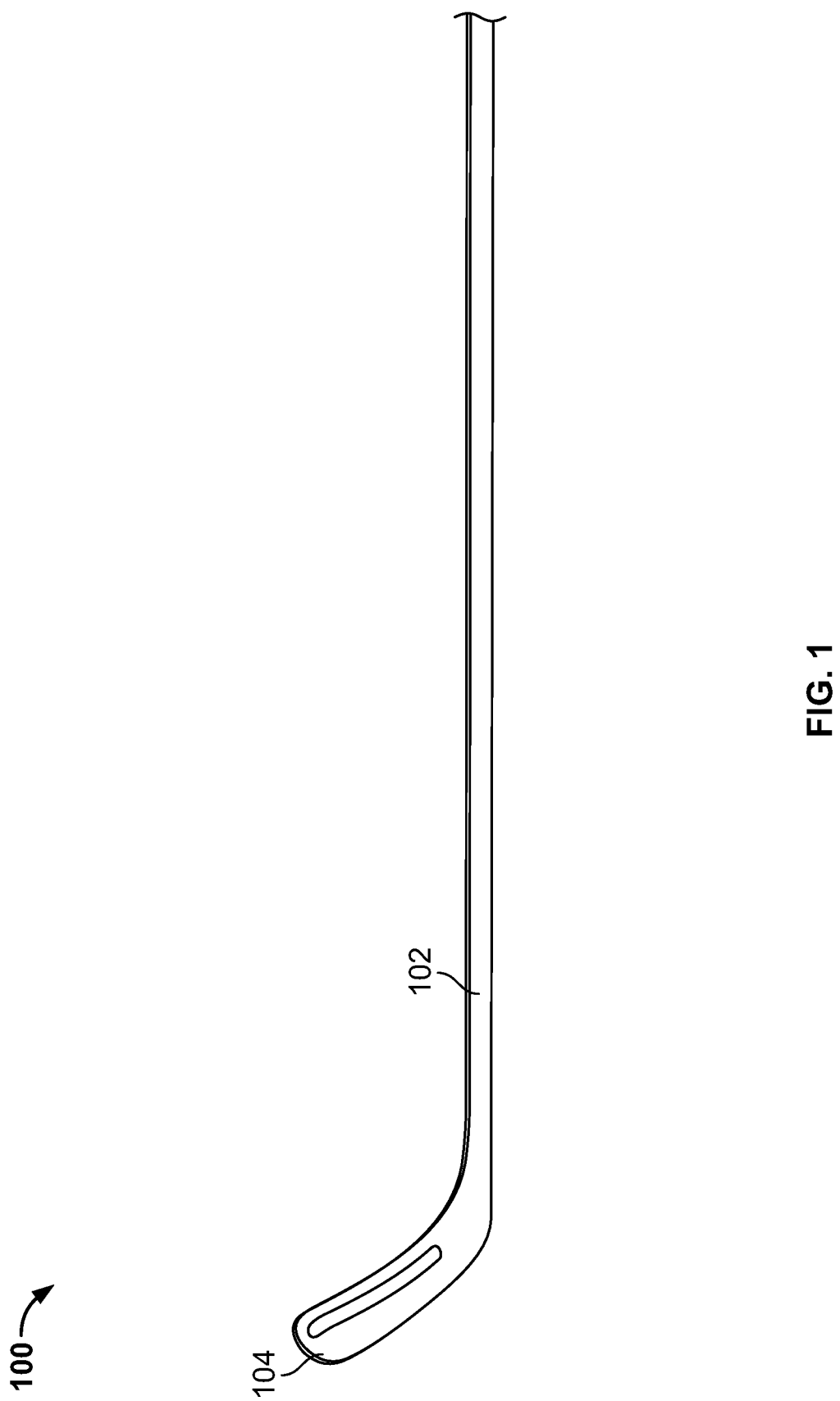
FIG. 1 depicts a front side of a hockey stick structure, according to one or more aspects described herein.

FIG. 1 depicts a front side of a hockey stick structure 100, according to one or more aspects described herein. In one example, the hockey stick structure 100 includes a shaft structure 102 that is rigidly coupled to a blade structure 104. In one example, the shaft structure 102 may include a hollow structure formed from one or more fiber-reinforced materials. For example, the shaft structure 102 may be formed from a carbon fiber material. The shaft structures described throughout this disclosure may use materials in addition to or as an alternative to carbon fiber, including fiberglass, Aramid, and/or other composite or fiber-reinforced materials, among others. It is further contemplated that any of the structures described throughout these disclosures may use one or more materials in a tape form, or formed as discrete elements prior to one or more molding processes. Additionally or alternatively, the tape and/or discrete elements, and may be preimpregnated with resin or another adhesive, or may have resin or another adhesive applied to the tape and/or discrete pieces. In one specific implementation, the shaft structure 102 may be formed from one or more layers of carbon fiber tape that are preimpregnated with resin and heated and cooled in a mold in order to impart the desired geometries of the final shaft structure 102. Additionally, the shaft structure 102 may include one or more internal foam core structures around which the fiber tape is wrapped and molded in order to give the shaft structure 102 its final form. The blade structure 104 may be molded separately to the shaft structure 102, and subsequently rigidly coupled to the shaft structure 102. Alternatively, the blade structure 104 may be co-molded with the shaft structure 102. In another implementation, the blade structure 104 may be removably coupled to the shaft structure 102. As such, the blade structure 104 and the shaft structure 102 may be interchangeable and replaceable.

Figure 2:
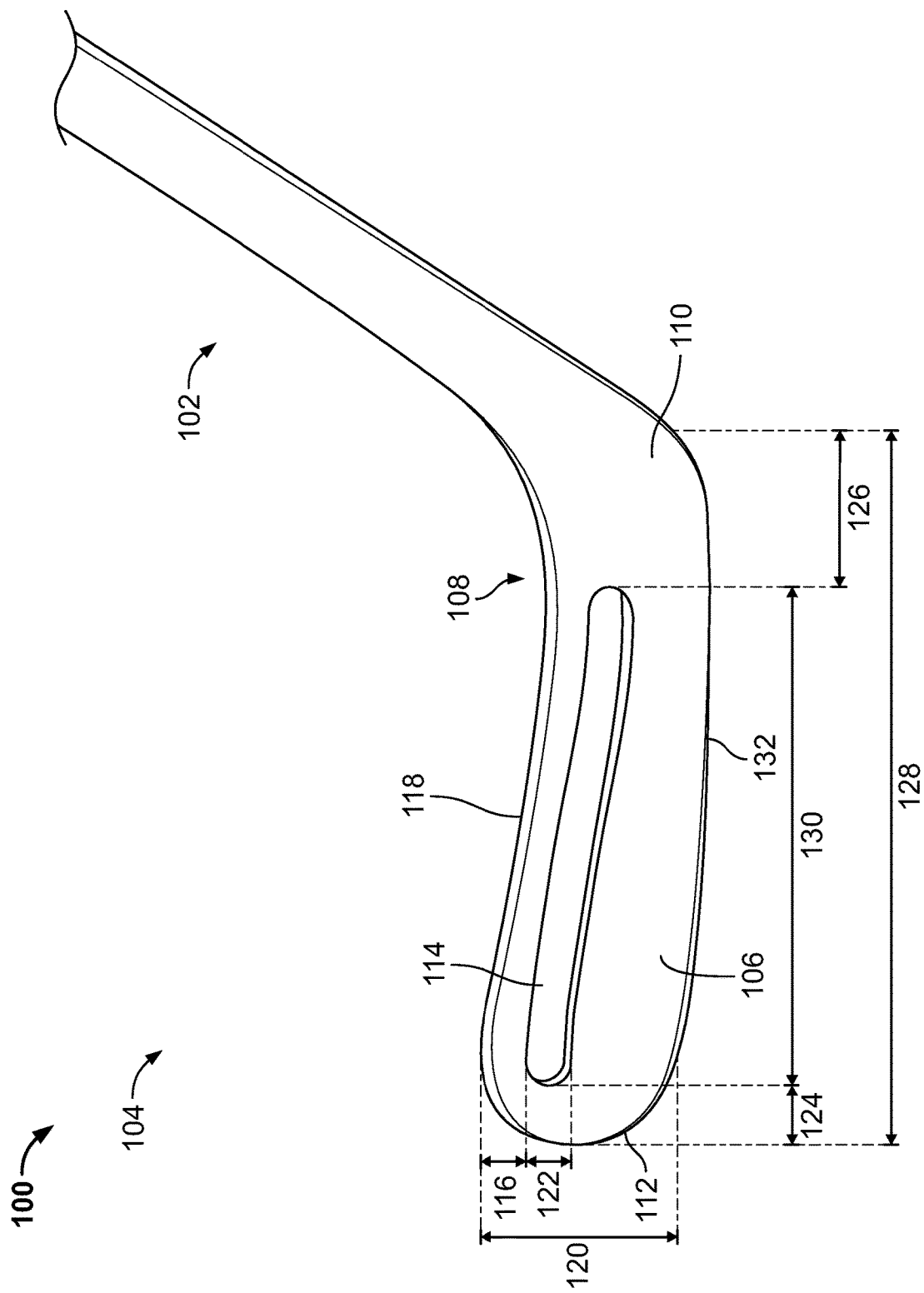
FIG. 2 depicts a more detailed view of a front side of the hockey stick blade structure and a portion of the shaft structure of FIG. 1, according to one or more aspects described herein.
Figure 3:
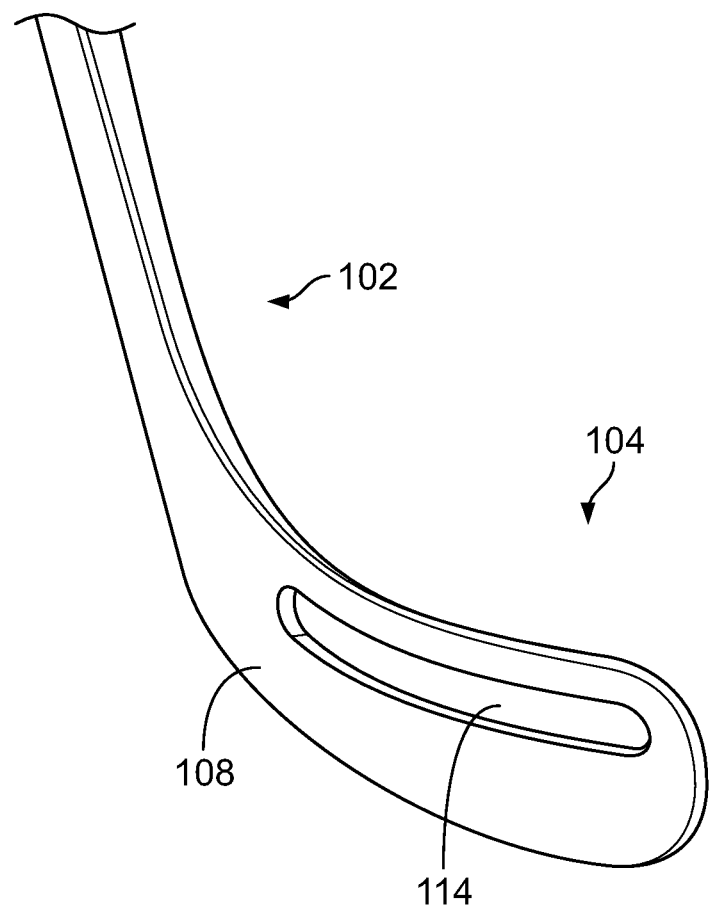
FIG. 3 depicts a more detailed view of a back side of the hockey stick blade structure and a portion of the shaft structure of FIG. 1, according to one or more aspects described herein.

FIG. 2 depicts a more detailed view of a front side of the hockey stick blade structure 104 and a portion of the shaft structure 102, according to one or more aspects described herein. Further, FIG. 3 depicts a more detailed view of a back side of the hockey stick blade structure 104 and a portion of the shaft structure 102, according to one or more aspects described herein. In one example, the blade structure 104 may be formed from one or more layers of fiber reinforced material, similar to the shaft structure 102. In particular, the blade structure 104 may be formed from one or more layers of carbon fiber tape that are preimpregnated with resin, and wrapped around a foam core before being heated and cooled in a mold to form the desired geometries of the final blade structure 104. Additionally, the blade structure 104 may include one or more fiber pins extending through one or more layers of fiber tape and an internal foam core of the blade structure 104 between a front face 106 and a back face 108. Advantageously, the pins, when molded along with the fiber tape of the blade structure 104, may reinforce the blade structure 104.

Additionally, the blade structure 104 may include a slot 114 that extends through the blade from the front face 106 to the back face 108, and extends along a portion of a length of the hockey stick blade structure 104 between a heel side 110 and a toe side 112 of the blade structure 104. In one example, the slot 114 may be positioned at a distance 116 from a top edge 118 of the blade structure 104. In another example, the slot 114 may be substantially parallel to the top edge 118 of the blade structure 104. The distance 116 may range between 10 mm and 20 mm. Additionally or alternatively, distance 116 may be a percentage of an overall blade height 120. For example, distance 116 may be approximately or exactly 10%, 15%, 20%, 25%, 30%, 33%, 35% or 40% of height 120. It is further contemplated, however, that the distance 116 may have any value, without departing from the scope of these disclosures. Similarly, the slot 114 may have a slot height 122. This slot height 122 may range between 2 mm and 20 mm and/or may be a percentage of the overall blade height 120. For example, slot height 122 may be approximately or exactly 1%, 2%, 5%, 10%, 15%, 20%, 25%, 30%, 33%, 35% or 40% of height 120. Further, the slot 114 may be positioned at a distance 124 from the toe side 112 of the blade structure 104, and at a distance 126 from the heel side 110 of the blade structure 104. Distance 124 and distance 126 may range between 15 mm and 80 mm and between 20 mm and 150 mm, respectively, and/or may each be a percentage of an overall blade length 128. As such, the slot 114 may have a length 130 that measures between 70 mm and 270 mm, and/or as a percentage of the overall blade length 128. For example, slot length may be approximately or exactly 30%, 33%, 35% or 40%, 50%, 60%, 70%, 80%, or 90% of length 128. Further, it is contemplated that any of the distances 124, 126, and/or 130 may have any value, without departing from the scope of these disclosures.

Advantageously, the slot 114 may reduce the mass of the blade structure 104. Additionally or alternatively, the slot 114 may allow more material to be added to the blade structure 104 toward the bottom edge 132 prior to molding. As such, the slot 114 may essentially allow the mass in the blade 104 to be shifted toward the bottom edge 132. This additional material may include added layers of fiber tape used prior to molding, and/or one or more inserts being used within the blade structure 104. This additional material/structural elements may increase the hardness, and hence the durability, of the bottom edge 132 of the blade structure 104 and/or the overall strength and stiffness of the blade 104.

Figure 4:
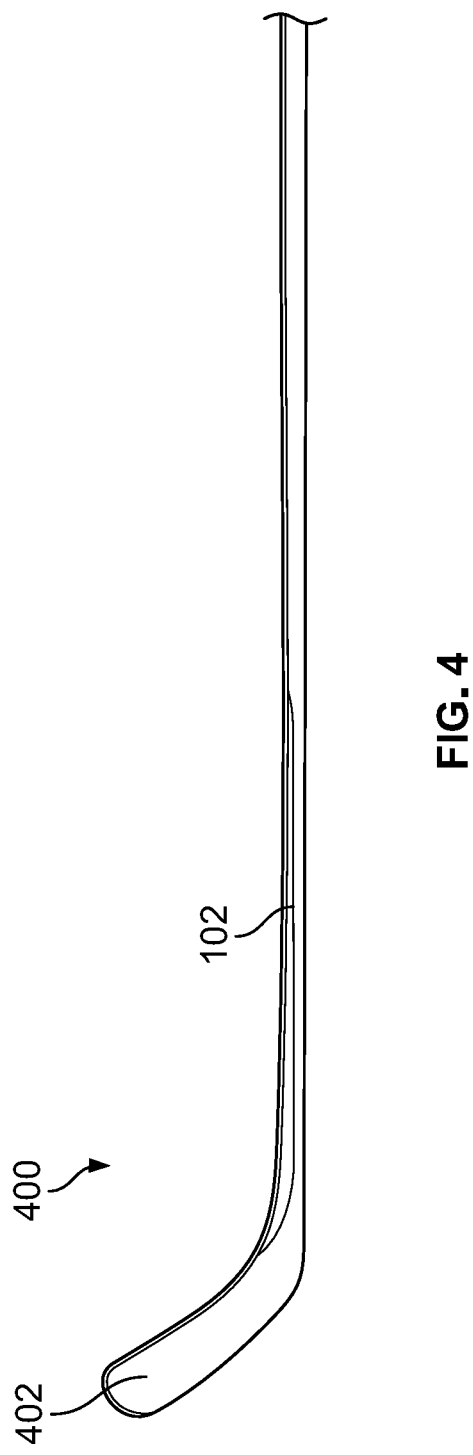
FIG. 4 depicts a front side of a hockey stick structure, according to one or more aspects described herein.

FIG. 4 depicts a front side of a hockey stick structure 400, according to one or more aspects described herein. In one example, the hockey stick structure 400 may include a shaft structure 102 similar to that of a hockey stick structure 100, as previously described. The hockey stick structure 400 may additionally include a blade structure 402 that may be co-molded with the shaft structure 102, or may be formed as a separate structure and rigidly coupled to the shaft structure 102. It is contemplated that the blade structure 402 may be formed using one or more molding processes similar to those of blade structure 104, as described in relation to hockey stick structure 100. Accordingly, the blade structures 104 and 402 may include any hockey blade curve geometries. Additionally, the blade structures 104 and 402 may include pin reinforcement elements that are inserted into a foam core of the blade structures 104 and 402 prior to one or more molding processes. These pin reinforcement elements are described further in U.S. patent application Ser. No. 15/280,603, filed 26 Sep. 2016, the entire contents of which is incorporated herein by reference in its entirety for any and all non-limiting purposes.

In one example, shaft structure 102 may include a variable cross-sectional geometry that is configured to provide a prescribed variable stiffness along the length of the shaft. Advantageously, the variable cross-sectional geometry may allow the hockey stick shaft 102 to be constructed using less material, while still maintaining a desired and high flexural rigidity. In particular, the variable cross-sectional geometry may allow the stick shaft 102 to be constructed using comparatively fewer layers of fiber tape and/or using comparatively fewer or no reinforcement inserts within the hollow core of the stick shaft 102. This decreased amount of material may result in a hockey stick structure 100 and/or 400 having a comparatively reduced mass when compared with a hockey stick constructed using conventional methods.

In another example, the mass of the hockey stick structure 100 and/or 400 may be reduced when compared to a conventional hockey stick structure that includes a shaft having a rectangular cross-sectional geometry. However, the hockey stick structures 100 and/or 400 may use an increased number of lighter fiber layers when compared to a conventional hockey stick structure. In one example, a conventional hockey stick shaft may include 8-13 fiber layers that result in a total mass of a stick being approximately 422 grams. However, the hockey stick structure 100 and/or 400 may use 11-20 layers, but a total mass of a stick may be approximately 376 grams. In certain examples, the mass of hockey stick structures 100 and/or 400 may be reduced by 7-20% relative to conventional hockey stick structures. In other examples, the processes described herein may be used to reduce the mass of a hockey stick by 25-30% or more, when compared to a similar hockey stick constructed using conventional methodologies. In certain examples, the fiber layers used to construct the hockey stick structures 100 and/or 400 may have low densities than fiber layers used in conventional hockey stick structures. As a result, the hockey stick structures 100 and/or 400 may use an increased number of fiber layers, but have a resultant mass that is lower than conventional hockey stick structures due to the comparatively lower material densities. It is contemplated that any material densities may be used for the fiber layers of hockey stick structures 100 and/or 400, without departing from the scope of these disclosures.

Advantageously, an increased number of fiber layers may result in a stronger hockey stick structure since the layers may be oriented relative to one another, such that any mechanical properties (e.g., strength, hardness, stiffness, among others) that are greater along one axis or a limited number of axes of a given layer of fiber tape (e.g., an anisotropic material) may result in an aggregate layered material with increased mechanical properties in multiple directions (in one example this methodology may be used to form a hockey stick structure that tends toward an isotropic material). In other examples, the increased number of fiber layers of the hockey stick structures 100 and/or 400 may be used to impart one or more structural properties in one direction, and one or more different structural properties in a second direction.

In particular, the hockey stick shaft 102 may be considered a beam subject to a bending force during a shooting or passing motion (e.g. a slap shot, wrist shot among others). The flexural rigidity, or "bending stiffness" of a hockey stick shaft includes two components, and is given by the formula:

$$\text{Flexural rigidity} = E \cdot I \qquad \text{(Equation 1)}$$

From Equation 1, E represents a contribution of the material of the hockey stick shaft 102 to the flexural rigidity. E is the Young's Modulus, or elastic modulus, and is a measure of the stiffness of a hockey stick shaft 102. E has SI units of Pascals (Pa).

Also from Equation 1, I represents a contribution of the cross-sectional geometry of the hockey stick shaft 102 to the flexural rigidity. I is the Second Moment of Inertia, or Second Moment of Area, and is a measure of the efficiency of a shape to resist bending. I has SI units of m^4.

With reference to Equation 1, the hockey stick shaft 102 is configured to increase the Second Moment of Area, I, component of the flexural rigidity by using a non-standard cross-sectional geometry. In certain examples, the hockey stick shaft 102 may be configured with a cross-sectional geometry that varies along a length of the shaft 102, and thereby varies the flexural rigidity of the shaft 102 with position along the shaft's length. Advantageously, this may allow the hockey stick shaft 102 to be manufactured with flexing characteristics that are tuned to a specific position type, player type (weight, height, strength, among others) or a specific player (e.g. a specific professional player).

In one example, increasing the Second Moment of Area, I, may allow the Young's Modulus, E, to be decreased, while maintaining a same overall flexural rigidity. In one example, the Young's Modulus, E, may be decreased by reducing an amount of material used to form all or part of the hockey stick shaft 102, and hence, reducing the overall mass of the hockey stick shaft 102.

Figure 5:
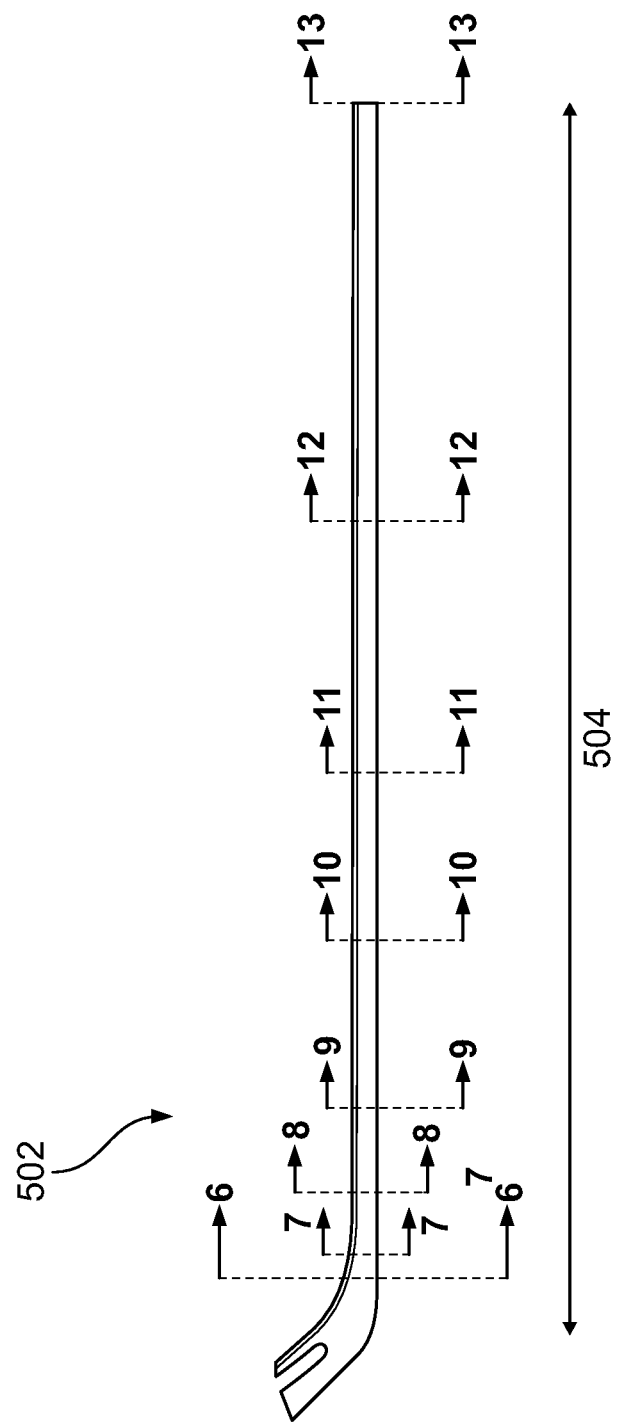
FIG. 5 depicts an example hockey stick shaft, according to one or more aspects described herein.

In one implementation, the Second Moment of Area, I, of the hockey stick shaft 102 may be increased by using a non-rectangular cross-sectional geometry. Specifically, the hockey stick shaft 102 may include portions with pentagonal and/or heptagonal cross-sectional geometries. FIG. 5 schematically depicts an example hockey stick shaft 502, according to one or more aspects described herein. In one implementation, the hockey stick shaft 502 may include one or more portions with pentagonal (5-sided) geometries. It is contemplated that the cross-sectional geometry of hockey stick shaft 502 may vary along the longitudinal length 504. In this regard, multiple cross-sections of the hockey stick shaft 502 are provided in FIGS. 6-13, as described in the following portions of this disclosure. However, FIGS. 6-13 refer to one implementation of variable cross-sectional geometry of hockey stick shaft 502, and it is contemplated that alternative cross-sectional geometries may be used, without departing from the scope of these disclosures. In one example, as described in relation to FIGS. 6-13, the hockey stick shaft 502 may include a first portion with a first cross-sectional geometry and a second portion with a second cross-sectional geometry. The first cross-sectional geometry may be pentagonal in shape, and the second cross-sectional geometry may have another pentagonal cross-sectional geometry, or may be rectangular in shape. It is contemplated that the description of the various geometries used throughout these disclosures may be refer to geometries with rounded edges/corners, such that pentagonal and a rectangular geometries may have respective five and four sides with rounded corners with any radius of curvature. It is further contemplated that the geometries may or may not have two or more sides of equal length. Additionally, it is contemplated that the sides of the various cross-sectional geometries may have inner and/or outer surfaces that are substantially planar, or may be partially uneven, including convex and/or concave geometries.

FIGS. 6-13 include various dimensional values. As such, it is contemplated that these dimensions may be implemented with any values, without departing from the scope of these disclosures. It is further contemplated that the hockey stick shaft 502 may have increased bending stiffness when compared to a conventional shaft that uses rectangular cross sections. This increased bending stiffness may result from non-standard pentagonal geometry, without an increase in Young's modulus, E, resulting from an increased material/shaft wall thickness, and the like. In another example, an increase in bending stiffness may result from a combination of increased second moment of inertia, I, and Young's Modulus, E.

Figure 6:
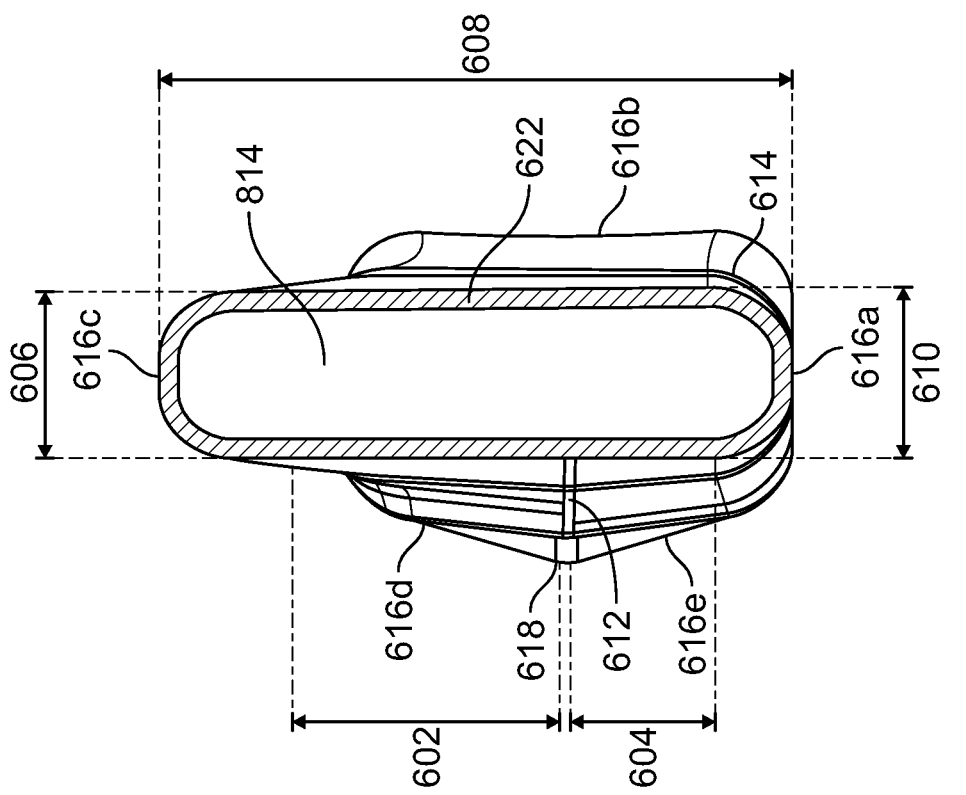

FIG. 6 schematically depicts a cross-sectional view corresponding to arrows 6-6 from FIG. 5, according to one or more aspects described herein. In one example, the cross section of FIG. 6 includes five sides 616a-616e. The cross-section includes an apex 618 formed at the intersection of side 616d and 616e. This apex 618 is positioned on the back of the hockey stick shaft 502, and the side 616b provides a substantially flat surface on the front of the hockey stick shaft 502. The cross-section of FIG. 6 additionally depicts carbon-fiber walls 622 that surround the internal cavity 814. In one specific implementation, the cross-section of FIG. 6 includes the following specific dimensional values, such that length 602 may equal 0.671 inches. In another example, length 602 may range between 0.6 and 0.8 inches, among others. Length 604 may equal 0.362 inches. In another example, length 604 may range between 0.3 and 0.5 inches, among others. Length 610 may equal to 0.458 inches. In another example, length 610 may range between 0.4 and 0.6 inches, among others. Length 608 may equal 1.671 inches. In another example, length 608 may range between 1.5 and 1.8 inches, among others. Length 606 may equal 0.445 inches. In another example, length 606 may range between 0.35 and 0.6 inches, among others. The radius of curvature 618 may equal 0.12 inches. In another example, the radius of curvature 618 may range between 0.08 and 0.16 inches. The radius of curvature 614 may equal 0.197 inches. In another example, the radius of curvature 614 may range between 0.18 and 0.21 inches.

Figure 7:
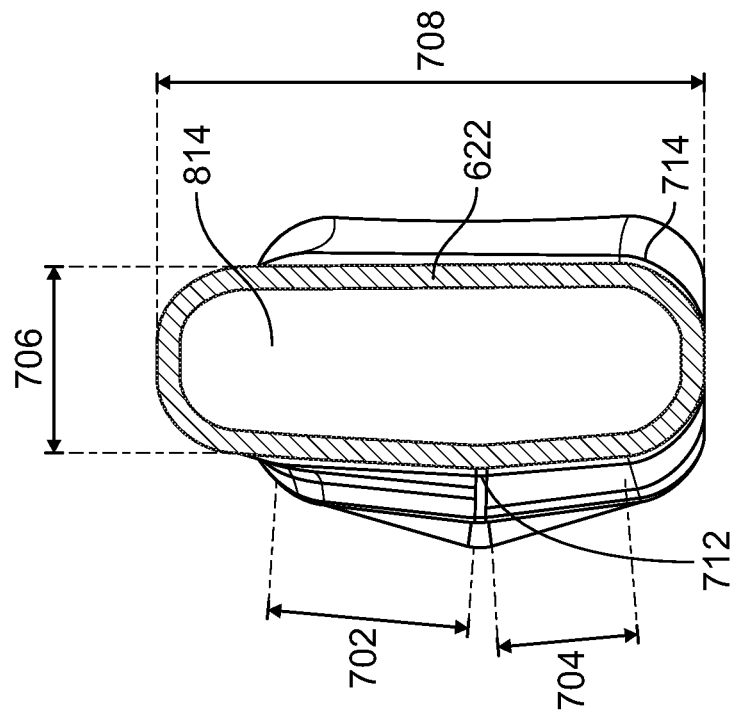
FIGS. 6-13 schematically depict cross-sectional views of the hockey stick shaft of FIG. 5, according to one or more aspects described herein.

FIG. 7 schematically depicts a cross-sectional view corresponding to arrows 7-7 from FIG. 5, according to one or more aspects described herein. In one example, the cross section of FIG. 7 includes five sides, similar to FIG. 6. The cross-section of FIG. 7 additionally depicts carbon-fiber walls 622 that surround an internal cavity 814. In one specific implementation, the cross-section of FIG. 7 includes the following specific dimensional values, such that length 702 may equal 0.532 inches. In another example, length 702 may range between 0.5 and 0.6 inches, among others. Length 704 may equal 0.365 inches. In another example, length 704 may range between 0.3 and 0.5 inches, among others. Length 706 may equal to 0.531 inches. In another example, length 706 may range between 0.4 and 0.65 inches, among others. Length 708 may equal 1.437 inches. In another example, length 708 may range between 1.3 and 1.55 inches, among others. The radius of curvature 712 may equal 0.12 inches. In another example, the radius of curvature 712 may range between 0.08 and 0.16 inches, among others. The radius of curvature 714 may equal 0.206 inches. In another example, the radius of curvature 714 may range between 0.19 and 0.22 inches, among others.

Figure 8:
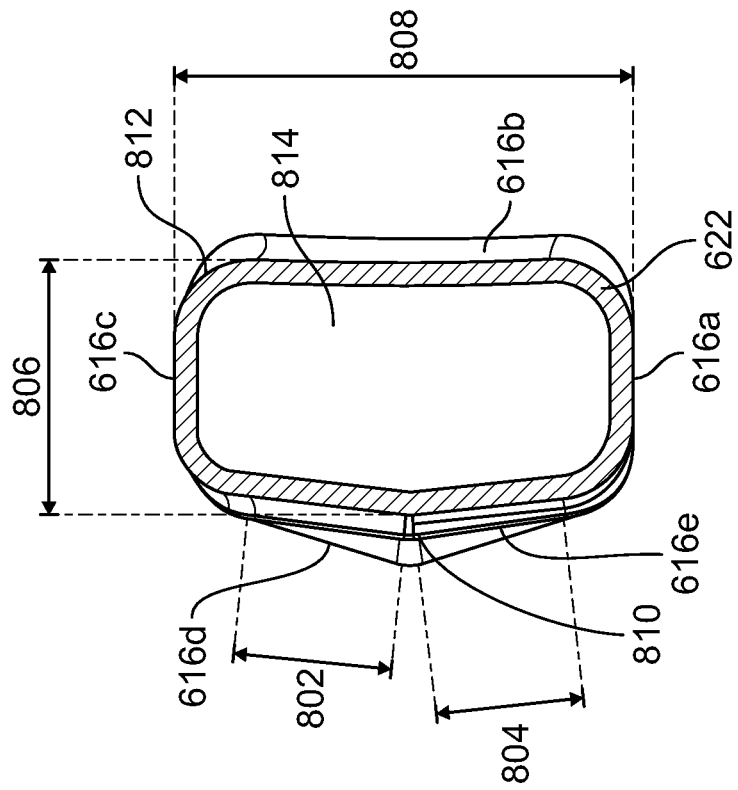

FIG. 8 schematically depicts a cross-sectional view corresponding to arrows 8-8 from FIG. 5, according to one or more aspects described herein. In one example, the cross section of FIG. 8 includes five sides, similar to FIG. 6. The cross-section of FIG. 8 additionally depicts an internal cavity 814 formed within the carbon-fiber walls 622. In one example, the internal cavity 814 may have a substantially rectangular cross-sectional shape. In another example, the internal cavity 814 may have a substantially pentagonal shape, such that the thickness of the sidewall 622 is substantially uniform around the perimeter of the hollow shaft 502. It is further contemplated that the internal cavity 814 may have additional or alternative cross sectional geometries in addition to or as alternatives to the pentagonal and/or rectangular geometries described herein. In one specific implementation, the cross-section of FIG. 8 includes the following specific dimensional values, such that length 802 may equal 0.412 inches. In another example, length 802 may range between 0.39 and 0.43 inches, among others.

Length 804 may equal 0.393 inches. In another example, length 804 may range between 0.37 and 0.42 inches, among others. Length 806 may equal to 0.681 inches. In another example, length 806 may range between 0.6 and 0.8 inches, among others. Length 808 may equal 1.21 inches. In another example, length 808 may range between 1.1 and 1.4 inches, among others. The radius of curvature 810 may equal 0.12 inches. In another example, the radius of curvature 810 may range between 0.08 and 0.16 inches, among others. The radius of curvature 812 may equal 0.216 inches. In another example, the radius of curvature 812 may range between 0.19 and 0.24 inches, among others.

Figure 9:
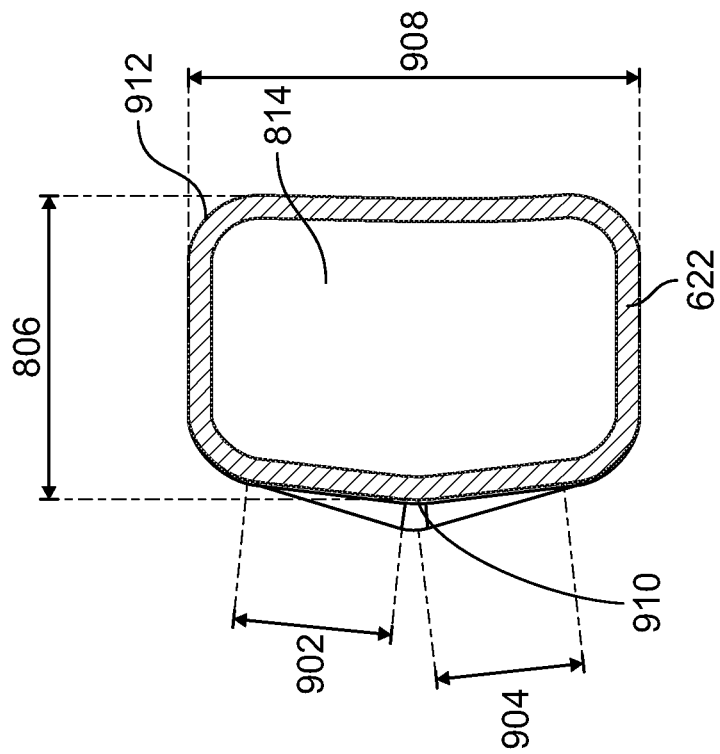

FIG. 9 schematically depicts a cross-sectional view corresponding to arrows 9-9 from FIG. 5, according to one or more aspects described herein. In one example, the cross section of FIG. 9 includes five sides, similar to FIG. 6. The cross-section of FIG. 9 additionally depicts an internal cavity 814 formed within the carbon-fiber walls 622. In one specific implementation, the cross-section of FIG. 8 includes the following specific dimensional values, such that length 902 may equal 0.402 inches. In another example, length 902 may range between 0.38 and 0.43 inches, among others. Length 904 may equal 0.405 inches. In another example, length 904 may range between 0.38 and 0.43 inches, among others. Length 906 may equal to 0.795 inches. In another example, length 906 may range between 0.7 and 0.9 inches, among others. Length 908 may equal 1.174 inches. In another example, length 908 may range between 1.0 and 1.3 inches, among others. The radius of curvature 910 may equal 0.12 inches. In another example, the radius of curvature 910 may range between 0.08 and 0.16 inches, among others. The radius of curvature 912 may equal 0.197 inches. In another example, the radius of curvature 912 may range between 0.18 and 0.22 inches, among others.

Figure 10:
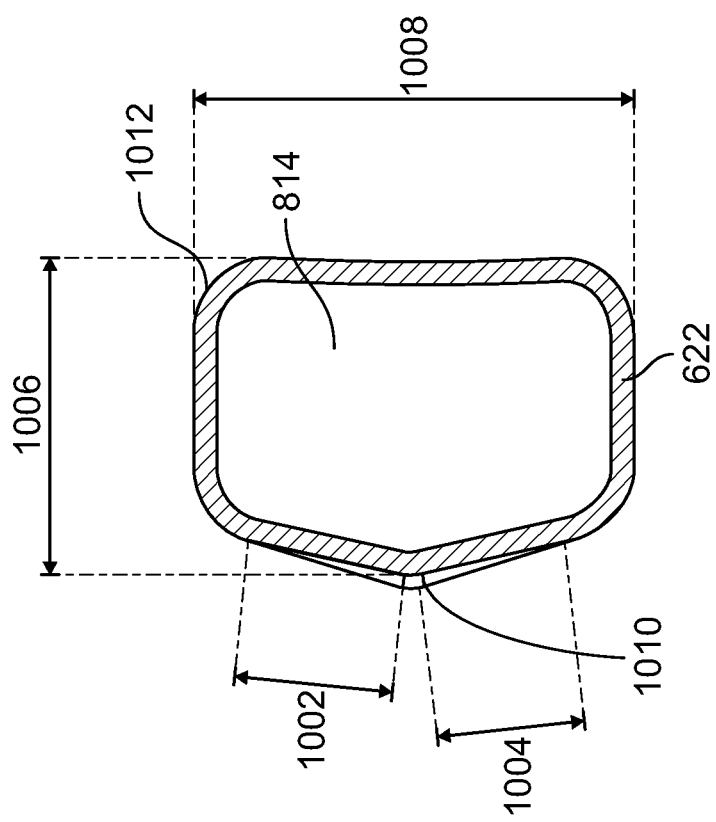

FIG. 10 schematically depicts a cross-sectional view corresponding to arrows 10-10 from FIG. 5, according to one or more aspects described herein. In one example, the cross section of FIG. 10 includes five sides, similar to FIG. 6. The cross-section of FIG. 10 additionally depicts an internal cavity 814 formed within the carbon-fiber walls 622. In one specific implementation, the cross-section of FIG. 10 includes the following specific dimensional values, such that length 1002 may equal 0.388 inches. In another example, length 1002 may range between 0.37 and 0.42 inches, among others. Length 1004 may equal 0.388 inches. In another example, length 1004 may range between 0.37 and 0.42 inches, among others. Length 1006 may equal to 0.842 inches. In another example, length 1006 may range between 0.7 and 1.0 inches, among others. Length 1008 may equal 1.168 inches. In another example, length 1008 may range between 1.0 and 1.3 inches, among others. The radius of curvature 1010 may equal 0.12 inches. In another example, the radius of curvature 1010 may range between 0.08 and 0.16 inches, among others. The radius of curvature 1012 may equal 0.197 inches. In another example, the radius of curvature 1012 may range between 0.18 and 0.22 inches, among others.

Figure 11:
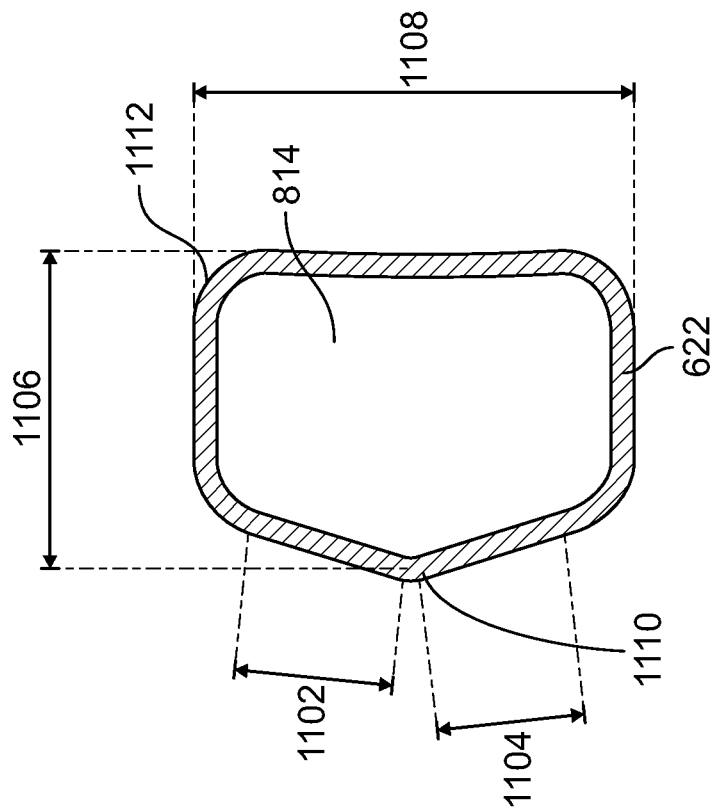

FIG. 11 schematically depicts a cross-sectional view corresponding to arrows 11-11 from FIG. 5, according to one or more aspects described herein. In one example, the cross section of FIG. 11 includes five sides, similar to FIG. 6. The cross-section of FIG. 11 additionally depicts an internal cavity 814 formed within the carbon-fiber walls 622. In one specific implementation, the cross-section of FIG. 11 includes the following specific dimensional values, such that length 1102 may equal 0.389 inches. In another example, length 1102 may range between 0.37 and 0.42 inches, among others. Length 1104 may equal 0.389 inches. In another example, length 1104 may range between 0.37 and 0.42 inches, among others. Length 1106 may equal to 0.864 inches. In another example, length 1106 may range between 0.7 and 1.0 inches, among others. Length 1108 may equal 1.165 inches. In another example, length 1108 may range between 1.0 and 1.3 inches, among others. The radius of curvature 1110 may equal 0.12 inches. In another example, the radius of curvature 1110 may range between 0.08 and 0.16 inches, among others. The radius of curvature 1112 may equal 0.197 inches. In another example, the radius of curvature 1112 may range between 0.18 and 0.22 inches, among others.

Figure 12:
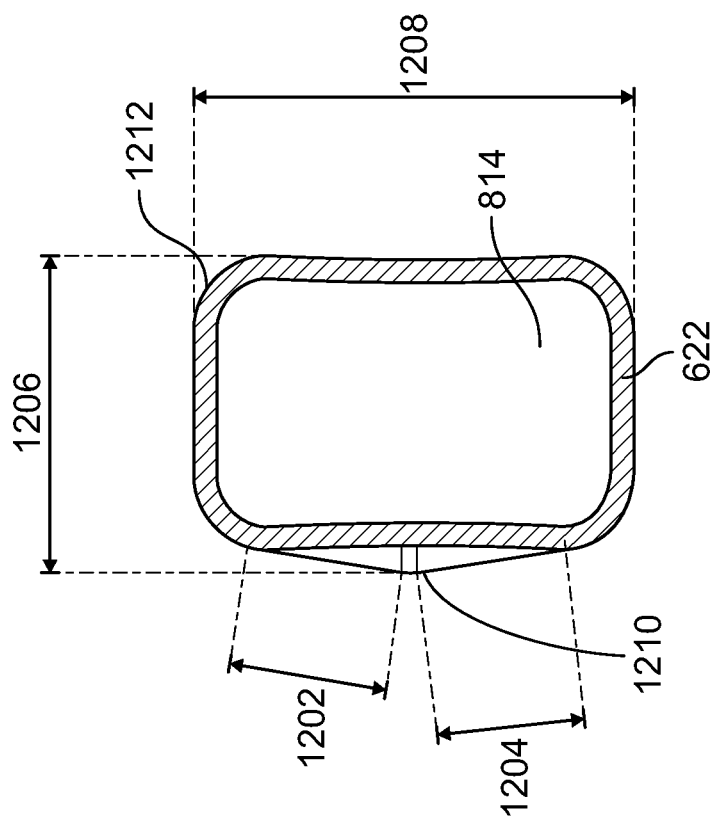

FIG. 12 schematically depicts a cross-sectional view corresponding to arrows 12-12 from FIG. 5, according to one or more aspects described herein. In one example, the cross section of FIG. 12 includes five sides, similar to FIG. 6. The cross-section of FIG. 12 additionally depicts an internal cavity 814 formed within the carbon-fiber walls 622. In one specific implementation, the cross-section of FIG. 12 includes the following specific dimensional values, such that length 1202 may equal 0.384 inches. In another example, length 1202 may range between 0.36 and 0.41 inches, among others. Length 1204 may equal 0.384 inches. In another example, length 1204 may range between 0.36 and 0.41 inches, among others. Length 1206 may equal to 0.819 inches. In another example, length 1206 may range between 0.7 and 1.0 inches, among others. Length 1208 may equal 1.165 inches. In another example, length 1208 may range between 1.0 and 1.3 inches, among others. The radius of curvature 1210 may equal 0.12 inches. In another example, the radius of curvature 1210 may range between 0.08 and 0.16 inches, among others. The radius of curvature 1212 may equal 0.197 inches. In another example, the radius of curvature 1212 may range between 0.18 and 0.22 inches, among others.

Figure 13:
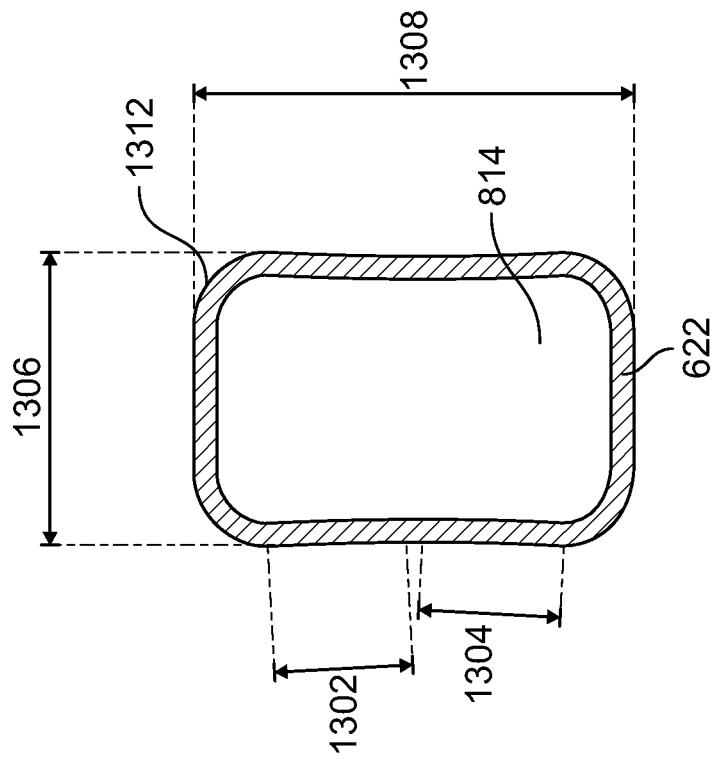

FIG. 13 schematically depicts a cross-sectional view corresponding to arrows 13-13 from FIG. 5, according to one or more aspects described herein. In one example, the cross section of FIG. 13 includes five sides, similar to FIG. 6. The cross-section of FIG. 13 additionally depicts an internal cavity 814 formed within the carbon-fiber walls 622. In one specific implementation, the cross-section of FIG. 13 includes the following specific dimensional values, such that length 1302 may equal 0.358 inches. In another example, length 1302 may range between 0.34 and 0.38 inches, among others. Length 1304 may equal 0.358 inches. In another example, length 1304 may range between 0.34 and 0.38 inches, among others. Length 1306 may equal to 0.756 inches. In another example, length 1306 may range between 0.65 and 1.0 inches, among others. Length 1308 may equal 1.165 inches. In another example, length 1308 may range between 1.0 and 1.3 inches, among others. The radius of curvature 1312 may equal 0.197 inches. In another example, the radius of curvature 1312 may range between 0.18 and 0.22 inches, among others.

Figure 14:
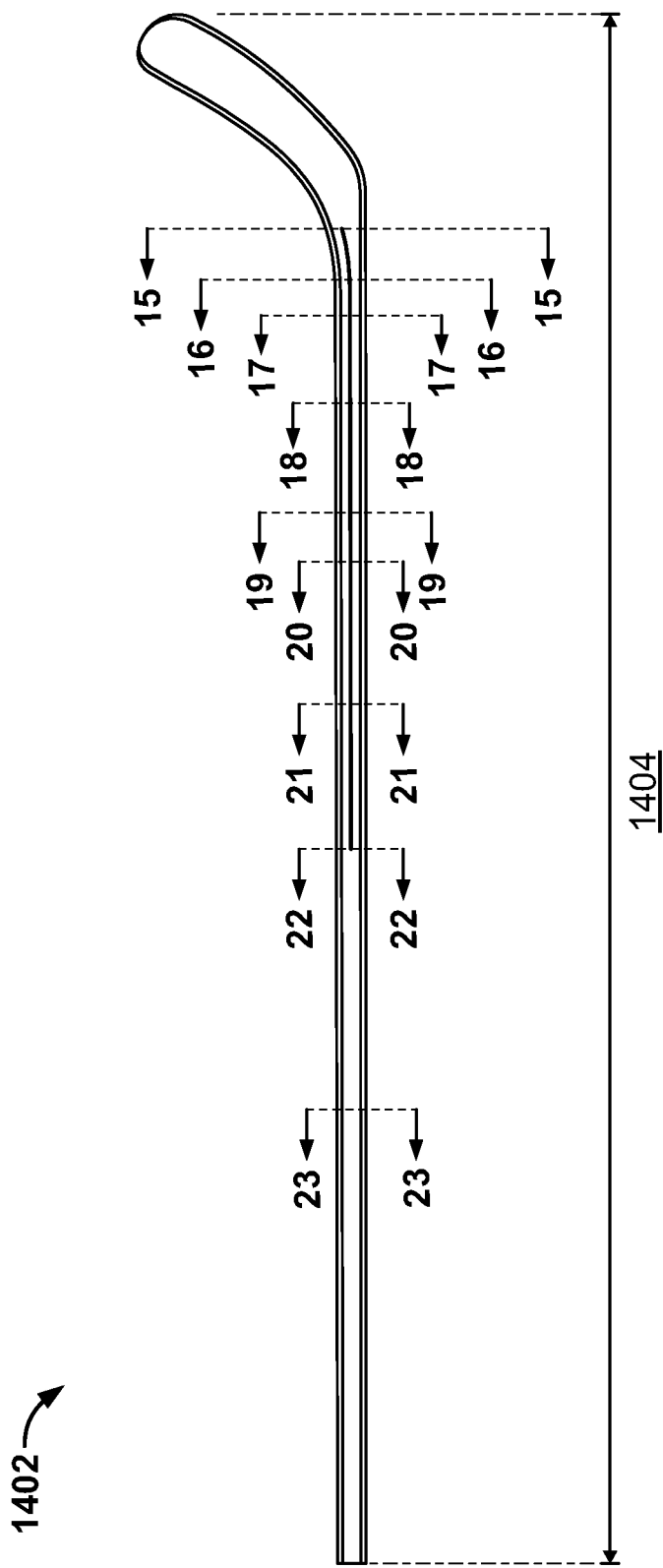
FIG. 14 depicts an example hockey stick shaft, according to one or more aspects described herein.

FIG. 14 depicts an example hockey stick shaft 1402 that may be similar to hockey stick shaft 102. In one implementation, the hockey stick shaft 1402 may include one or more portions with heptagonal (7-sided) geometries. It is contemplated that the cross-sectional geometry of hockey stick shaft 1402 may vary along the longitudinal length 1404. In this regard, multiple cross-sections of the hockey stick shaft 1402 are provided in FIGS. 15-23, as described in the following portions of this disclosure. However, FIGS. 15-23 refer to one implementation of variable cross-sectional geometry of hockey stick shaft 1402, and it is contemplated that alternative cross-sectional geometries may be used, without departing from the scope of these disclosures. In one example, as described in relation to FIGS. 15-23, the hockey stick shaft 1402 may include a first portion with a first cross-sectional geometry and a second portion with a second cross-sectional geometry. The first cross-sectional geometry may be heptagonal in shape, and the second cross-sectional geometry may have another heptagonal cross-sectional geometry, or may be rectangular in shape. It is contemplated that the description of the various geometries used throughout these disclosures may be refer to geometries with rounded edges/corners, such that pentagonal and a rectangular geometries may have respective five and four sides with rounded corners with any radius of curvature. It is further contemplated that the geometries may or may not have two or more sides of equal length. Additionally, it is contemplated that the sides of the various cross-sectional geometries may have inner and/or outer surfaces that are substantially planar, or may be partially uneven, including convex and/or concave geometries.

It is noted that FIGS. 15-23 include various dimensional values. As such, it is contemplated that these dimensions may be implemented with any values, without departing from the scope of these disclosures. It is further contemplated that the hockey stick shaft 1402 may exhibit increased bending stiffness when compared to a conventional shaft that uses rectangular, or rounded rectangular cross sections. This increased bending stiffness may result from non-standard heptagonal geometry, without an increase in Young's Modulus, E, resulting from an increased material/shaft wall thickness, and the like. In another example, an increase in bending stiffness may result from a combination of increased second moment of inertia, I, and Young's Modulus, E.

Figure 15:
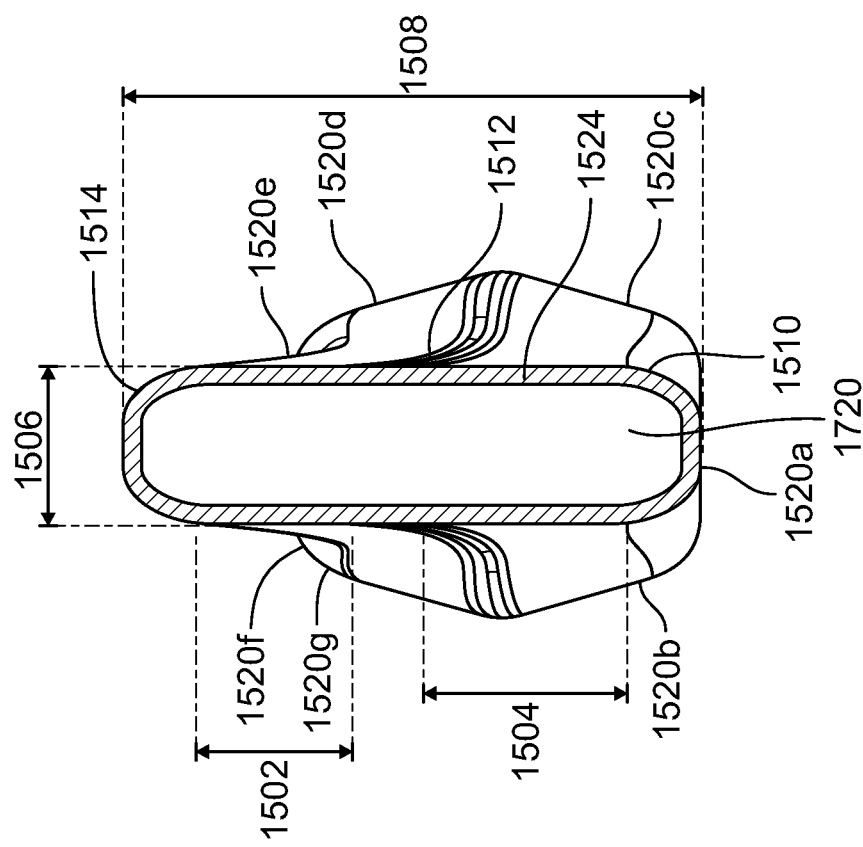

FIG. 15 schematically depicts a cross-sectional view corresponding to arrows 15-15 from FIG. 14, according to one or more aspects described herein. In one example, the cross section of FIG. 15 includes seven sides 1520a-1520g. The cross-section of FIG. 15 additionally depicts an internal cavity 1720 and carbon-fiber walls 1524 that surround the internal cavity 1720. The walls 1524 may otherwise be referred to as shaft structure sidewalls 1524. In one specific implementation, the cross-section of FIG. 15 includes the following specific dimensional values, such that length 1502 may equal 0.460 inches. In another example, length 1502 may range between 0.35 and 0.6 inches, among others. Length 1504 may equal 0.590 inches. In another example, length 1504 may range between 0.45 and 0.75 inches, among others. Length 1506 may equal 0.457 inches. In another example, length 1506 may range between 0.35 and 0.6 inches, among others. Length 1508 may be 1.675 inches. In another example, length 1508 may range between 1.45 and 1.9 inches, among others. The radius of curvature 1510 may equal 0.216 inches. In another example, the radius of curvature 1510 may range between 0.19 and 0.23 inches. The radius of curvature 1512 may equal 0.16 inches. In another example, the radius of curvature 1512 may range between 0.12 and 0.2 inches. The radius of curvature 1514 may equal 0.197 inches. In another example, the radius of curvature 1514 may range between 0.18 and 0.22 inches.

FIG. 15 schematically depicts a cross-sectional view corresponding to arrows 15-15 from FIG. 14, according to one or more aspects described herein. In one example, the cross section of FIG. 15 includes seven sides 1520a-1520g. The cross-section of FIG. 15 additionally depicts an internal cavity 1720 and carbon-fiber outer walls 1524 that surround the internal cavity 1720. In one specific implementation, the cross-section of FIG. 15 includes the following specific dimensional values, such that length 1502 may equal 0.460 inches. In another example, length 1502 may range between 0.35 and 0.6 inches, among others. Length 1504 may equal 0.590 inches. In another example, length 1504 may range between 0.45 and 0.75 inches, among others. Length 1506 may equal 0.457 inches. In another example, length 1506 may range between 0.35 and 0.6 inches, among others. Length 1508 may be 1.675 inches. In another example, length 1508 may range between 1.45 and 1.9 inches, among others. The radius of curvature 1510 may equal 0.216 inches. In another example, the radius of curvature 1510 may range between 0.19 and 0.23 inches. The radius of curvature 1512 may equal 0.16 inches. In another example, the radius of curvature 1512 may range between 0.12 and 0.2 inches. The radius of curvature 1514 may equal 0.197 inches. In another example, the radius of curvature 1514 may range between 0.18 and 0.22 inches.

Figure 16:
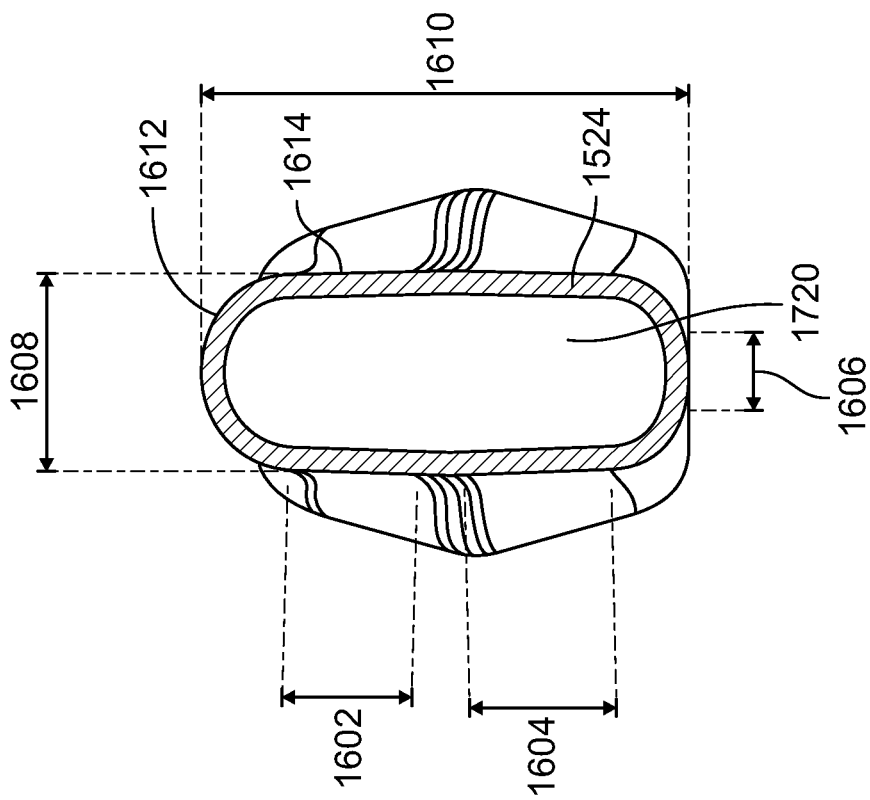
FIGS. 15-23 schematically depict cross-sectional views of the hockey stick shaft of FIG. 14, according to one or more aspects described herein.

FIG. 16 schematically depicts a cross-sectional view corresponding to arrows 16-16 from FIG. 14, according to one or more aspects described herein. The cross-section of FIG. 16 additionally depicts an internal foam core 1522 and carbon-fiber outer walls 1524 that surround the internal foam core 1522. In one specific implementation, the cross-section of FIG. 16 includes the following specific dimensional values, such that length 1602 may equal 0.349 inches. In another example, length 1602 may range between 0.25 and 0.45 inches, among others. Length 1604 may equal 0.404 inches. In another example, length 1604 may range between 0.38 and 0.43 inches, among others. Length 1606 may equal 0.22 inches. In another example, length 1606 may range between 0.19 and 0.25 inches, among others. Length 1608 may be 0.566 inches. In another example, length 1608 may range between 0.45 and 0.7 inches, among others. Length 1610 may be 1.337 inches. In another example, length 1610 may range between 1.1 and 1.6 inches, among others. The radius of curvature 1612 may equal 0.216 inches. In another example, the radius of curvature 1612 may range between 0.19 and 0.23 inches. The radius of curvature 1614 may equal 0.16 inches. In another example, the radius of curvature 1614 may range between 0.12 and 0.2 inches.

Figure 17:
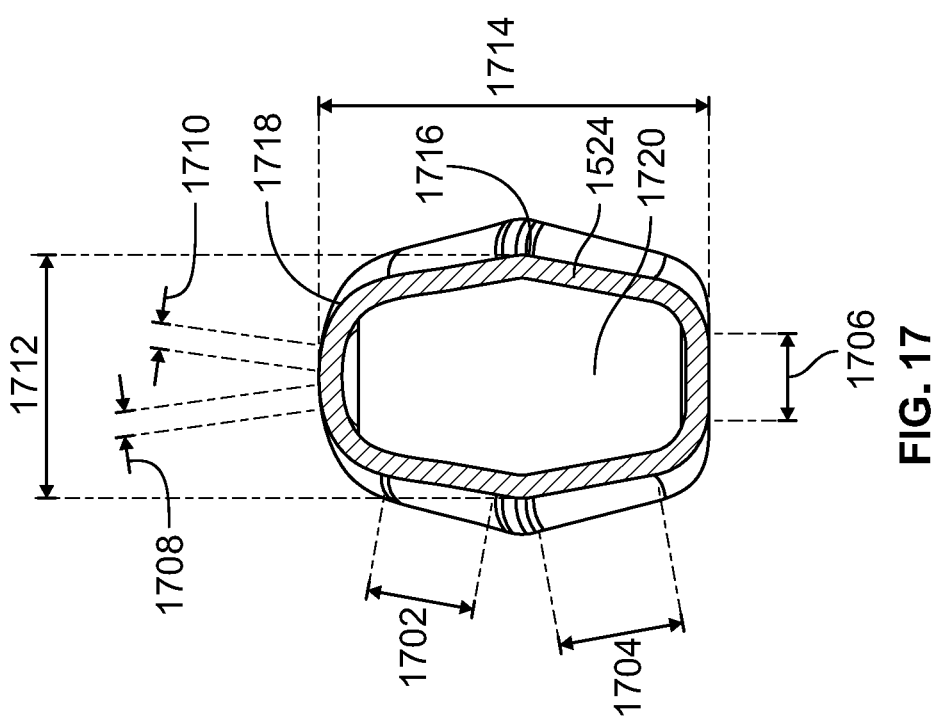

FIG. 17 schematically depicts a cross-sectional view corresponding to arrows 17-17 from FIG. 14, according to one or more aspects described herein. In one example, the cross section of FIG. 17 includes seven sides, similar to FIG. 15. The cross-section of FIG. 17 additionally depicts an internal cavity 1720 formed within the carbon-fiber walls 1524. In one specific implementation, the cross-section of FIG. 17 includes the following specific dimensional values, such that length 1702 may equal 0.341 inches. In another example, length 1702 may range between 0.3 and 0.4 inches, among others. Length 1704 may equal 0.396 inches. In another example, length 1704 may range between 0.37 and 0.43 inches, among others. Length 1706 may equal to 0.27 inches. In another example, length 1706 may range between 0.15 and 0.45 inches, among others. Length 1708 may equal 0.082 inches. In another example, length 1708 may range between 0.06 and 0.1 inches, among others. Length 1710 may equal 0.082 inches. In another example, length 1710 may range between 0.06 and 0.1 inches, among others. The radius of curvature 1716 may equal 0.16 inches. In another example, the radius of curvature 1716 may range between 0.12 and 0.2 inches, among others. The radius of curvature 1718 may equal 0.197 inches. In another example, the radius of curvature 1718 may range between 0.18 and 0.22 inches, among others.

Figure 18:
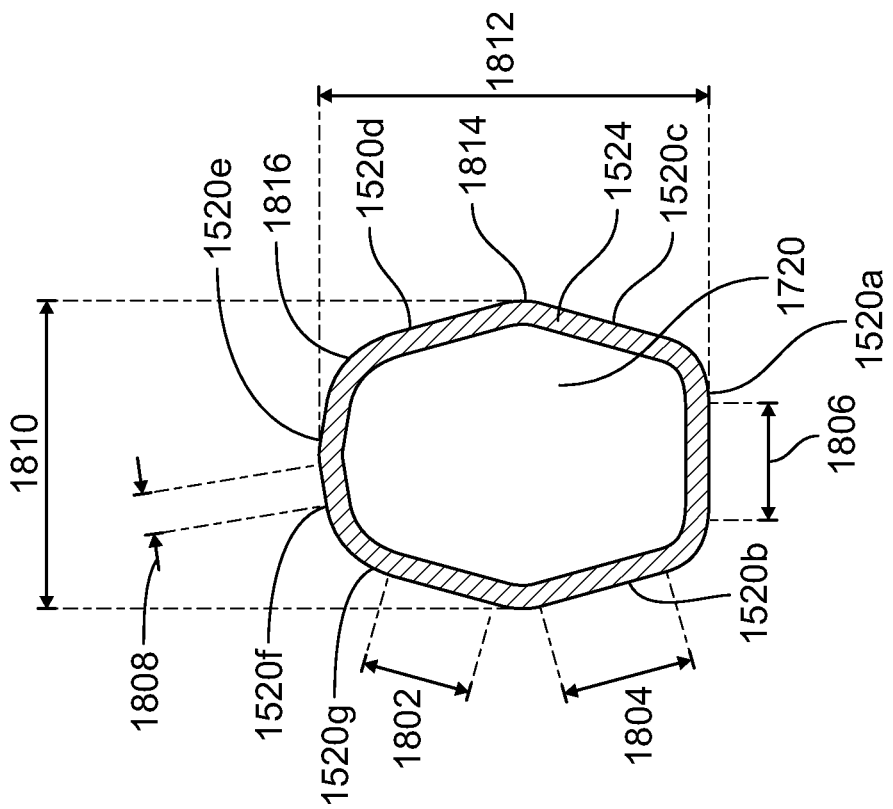

FIG. 18 schematically depicts a cross-sectional view corresponding to arrows 18-18 from FIG. 14, according to one or more aspects described herein. In one example, the cross section of FIG. 18 includes seven sides 1520a-1520g, similar to FIG. 15. The cross-section of FIG. 18 additionally depicts an internal cavity 1720 formed within the carbon-fiber walls 1524. In one specific implementation, the cross-section of FIG. 18 includes the following specific dimensional values, such that length 1802 may equal 0.351 inches. In another example, length 1802 may range between 0.3 and 0.4 inches, among others. Length 1804 may equal 0.409 inches. In another example, length 1804 may range between 0.38 and 0.43 inches, among others. Length 1806 may equal to 0.38 inches. In another example, length 1806 may range between 0.3 and 0.5 inches, among others. Length 1808 may equal 0.133 inches. In another example, length 1808 may range between 0.1 and 0.16 inches, among others. Length 1810 may equal 0.974 inches. In another example, length 1810 may range between 0.8 and 1.2 inches, among others. Length 1812 may equal 1.231 inches. In another example, length 1812 may range between 1.0 and 1.4 inches, among others. The radius of curvature 1814 may equal 0.16 inches. In another example, the radius of curvature 1814 may range between 0.12 and 0.2 inches, among others. The radius of curvature 1816 may equal 0.216 inches. In another example, the radius of curvature 1816 may range between 0.19 and 0.24 inches, among others.

Figure 19:
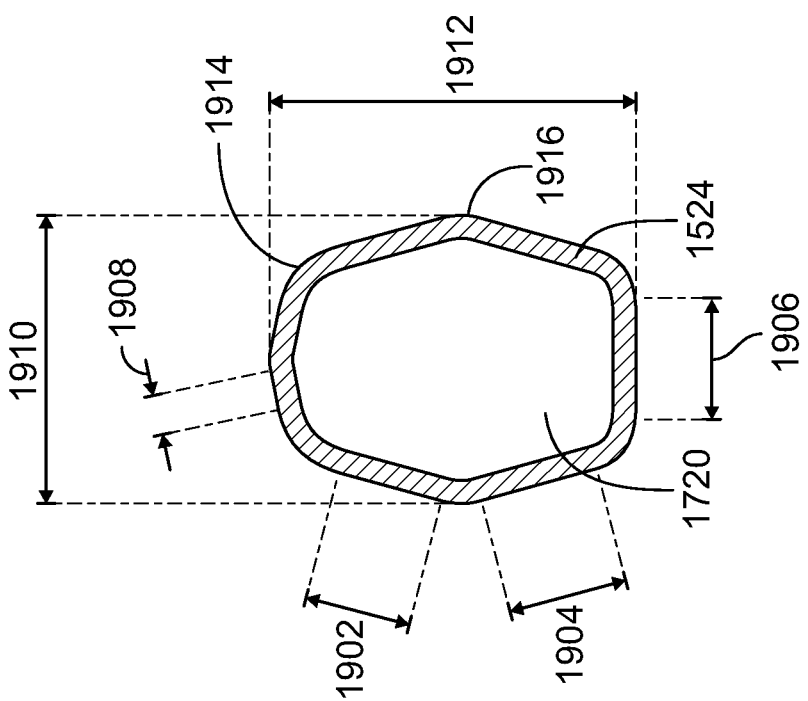

FIG. 19 schematically depicts a cross-sectional view corresponding to arrows 19-19 from FIG. 14, according to one or more aspects described herein. The cross-section of FIG. 19 additionally depicts an internal cavity 1720 formed within the carbon-fiber walls 1524. In one specific implementation, the cross-section of FIG. 19 includes the following specific dimensional values, such that length 1902 may equal 0.357 inches. In another example, length 1902 may range between 0.3 and 0.4 inches, among others. Length 1904 may equal 0.404 inches. In another example, length 1904 may range between 0.38 and 0.43 inches, among others. Length 1906 may equal to 0.41 inches. In another example, length 1906 may range between 0.3 and 0.5 inches, among others. Length 1908 may equal 0.135 inches. In another example, length 1908 may range between 0.12 and 0.17 inches, among others. Length 1910 may equal 0.968 inches. In another example, length 1910 may range between 0.8 and 1.2 inches, among others. Length 1912 may equal 1.233 inches. In another example, length 1912 may range between 1.0 and 1.4 inches, among others. The radius of curvature 1914 may equal 0.197 inches. In another example, the radius of curvature 1914 may range between 0.18 and 0.22 inches, among others. The radius of curvature 1916 may equal 0.16 inches. In another example, the radius of curvature 1916 may range between 0.12 and 0.20 inches, among others.

Figure 20:
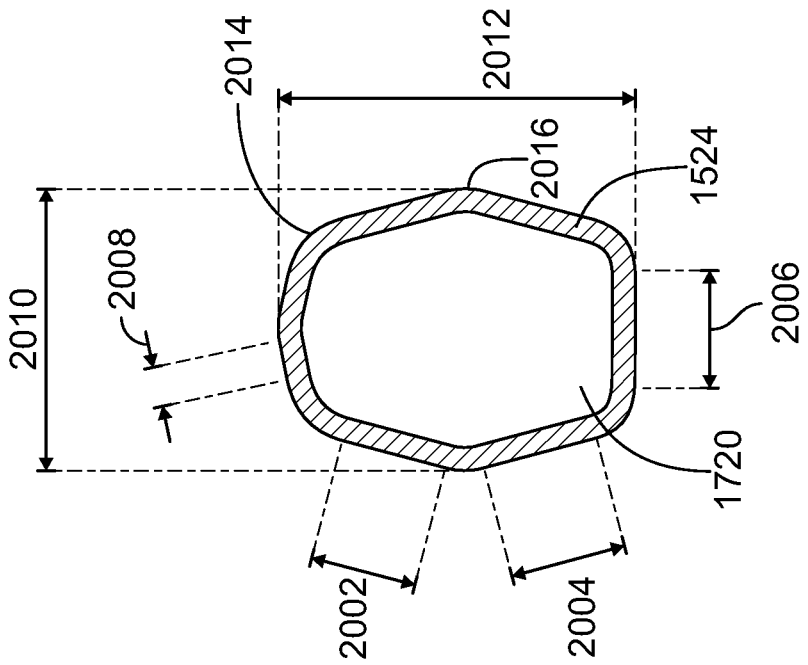

FIG. 20 schematically depicts a cross-sectional view corresponding to arrows 20-20 from FIG. 14, according to one or more aspects described herein. The cross-section of FIG. 20 additionally depicts an internal cavity 1720 formed within the carbon-fiber walls 1524. In one specific implementation, the cross-section of FIG. 20 includes the following specific dimensional values, such that length 2002 may equal 0.357 inches. In another example, length 2002 may range between 0.3 and 0.4 inches, among others. Length 2004 may equal 0.404 inches. In another example, length 2004 may range between 0.38 and 0.43 inches, among others. Length 2006 may equal to 0.41 inches. In another example, length 2006 may range between 0.3 and 0.5 inches, among others. Length 2008 may equal 0.135 inches. In another example, length 2008 may range between 0.12 and 0.17 inches, among others. Length 2010 may equal 0.972 inches. In another example, length 2010 may range between 0.8 and 1.2 inches, among others. Length 2012 may equal 1.233 inches. In another example, length 2012 may range between 1.0 and 1.4 inches, among others. The radius of curvature 2014 may equal 0.197 inches. In another example, the radius of curvature 2014 may range between 0.18 and 0.22 inches, among others. The radius of curvature 2016 may equal 0.16 inches. In another example, the radius of curvature 2016 may range between 0.12 and 0.20 inches, among others.

Figure 21:
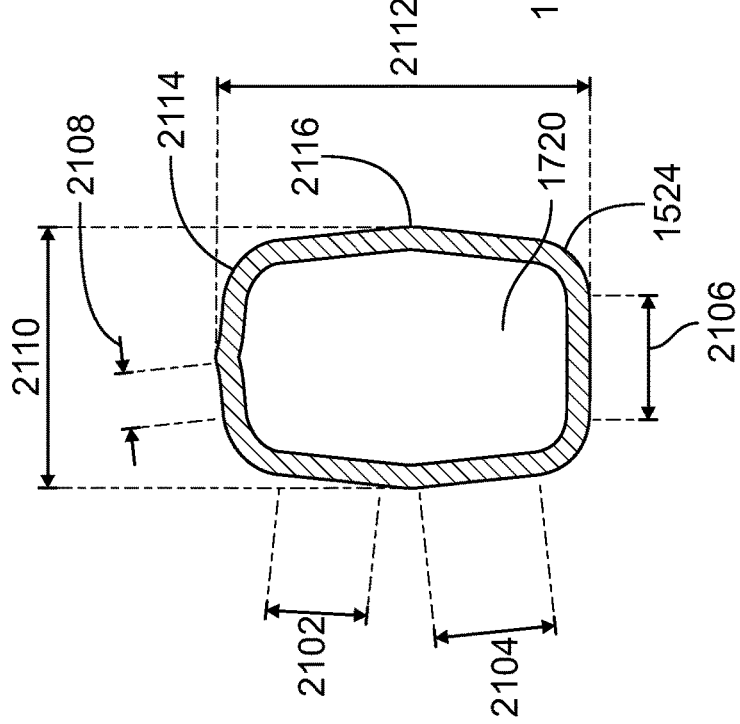

FIG. 21 schematically depicts a cross-sectional view corresponding to arrows 21-21 from FIG. 14, according to one or more aspects described herein. The cross-section of FIG. 21 additionally depicts an internal cavity 1720 formed within the carbon-fiber walls 1524. In one specific implementation, the cross-section of FIG. 21 includes the following specific dimensional values, such that length 2102 may equal 0.329 inches. In another example, length 2102 may range between 0.3 and 0.36 inches, among others. Length 2104 may equal 0.395 inches. In another example, length 2104 may range between 0.38 and 0.43 inches, among others. Length 2106 may equal to 0.41 inches. In another example, length 2106 may range between 0.3 and 0.5 inches, among others. Length 2108 may equal 0.181 inches. In another example, length 2108 may range between 0.16 and 0.20 inches, among others. Length 2110 may equal 0.840 inches. In another example, length 2110 may range between 0.7 and 1.0 inches, among others. Length 2112 may equal 1.203 inches. In another example, length 2112 may range between 1.0 and 1.4 inches, among others. The radius of curvature 2114 may equal 0.173 inches. In another example, the radius of curvature 2114 may range between 0.16 and 0.19 inches, among others. The radius of curvature 2116 may equal 0.16 inches. In another example, the radius of curvature 2116 may range between 0.12 and 0.20 inches, among others.

Figure 22:
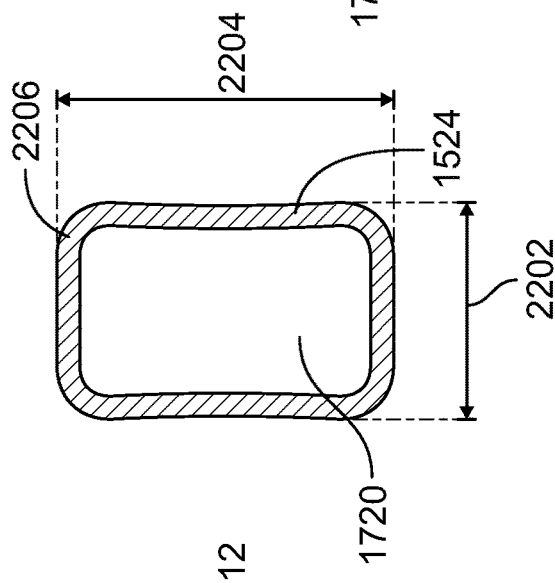

FIG. 22 schematically depicts a cross-sectional view corresponding to arrows 22-22 from FIG. 14, according to one or more aspects described herein. The cross-section of FIG. 22 additionally depicts an internal cavity 1720 formed within the carbon-fiber walls 1524. In one specific implementation, the cross-section of FIG. 22 includes the following specific dimensional values, such that length 2202 may equal 0.753 inches. In another example, length 2202 may range between 0.6 and 0.9 inches, among others. Length 2204 may equal 1.163 inches. In another example, length 2204 may range between 1.0 and 1.3 inches, among others. The radius of curvature 2206 may equal 0.173 inches. In another example, the radius of curvature 2206 may range between 0.16 and 0.19 inches, among others.

Figure 23:
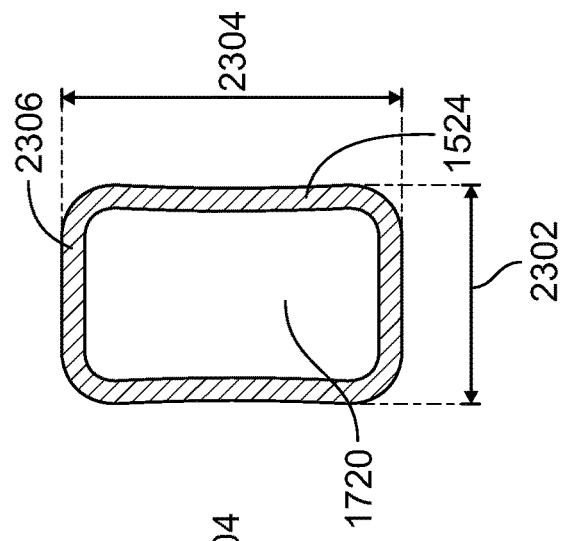

FIG. 23 schematically depicts a cross-sectional view corresponding to arrows 23-23 from FIG. 14, according to one or more aspects described herein. The cross-section of FIG. 23 additionally depicts an internal cavity 1720 formed within the carbon-fiber walls 1524. In one specific implementation, the cross-section of FIG. 23 includes the following specific dimensional values, such that length 2302 may equal 0.750 inches. In another example, length 2302 may range between 0.6 and 0.9 inches, among others. Length 2304 may equal 1.160 inches. In another example, length 2304 may range between 1.0 and 1.3 inches, among others. The radius of curvature 2306 may equal 0.173 inches. In another example, the radius of curvature 2306 may range between 0.16 and 0.19 inches, among others.

In addition to, or as an alternative to the variable pentagonal and heptagonal cross-sectional geometries described in relation to hockey shaft structures 502 and 1402, the thicknesses of the sidewalls 622 and 1524 may vary along the lengths 504 and 1404 of the shafts 502 and 1402. In one example, it is contemplated that the sidewall thickness of sidewalls 622 and/or 1524 may vary by up to 20% along the lengths 504 and 1404 of the respective shafts 502 and 1402. In another example, the sidewall thickness of sidewalls 622 and/or 1524 may be approximately constant along the lengths 504 and 1404 of the respective shafts 502 and 1402.

Figure 24:
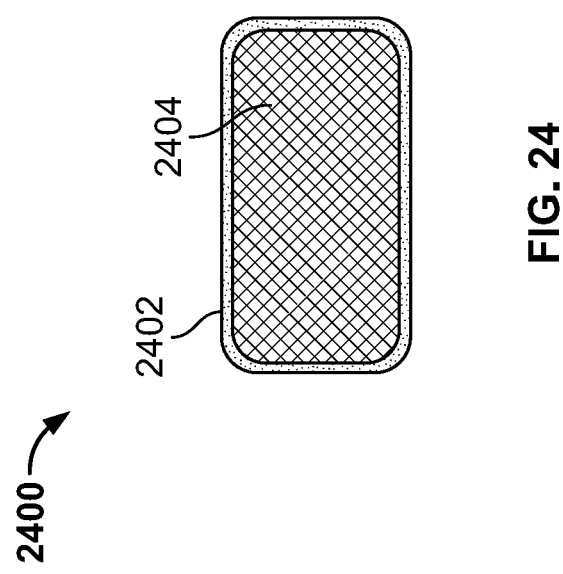

FIGS. 24-28 schematically depict stages of a process for molding a shaft having variable cross-sectional geometry, similar to shafts 102, 502, and 1402. FIG. 24 schematically depicts a wrapped shaft structure 2400 that includes one or more layers of carbon fiber tape (or a polymeric tape that uses an additional or alternative fiber material) 2402. The carbon fiber tape 2402 is wrapped around a mandrel 2404. The mandrel 2404 may have a cross-section that is a rough approximation of the desired cross-section of the hockey stick shaft once molded. As such, the mandrel 2404 may have an approximate rectangular, pentagonal, and/or heptagonal cross-section, among others. In one implementation, the mandrel 2404 is constructed from a metal and/or alloy, such as steel, iron, aluminum, or titanium, among others. It is contemplated that any metal or alloy may be used, in addition to or as an alternative to any ceramic, polymer, or composite material, such as a fiber-reinforced material. The mandrel 2404 may additionally include compressible elements or portions that may allow the wrapped carbon fiber tape 2402 to be removed from the mandrel 2404 prior to molding. Additionally or alternatively, a removal agent, such as a lubricant, may be included in an outer layer of the mandrel 2404 (such as a layer of solid lubricant) or may be added to the mandrel 2404 each use before wrapping with the carbon fiber tape 2402 (such as a liquid lubricant). It is contemplated that the carbon fiber tape 2402 may be wrapped around the mandrel 2404 by one or more machines, or may be manually wrapped. It is contemplated that the carbon fiber tape 2402 may include any number of layers, and that the layers may be oriented in any manner relative to one another, without departing from the scope of these disclosures. In one example, the carbon fiber tape 2402, when removed from the mandrel 2404, may be referred to as a wrapped shaft structure.

Figure 25:
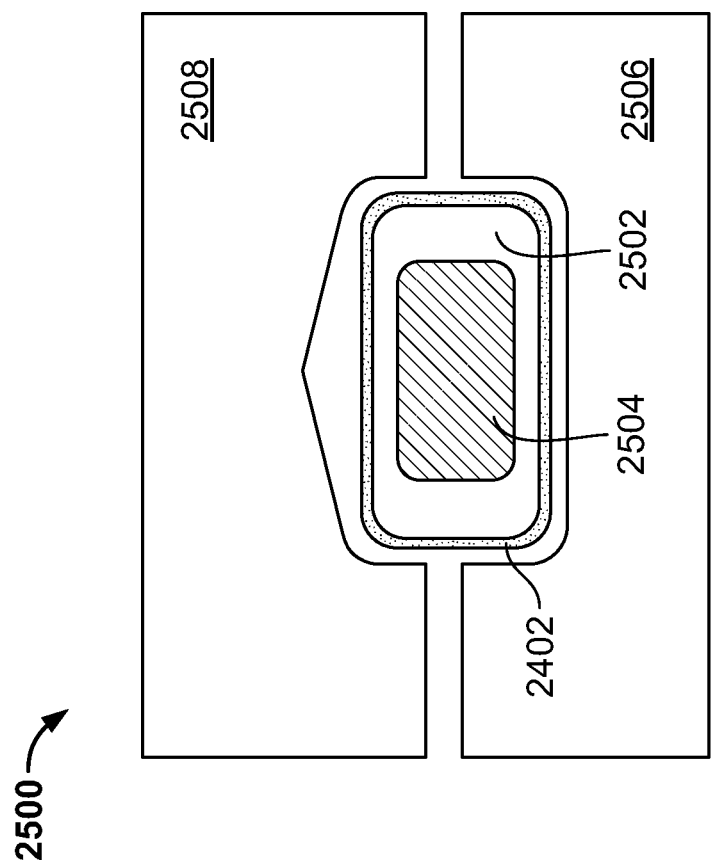
FIGS. 24-28 schematically depict stages of one or more hockey stick shaft molding processes, according to one or more aspects described herein.

FIG. 25 schematically depicts another stage of a molding process of a hockey stick shaft that has variable cross-sectional geometry, similar to shafts 102, 502, and 1402. As depicted in FIG. 25, the carbon fiber tape 2402 has been removed from the mandrel 2404 to reveal an internal shaft cavity 2502. An inflatable bladder 2504 is schematically depicted within the cavity 2502, and the wrapped carbon fiber tape 2402 is schematically depicted within two mold halves 2506 and 2508 of mold 2500. The mold halves 2506 and 2508 are schematically depicted as being partially separated from one another. In the depicted implementation, the mold halves 2506 and 2508 are both female molds. It is contemplated, however, that more than the two depicted mold halves 2506 and 2508 may be used to mold the hockey stick shaft having variable cross-sectional geometry. Alternatively, a male-female mold may be used in place of the female-female mold depicted in FIG. 25.

Figure 26:
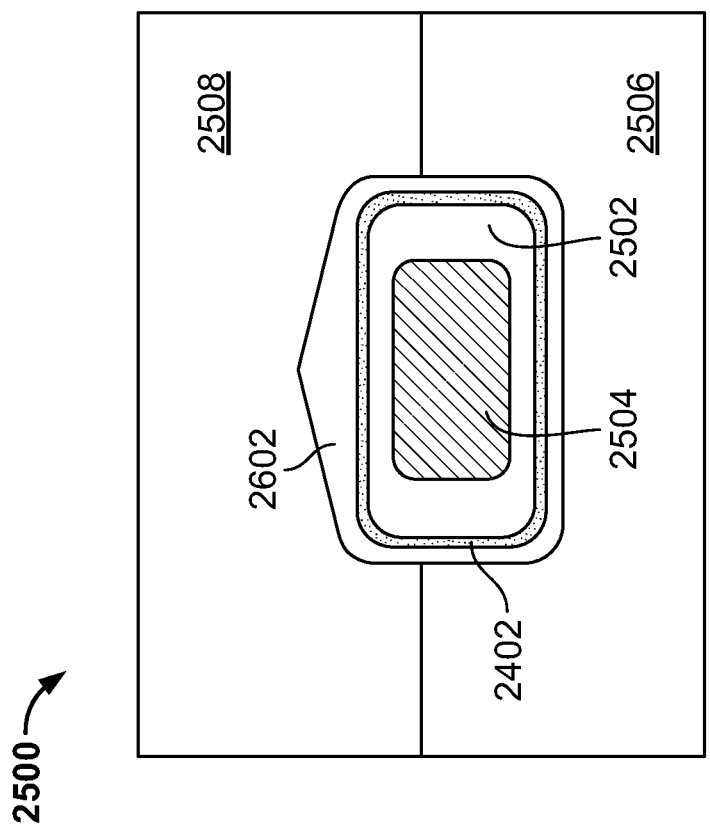

FIG. 25 schematically depicts the mold halves 2506 and 2508 as partially separated from one another. FIG. 26 schematically depicts the mold 2500 once the halves 2506 and 2508 have been closed together. As such, FIG. 26 schematically depicts the five-sided mold geometry 2602 that is to be imparted on the wrapped carbon fiber tape 2402. It is contemplated that the mold geometry 2602 is merely one schematic implementation, and the mold 2500 may have any internal geometry in order to form the variable geometries of hockey stick shafts 102, 502, and 1402.

Figure 27:
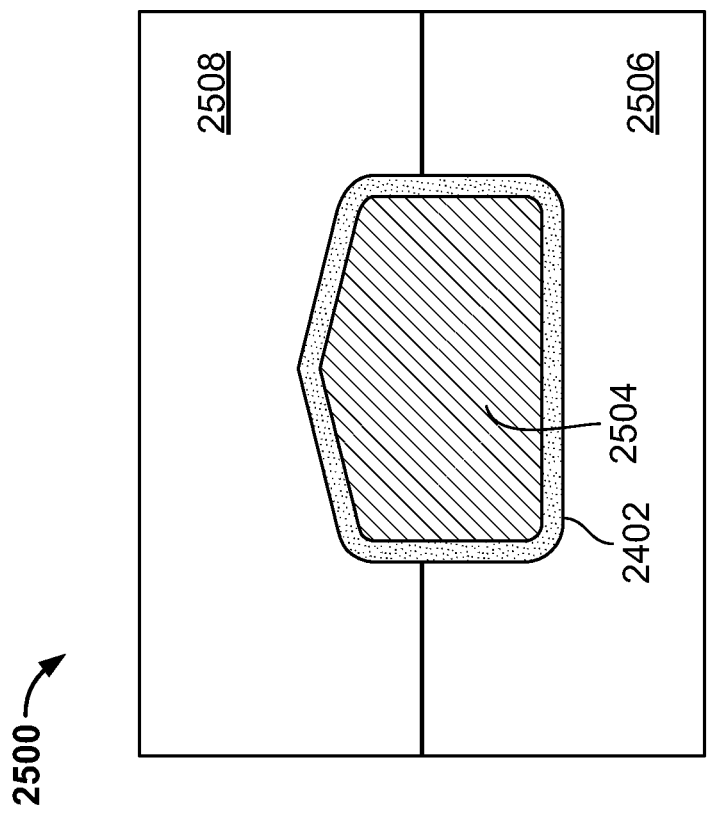

FIG. 27 schematically depicts a further step in the molding process of a hockey stick shaft having variable cross-sectional geometry, similar to hockey stick shafts 102, 502, and 1402. In one example, FIG. 27 schematically depicts one or more processes associated with heating the mold halves 2506 and 2508. The mold 2500 may be heated in order to activate/melt one or more resins preimpregnated within, or applied to, the wrapped fiber tape 2402. Simultaneously or subsequently, the inflatable bladder 2504 is inflated, as depicted in FIG. 27, which imparts a force on the internal walls of the hockey stick shaft and urges the wrapped carbon fiber tape 2402 toward the walls of the mold 2500. As depicted in FIG. 27, the inflatable bladder 2504 may completely fill the internal cavity 2502. It is contemplated that the inflatable bladder 2504 may be used in combination with one or more insert elements configured to apply force to the internal walls of the wrapped carbon fiber tape 2402.

Figure 28:
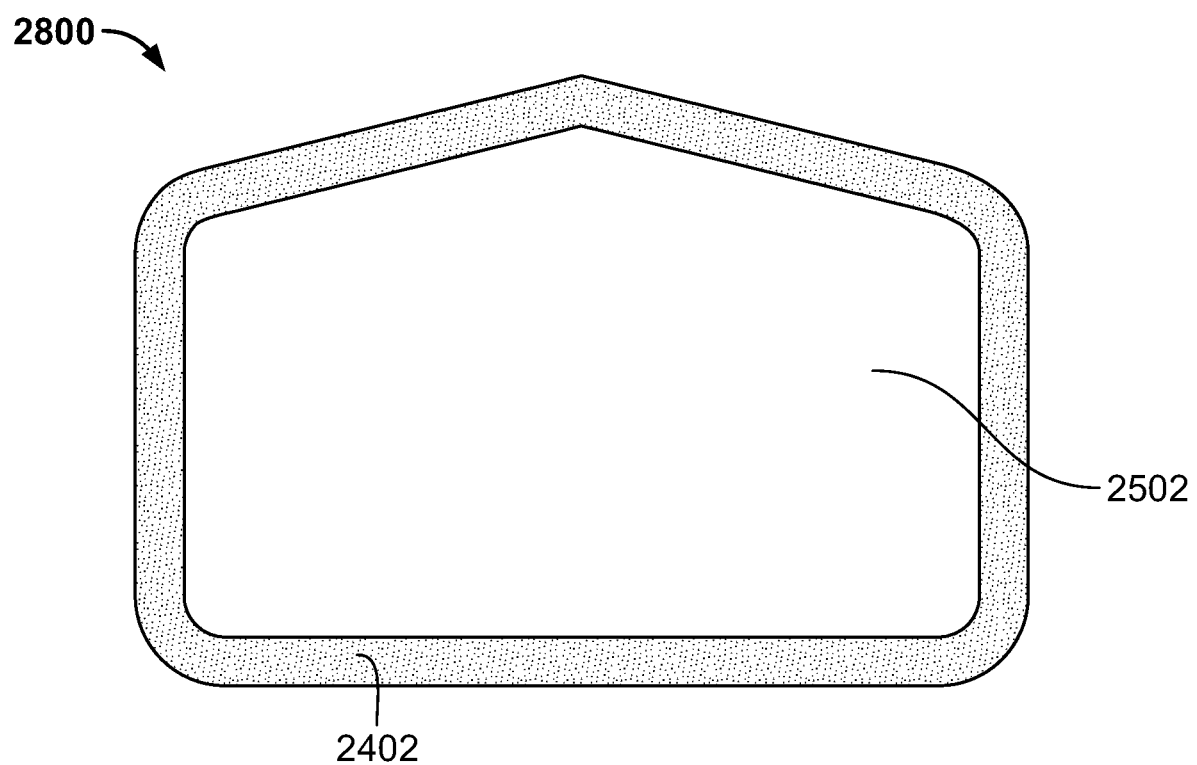

Following the heating and expansion of the bladder 2504 that mold 2500 may be cooled in order to allow the resin on and/or within the wrapped carbon fiber tape 2402 to solidify. The bladder 2504 is deflated and may be removed from the cavity 2502 in order reveal the molded hockey stick shaft. FIG. 28 schematically depicts one example of molded hockey stick shaft 2800, similar to one or more of shafts 102, 502, and 1402. As depicted the bladder 2504 has been removed in order to reveal the internal cavity 2502 that extends along at least a portion of a longitudinal length of the shaft 2800.

As previously described, the use of non-standard geometry in the cross-section of a hockey shaft (i.e. geometry that is not rectangular or rounded rectangular) the hockey shaft may have its flexural rigidity increased by increasing the value of the second moment of inertia, I (see, e.g., Equation 1). By using cross-sectional geometries that vary along the length of the hockey stick shaft (e.g., along the longitudinal length 504 of shaft 502, and/or the longitudinal length 1404 of shaft 1402, otherwise referred to as the shaft lengths 504 and 1404), the flexural rigidity or bending stiffness of a given shaft can vary at different points along the shaft. FIGS. 5-13 and FIGS. 14-23 depict examples of five-sided and seven-sided cross-sectional shaft geometries. It is contemplated, however, that the specific geometries may be varied beyond those described in FIGS. 5-13 and FIGS. 14-23, without departing from the scope of these disclosures.

Further advantageously, the use of cross-sectional geometries that vary along the length of a stick shaft (e.g., along the longitudinal length 504 of shaft 502, and/or the longitudinal length 1404 of shaft 1402) may allow the position of a kick point of a shaft to be specified for a given shaft. As such, it is contemplated that the structures and processes described herein for the production of a hockey stick shafts having variable cross-sectional geometries may be used to position the kick point at any location along a hockey stick, such as hockey stick 100 and/or 400.

Figure 29:
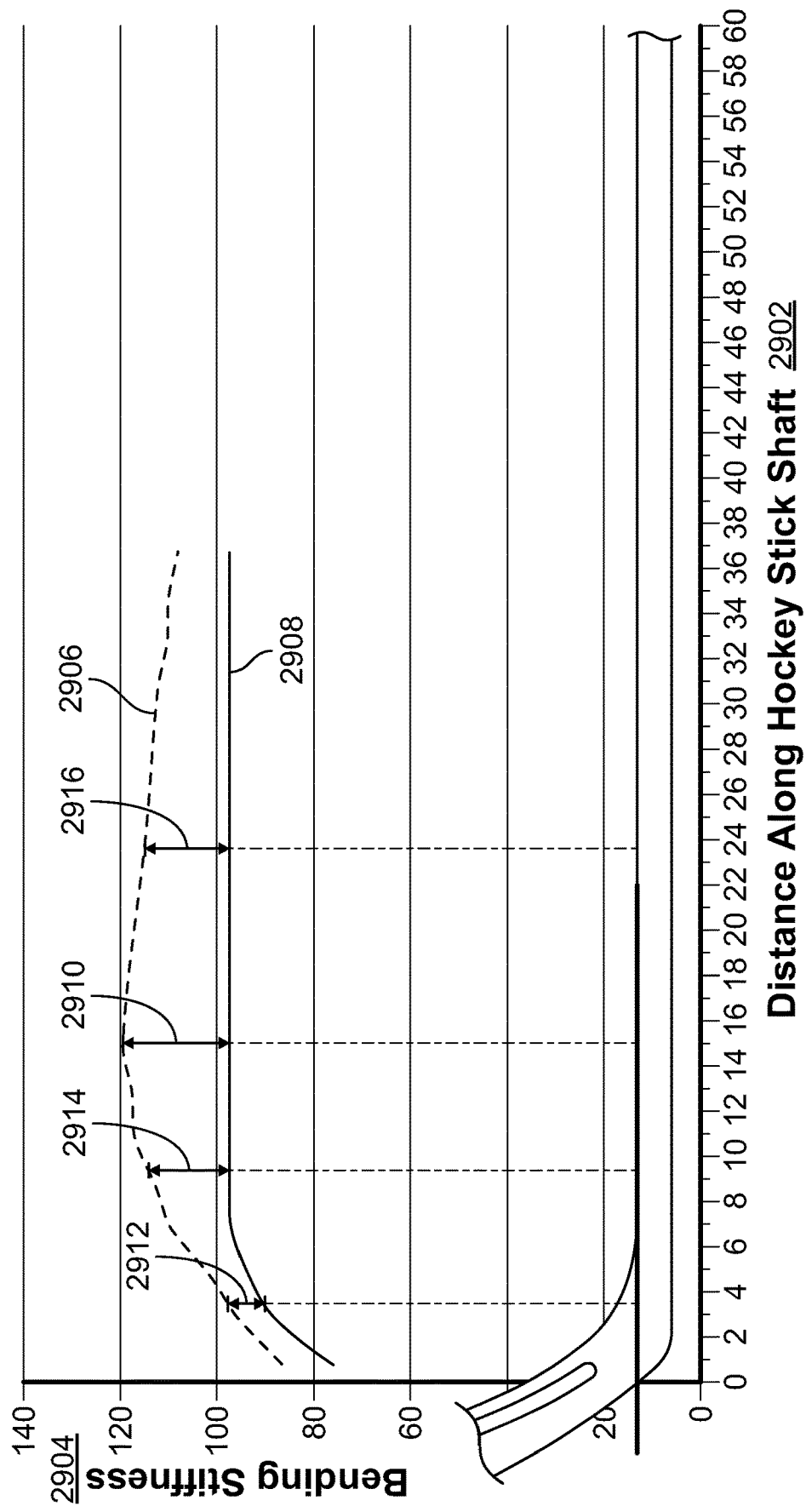
FIG. 29 graphs the bending stiffness of a five-sided hockey stick shaft compared to a conventional hockey stick shaft having a uniform rectangular cross-sectional geometry, according to one or more aspects described herein.

FIG. 29 depicts the bending stiffness of the five-sided hockey stick shaft 502 compared to a conventional hockey stick shaft having a uniform rectangular cross-sectional geometry. In particular, graph 2908 depicts how the bending stiffness (y-axis, 2904) varies along the hockey stick shaft length (x-axis, 2902) for a conventional hockey stick shaft having a uniform rectangular cross-sectional geometry.

Graph 2906 depicts how the bending stiffness (y-axis, 2904) varies along the hockey stick shaft length (x-axis, 2902) for the hockey stick shaft 502 of FIG. 5 having pentagonal cross-sectional geometries. In one example, FIG. 29 schematically depicts that the bending stiffness of the pentagonal cross-sectional geometry of shaft 502 represented in graph 2906 may be increased over that of the conventional hockey stick shaft cross-sectional geometry represented in graph 2908 by the difference indicated as 2910. In one example, the variable bending stiffness depicted in graph 2906 may result from a variable shaft geometry, and hence, second moment of inertia, along the shaft length. As such, a first portion of a hockey stick shaft may have a first cross-sectional geometry associated with a first bending stiffness and a second portion of the hockey stick shaft may have a second cross-sectional geometry associated with a second bending stiffness. In one example, a maximum increase in bending stiffness 2910 may be at least 20% or at least 25%. In another example, the increase in bending stiffness 2910 may range between 0% and 40% along the length of the hockey stick shaft.

In another example, a first portion of a hockey stick shaft, such as shaft 502, may have a first bending stiffness, which may be increased over a conventional stick shaft by amount 2912. In one implementation, the amount 2912 may range between 0 and 20%. A second portion of the hockey stick shaft, such as shaft 502, may have a second bending stiffness, which may be increased over a conventional stick shaft by amount 2914. In one implementation, the amount 2914 may range between 0 and 30%. A third portion of the hockey stick shaft, such as shaft 502, may have a third bending stiffness, which may be increased over a conventional stick shaft by amount 2910. In one implementation, the amount 2916 may range between 0 and 40%. A fourth portion of the hockey stick shaft, such as shaft 502, may have a fourth bending stiffness, which may be increased over a conventional stick shaft by amount 2916. In one implementation, the amount 2916 may range between 0 and 35%.

Figure 30:
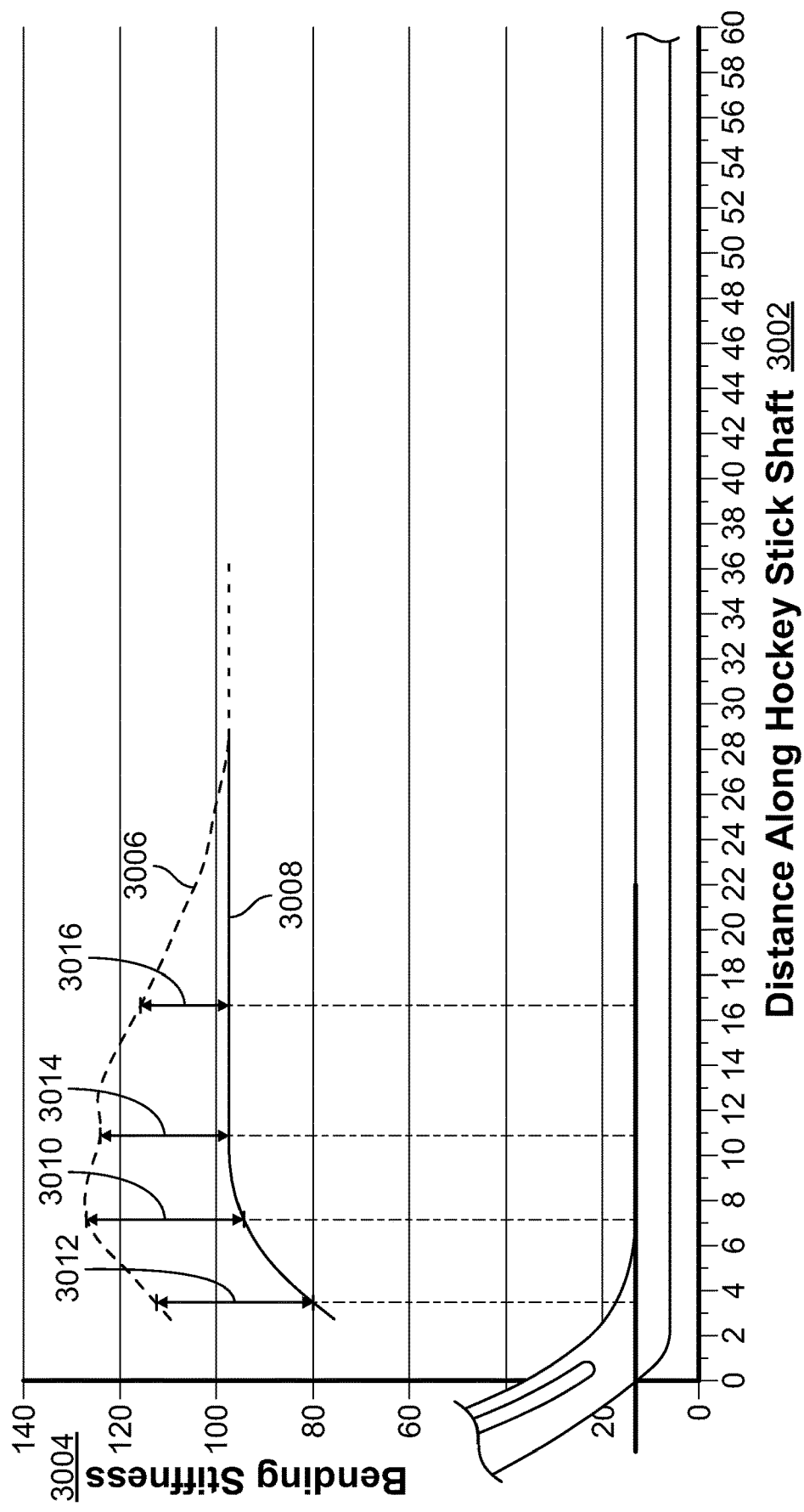
FIG. 30 graphs the bending stiffness of a seven-sided hockey stick shaft compared to a conventional hockey stick shaft having a uniform rectangular cross-sectional geometry, according to one or more aspects described herein.

FIG. 30 depicts the bending stiffness of the seven-sided hockey stick shaft 1402 compared to a conventional hockey stick shaft having a uniform rectangular cross-sectional geometry. In particular, graph 3008 depicts how the bending stiffness (y-axis, 3004) varies along the hockey stick shaft length (x-axis, 3002) for a conventional hockey stick shaft having a uniform rectangular cross-sectional geometry. Graph 2906 depicts how the bending stiffness (y-axis, 3004) varies along the hockey stick shaft length (x-axis, 3002) for the hockey stick shaft 1402 of FIG. 14 having heptagonal cross-sectional geometries. In one example, FIG. 30 schematically depicts that the bending stiffness of the heptagonal cross-sectional geometry of shaft 1402 represented in graph 3006 may be increased over that of the conventional hockey stick shaft cross-sectional geometry represented in graph 3008 by the difference indicated as 3010. In one example, the variable bending stiffness depicted in graph 3006 may result from a variable shaft geometry, and hence, second moment of inertia, along the shaft length. As such, a first portion of a hockey stick shaft may have a first cross-sectional geometry associated with a first bending stiffness and a second portion of the hockey stick shaft may have a second cross-sectional geometry associated with a second bending stiffness. In one example, this maximum increase in bending stiffness 3010 may be at least 25%, or at least 30%. In another example, the increase in bending stiffness 3010 may range between 0% and 40% along the length of the hockey stick shaft.

In another example, a first portion of a hockey stick shaft, such as shaft 1402, may have a first bending stiffness, which may be increased over a conventional stick shaft by amount 3012. In one implementation, the amount 3012 may range between 0 and 35%. A second portion of the hockey stick shaft, such as shaft 1402, may have a second bending stiffness, which may be increased over a conventional stick shaft by amount 3010. In one implementation, the amount 3010 may range between 0 and 50%. A third portion of the hockey stick shaft, such as shaft 1402, may have a third bending stiffness, which may be increased over a conventional stick shaft by amount 3014. In one implementation, the amount 3014 may range between 0 and 40%. A fourth portion of the hockey stick shaft, such as shaft 1402, may have a fourth bending stiffness, which may be increased over a conventional stick shaft by amount 3016. In one implementation, the amount 3016 may range between 0 and 35%.

Figure 31:
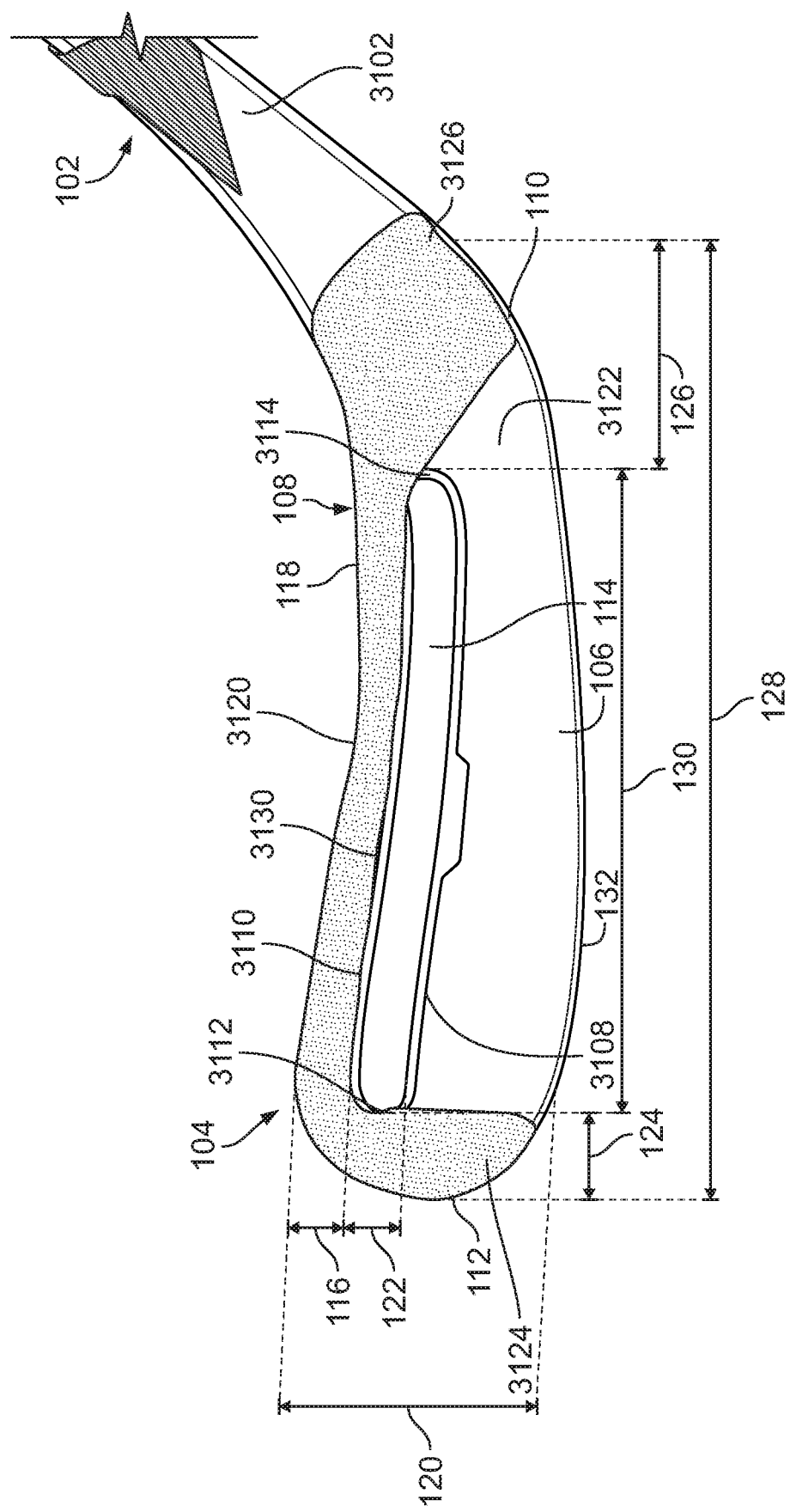
FIG. 31 schematically depicts another view of a hockey stick blade structure, according to one or more aspects described herein.

FIG. 31 schematically depicts another view of the hockey stick blade structure 104, according to one or more aspects described herein. As depicted, the molded blade structure 104 may be coupled to an end 3102 of a stick shaft 102. In one example, this end 3102 may be referred to as a proximal end 3102 of the stick shaft 102. The second end 3104 of shaft 102 is depicted in FIG. 1, and may be referred to as a distal end 3104.

The molded blade structure 104 may include a top edge 118 that is spaced apart from a bottom edge 132 by a blade height 120. Additionally, the blade structure 104 may include a heel 110 spaced apart from a toe 112 by a blade length 128. Further, the blade structure 104 may include a front face 106 that is spaced apart from a back face 108 (not depicted in FIG. 31) by a blade thickness (not depicted in FIG. 31). It is contemplated that any of the dimensions described throughout this disclosure may have any values. Further, indicated lengths are merely schematic representations, and the start and end points of the depicted dimensions may vary from those depicted in the accompanying figures. Additionally, a given dimension, such a thickness of the blade structure 104, may be non-uniform. For example, a thickness of the blade structure 104 may vary along the blade height 120, and/or along the blade length 128, without departing from the scope of these disclosures.

The blade structure 104 additionally includes a slot 114, which forms an aperture that extends through the blade thickness between the front face 106 and the back face 108. The slot 114 has a length 130 and a height 122. Additionally, the slot has a bottom edge 3108, a top edge 3110, a toe end 3112, and a heel end 3114. As depicted, the slot 114 has rounded toe end 3112 and heel end 3114. However, alternative end geometries may be utilized, such as square ends, among others.

Advantageously, the slot 114 allows the blade structure 104 to exhibit enhanced flexing and energy transfer capabilities. In particular, the slot allows the blade structure 104 to have flexing characteristics similar to a "slingshot" during a shooting or other puck-striking (or ball-striking) motion. In one example, the slot 114 separates a first area (portion) of the blade structure 104 that has a first stiffness from a second area (portion) of the blade structure 104 that has a second stiffness. In one example, the differential is blade stiffness across the blade height 120, facilitated by the presence of the slot 114, allows the blade to behave in a manner comparable to a slingshot, and result in more energy being transferred to the puck/ball. When described herein, the comparatively stiffer portion 3120 may be comparatively stiffer than an equivalent area of a hockey stick blade that does not include a slot 114. Similarly, the comparatively more flexible portion 3122 may be comparatively more flexible than an equivalent area of a hockey stick blade that does not include a slot 114. Accordingly the comparatively stiffer portion of the blade structure 104 may brace against the flexing of the comparatively less stiff portion of the blade structure 104 during a shooting action. As such, the interaction between the comparatively stiff and flexible portions of the blade structure 104 may result in more energy being transferred to a puck/ball, when compared to a conventional hockey stick blade implementation. In turn, this increased energy transfer may result in faster puck/ball motion.

FIG. 31 schematically illustrates the stiffened top portion 3120 and the flexible bottom portion 3122 of the blade structure 104. In the depicted implementation, the blade structure 104 includes two areas (portions 3120 and 3122) having differing stiffness characteristics. However, in alternative implementations, the blade structure 104 may be broken up into additional areas with additional stiffness characteristics. As depicted, the stiffened top portion 3120 extends along the full blade length 128 between the heel 110 and the toe 112. Additionally, the stiffened top portion 3120 includes a toe portion 3124 that extends between the top edge 118 and the bottom edge 132 at the toe 112 of the blade structure 104, and a heel portion 3126 that extends substantially between the top edge 118 and the bottom edge 132 at the heel 110 of the blade structure 104.

The slot 114 may additionally include an edge reinforcing material 3130 that extends around a perimeter of the slot 114. In one example, the edge reinforcing material 3130 is formed by adding one or more additional layers of fiber material around the perimeter of the slot 114 prior to molding of the blade structure 104.

Figure 32:
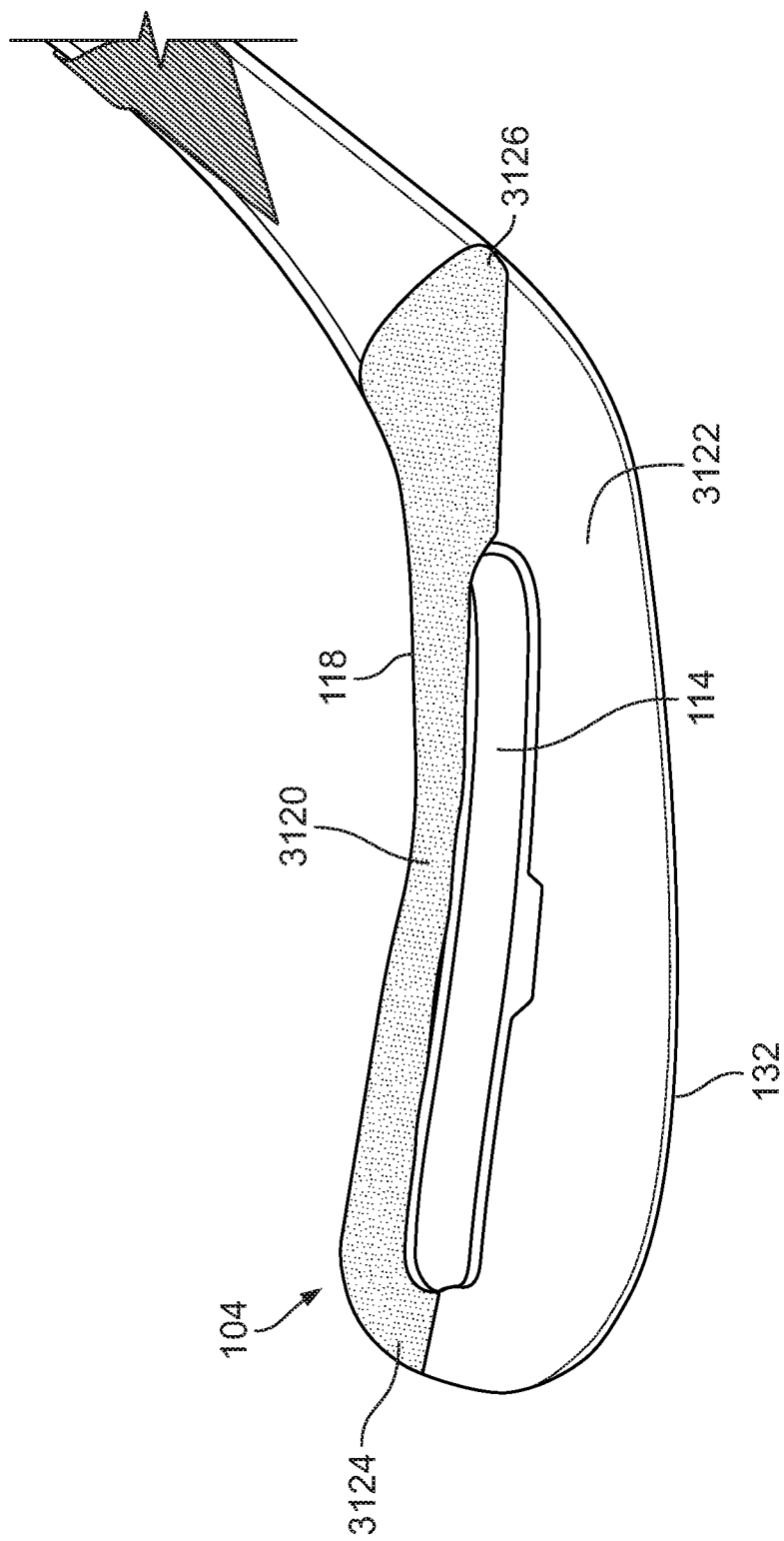
FIG. 32 schematically depicts another implementation of a blade structure that has a stiffened top portion, a flexible bottom portion, and a slot, according to one or more aspects described herein.

It is noted that the schematic geometries of the stiffened top portion 3120 and the flexible bottom portion 3122 depicted in FIG. 31 are merely one example configuration of the blade structure 104 that has areas of differing stiffness separated by the slot 114. Indeed, FIG. 32 schematically depicts another example implementation of the blade structure 104 having a stiffened top portion 3120, a flexible bottom portion 3122, and a slot 114 separating at least a portion of those areas 3120 and 3122 from one another. As depicted, the stiffened top portion 3120 and the flexible bottom portion 3122 have different geometries to those depicted in FIG. 31. In particular, the toe portion 3124 of the stiffened top portion 3120 extends only partially between the top edge 118 and the bottom edge 132. Similarly, the heel portion 3126 extends only partially between the top edge 118 and the bottom edge 132.

Figure 33:
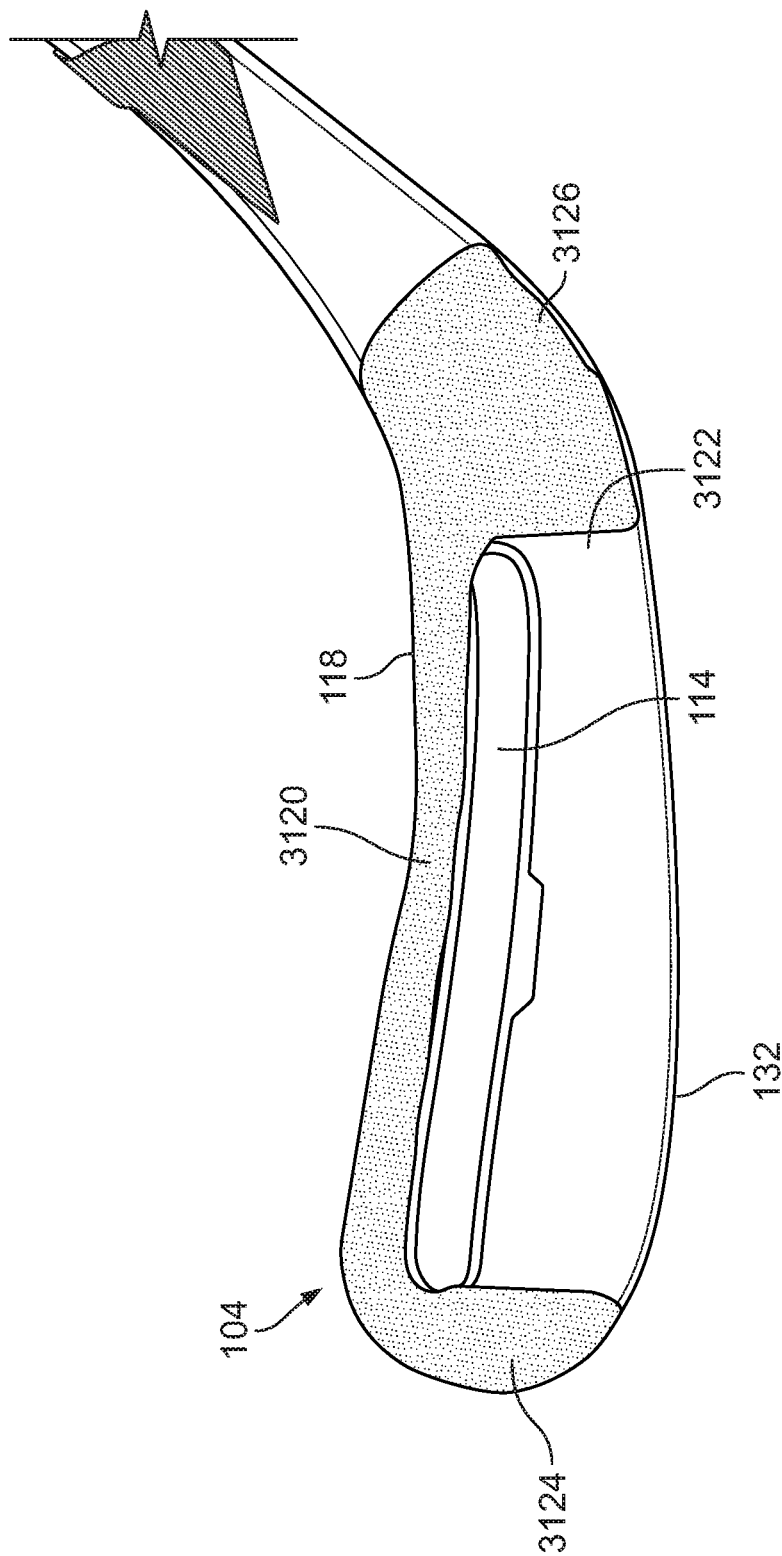
FIG. 33 schematically depicts another implementation of a blade structure that has a stiffened top portion, a flexible bottom portion, and a slot, according to one or more aspects described herein.

FIG. 33 schematically depicts another example implementation of the blade structure 104 having a stiffened top portion 3120, a flexible bottom portion 3122, and a slot 114 separating at least a portion of those areas 3120 and 3122 from one another. In particular, FIG. 33 depicts the stiffened top portion 3120 as having a larger heel portion 3126 than that depicted in FIG. 31 and FIG. 32. Accordingly, it will be appreciated that the geometries of the top portion 3120 and the bottom portion 3122 depicted in FIGS. 31-33 merely represent a limited number of possible variations in the size and shape of the portions 3120 and 3122. It is contemplated that any geometries of these portions 3120 and 3122 may be utilized, without departing from the scope of these disclosures.

In one example, the hockey stick blade structure 104 includes the described stiffened top portion 3120 and flexible bottom portion 3122. As such, the stiffened top portion 3120 may have a stiffness that is comparatively higher than the flexible bottom portion 3122. In another example, the bottom portion 3122 may have a comparatively higher stiffness than the top portion 3120. Accordingly, the stiffness of the flexible bottom portion 3122 may be higher than that of the stiffened top portion 3120. However, the flexible bottom portion 3122 may have a stiffness that is still lower than an equivalent area of a hockey stick blade that does not include a slot 114. Similarly, the stiffened top portion 3120 may have a stiffness value that is lower than the flexible bottom portion 3122, but comparatively higher than an equivalent area of a hockey stick blade structure that does not include a slot 114.

Figure 34:
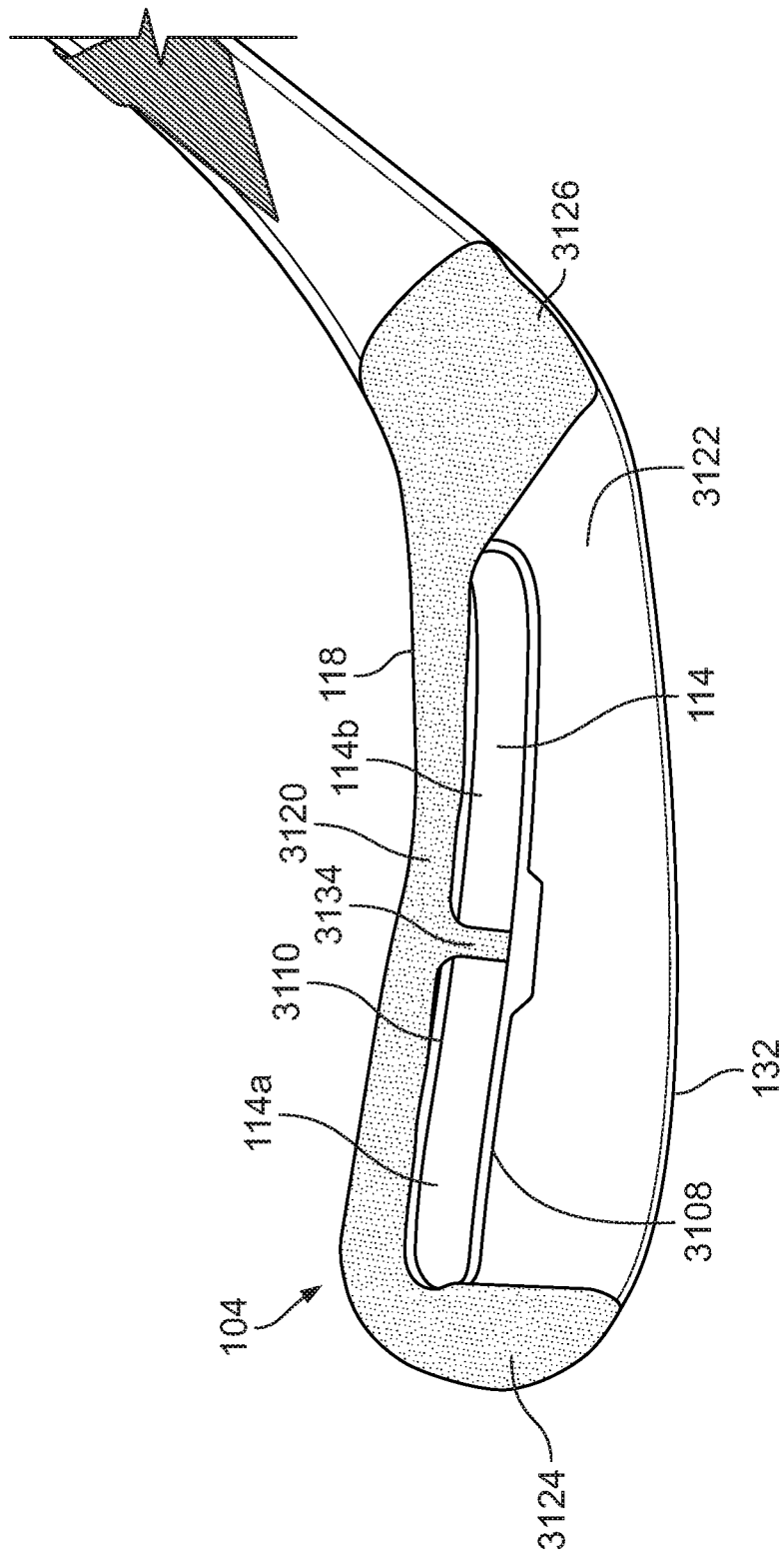
FIG. 34 schematically depicts another implementation of a blade structure that includes a slot support element, according to one or more aspects described herein.

In another implementation, and as schematically depicted in FIG. 34, the hockey stick blade structure 104 may include a slot support element 3134 that extends through the slot 114. This slot support element 3134 may serve to reinforce the blade structure 104. In one example, the slot support arm 3134 is connected between the top edge 3110 and the bottom edge 3108 of the slot 114. As schematically depicted in FIG. 34, the slot support element 3134 may form part of the stiffened top portion 3120 of the blade structure 104. As such, the slot support element 3134 may be formed from materials similar to the rest of the stiffened top portion 3120. In particular, the slot support element 3134 may include a foam core onto which one or more layers of fiber tape are layered and molded. Additionally or alternatively, the slot support element 3134 may be formed of a solid material (such as a metal, alloy, polymer, fiber-reinforced material, or combination thereof, among others). However, in an alternative implementation, the slot support element 3134 may form part of the flexible bottom portion 3122. As depicted, the slot support element 3134 divides the slot 114 into two portions: a toe slot portion 114a and a heel slot portion 114b. In alternative implementations, additional slot support elements, similar to element 3134, may be utilized, without departing from the scope of these disclosures.

FIG. 35 schematically depicts an alternative implementation of a hockey stick blade structure 104. In particular, FIG. 35 schematically depicts slot tie elements 3140a and 3140b that connect the top edge 3110 to the bottom edge 3108 of the slot 114. The slot tie elements 3140a and 3140b may be formed from one or more of a fiber-reinforced material, a metal, an alloy, or a polymer, among others. The depicted slot tie elements 3140a and 3140b are merely one exemplary implementation, and different geometries may be utilized, without departing from the scope of these disclosures. In one example, the slot tie elements 3140a and 3140b do not form part of the stiffened top portion 3120 or the flexible bottom portion 3122 of the blade structure 104. The slot tie elements 3140a and 3140b may be utilized to prevent the slot 114 from excessive deformation during a shot motion. As depicted in FIG. 35, the blade structure 104 includes two slot tie elements 3140a and 3140b that divides the slot 114 into three portions: 114a, 114b, and 114c. However, the blade structure 104 may use a single slot tie element, or three or more slot tie elements, without departing from the scope of these disclosures.

FIG. 36 depicts the hockey stick blade structure 104 with a schematic cutting plane between arrows 37-37. This cutting plane corresponds to the cutting plane of the cross section depicted in FIG. 37.

FIG. 37 depicts a cross-sectional view of the hockey stick blade structure 104 along the cutting plane depicted in FIG. 36. Further, FIG. 37 depicts the hockey stick blade structure 104 after it has been molded. Accordingly, FIG. 37 depicts a cross-sectional view of the stiffened top portion 3120 and the flexible bottom portion 3122, separated by the slot 114. In one example, the front face 106 of the hockey stick blade structure 104 separated from the back face 108 by a blade thickness 3702. It is contemplated that this blade thickness 3702 may have any value. Additionally, it is contemplated that the blade thickness 3702 will vary across the blade height 120 and/or blade length 128. In one example, the blade structure 104 includes a foam core. This foam core may include two foam core portions 3704 and 3706. In alternative implementations, a single foam core portion, or three or more portions may be used, without departing from the scope of these disclosures. In one example, a top foam core portion 3704 may form the core of the stiffened top portion 3120, and a bottom foam core portion 3706 a form the core of the flexible bottom portion 3122. The hockey stick blade structure 104 may be formed by layering fiber reinforced material (e.g., carbon fiber tape that may be preimpregnated with resin, or may have resin separately applied) onto the foam cores 3704 and 3706. In order to stiffen the top portion 3120 of the blade structure 104, additional layers of fiber material may be added to the top portion 3120. As such, the top portion 3120 may have a greater sidewall thickness than the bottom portion 3122. Additionally, the stiffness differential between the stiffened top portion 3120 and the flexible bottom portion 3122 may result from the larger cross-sectional area of the flexible bottom portion 3122. As previously described, the perimeter of the slot 114 may be reinforced with an edge reinforcing material 3130. This edge reinforcing material 3130 may include one or more additional layers of fiber-reinforced material when compared to the sidewalls of the front face 106 and back face 108. These additional layers may result in an increased sidewall thickness, and comparatively higher strength and/or hardness at the edge of the slot 114.

Figure 38:
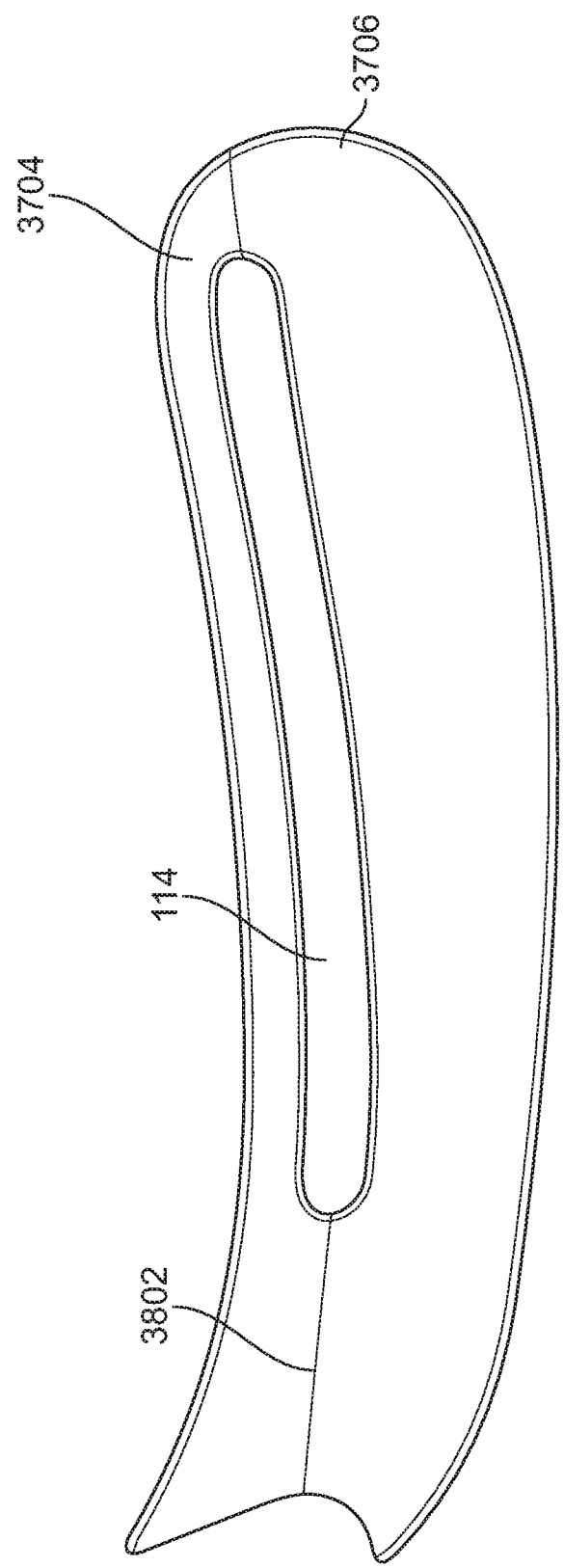
FIG. 38 depicts two foam core portions that are used in a hockey stick blade structure, according to one or more aspects described herein.
Figure 39:
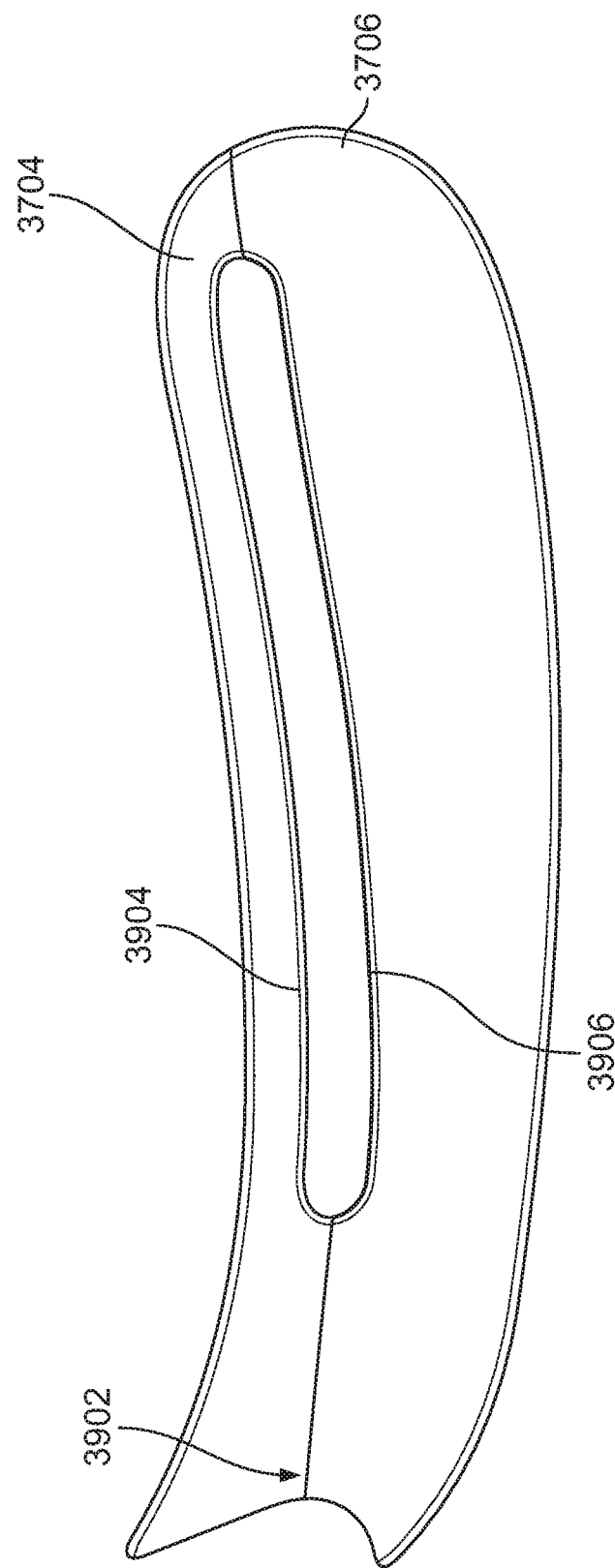
FIG. 39 schematically depicts abridge element between two foam core portions that are used in a hockey stick blade structure, according to one or more aspects described herein.

FIG. 38 depicts two foam core portions that are used in the hockey stick blade structure 104. As depicted, when the top foam core portion 3704 is positioned proximate the bottom foam core portion 3706, the geometries of the foam core portions include an aperture for the slot 114. Seam 3802 represents the intersection of the top foam core portion 3704 with the bottom foam core portion 3706. In order to couple the top foam core portion 3704 to the bottom foam core portion 3706, a bridge is positioned between the foam core portions 3704 and 3706 along the seam 3802. This bridge is schematically depicted in FIG. 39 as element 3902, and may be formed from one or more layers of a fiber-reinforced material that extend between the foam core portions 3704 and 3706. In one example implementation, one or more top bridge fiber layers 3904 of fiber-reinforced material are positioned between the foam core portions 3704 and 3706 along the top foam core portion 3704, and one or more bottom bridge fiber layers 3906 of fiber-reinforced material are positioned between the between the foam core portions 3704 and 3706 along the bottom foam core portion 3706. Additionally or alternatively, a bridge structure may be formed between the foam core portions 3704 and 3706 using an adhesive or an epoxy (including an epoxy strip or epoxy core), among others. Further, a bridge structure may be formed between the foam core portions 3704 and 3706 using one or more materials in addition to or as an alternative to the fiber-reinforced material described above. These additional or alternative materials may include one or more polymers, ceramics, metals or alloys, among others. Subsequently, additional layers of fiber-reinforced material may be added to the foam core portions 3704 and 3706 and this pre-mold structure, otherwise referred to as a wrapped preform blade structure, may be molded to form the final geometry of the blade structure 104. It is contemplated that the foam core portions 3704 and 3706 may be formed of any foam material with any foam density. In another example, the blade structure 104 may be constructed without the seam 3802 and bridge structure. Alternatively, the blade structure 104 may be constructed with the seam 3802, but without the bridge structure. The blade structure 104 may alternatively include a partially or fully hollow core, such that one or more of the foam core potions 3704 and 3706 are not utilized. Accordingly, the blade structure 104 may be constructed by wrapping fiber-reinforced material around an inflatable bladder element. As such, the bladder element may be inflated during a molding process to urge the sidewalls of the blade structure 104 to conform to the geometries of the mold. The bladder may be removed or deflated and left within the molded blade structure 104 after one or more molding processes have been completed.

Figure 40:
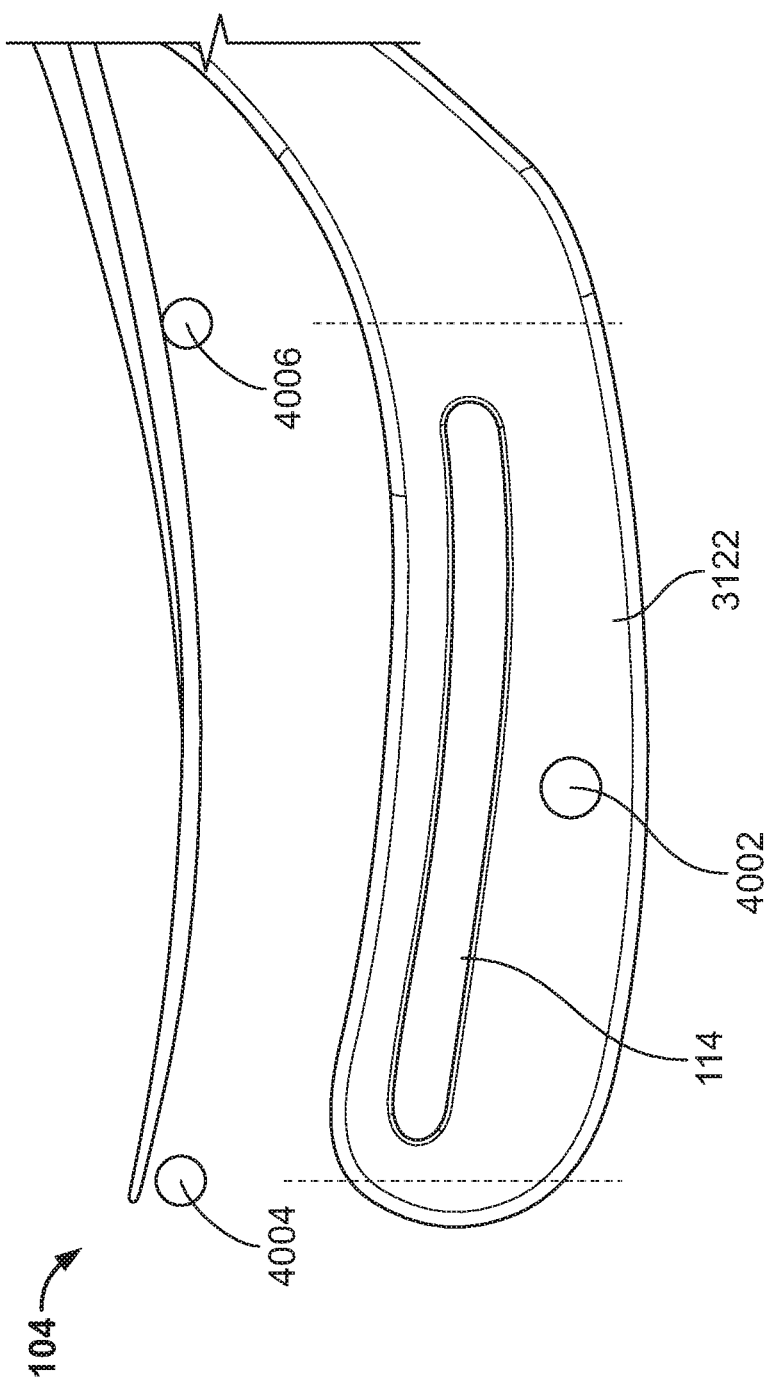
FIG. 40 schematically depicts a plan and an elevation view of a first bending test carried out on a hockey stick blade structure, according to one or more aspects described herein.
Figure 41:
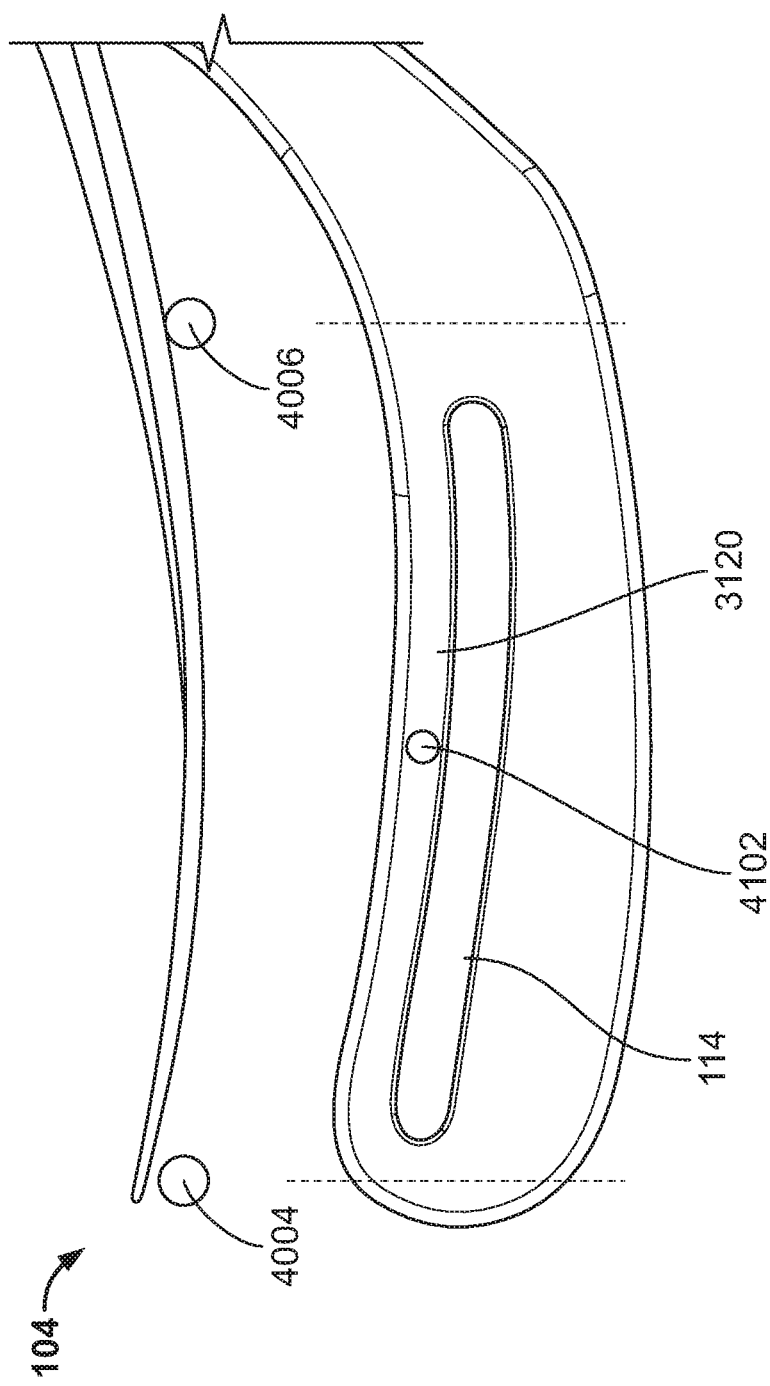
FIG. 41 schematically depicts a plan and an elevation view of a second bending test carried out on a hockey stick blade structure, according to one or more aspects described herein.
Figure 42:
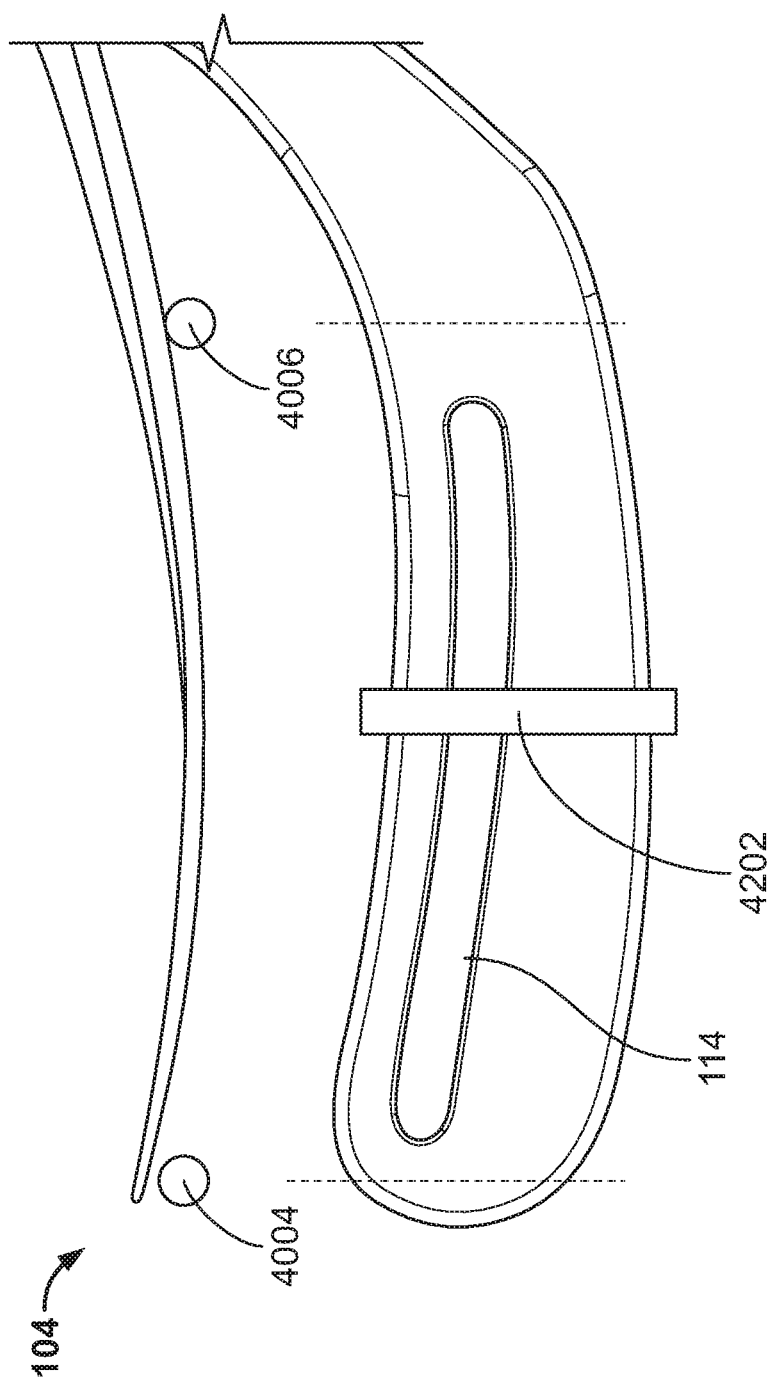
FIG. 42 schematically depicts a plan and an elevation view of a third bending test carried out on a hockey stick blade structure, according to one or more aspects described herein.

FIGS. 40-42 schematically depict tests performed on the blade structure 104 that includes a slot 114 to determine the bending/stiffness characteristics of the blade 104 when compared to a conventional stick blade that does not include a slot. In particular, three different types of bending tests were carried out. The first test is schematically depicted in FIG. 40, and is a measurement of the force required to give rise to a 5 mm displacement of the flexible bottom portion 3122 of the blade structure 104. Specifically, FIG. 40 depicts a plan and elevation view of the blade structure 104. Elements 4004 and 4006 represent support points, and element 4002 is the point at which a force is applied to the flexible bottom portion 3122 to result in a displacement of the flexible bottom portion 3122 by 5 mm.

FIG. 41 schematically depicts a plan and an elevation view of a second bending test carried out on the blade structure 104. In particular, FIG. 41 schematically depicts a test of the force required to displace the stiffened upper portion 3120 by 5 mm. In this case, the force is applied at point 4102.

FIG. 42 schematically depicts a plan and an elevation view of a third bending test carried out on the blade structure 104. In particular, FIG. 42 schematically depicts a test of the force required to displace the whole blade 104 by 5 mm. In this case, the force is applied along line 4202.

The testing results of the bending tests carried out on the blade structure 104 that includes a slot 114 are compared to testing results of a conventional hockey stick blade structure that does not include a slot. In this regard, the flexible bottom portion 3122 is found to have a stiffness that is approximately 3% lower than an equivalent area of a hockey stick blade structure that does not include a slot 114. In another example, the flexible bottom portion 3122 is found to have a stiffness that is lower than an equivalent area of a hockey stick blade structure that does not include a slot 114, with the comparative decrease in stiffness ranging between 0% and 15%. The testing described in relation to FIG. 41 indicated that the stiffened top portion 3120 has a stiffness that is approximately 11% higher than an equivalent area of a hockey stick blade structure that does not include a slot 114. In another example, the stiffened top portion 3120 is found to have a stiffness that is higher than an equivalent area of a hockey stick blade structure that does not include a slot 114, with the comparative increase in stiffness ranging between 5% and 25%. The testing described in relation to FIG. 42 indicated that the whole blade structure 104 has a stiffness that is approximately 32% higher than an equivalent hockey stick blade structure that does not include a slot 114. In another example, the hockey stick blade structure 104 is found to have a stiffness that is higher than an equivalent area of a hockey stick blade structure that does not include a slot 114, with the comparative increase in stiffness ranging between 25% and 45%. In one example, the stiffness of the flexible bottom portion 3122 may differ from the stiffness of the stiffened top portion 3120 by at least 2%.

FIGS. 43-51F show example hockey stick structures where geometries of the blade structures are altered in order to create variations in the stiffnesses of the blades. In one example, the blade can have a variable stiffness profile along the blade length and height by modifying the geometry of the cross-section. And the second moment of area (otherwise referred to as second moment of inertia and area moment of inertia) of the cross-section of the blade can be increased or decreased instead of modifying the material modulus of the blade structure.

By way of background and consistent with the discussion herein, a hockey stick blade can be approximated to a beam solicited in flexion, torsion and impact. During a shot the blade will hit the puck. It may be desirable to expulse the puck as fast as possible from the blade to increase the puck acceleration and/or speed. The material mechanic behind beams in flexion is driven by the material stiffness, the shape of the cross-section and its second moment of area (geometry), the length in between supports, the type of supports, for example, fixed, allowing translation, rotations, etc., and a force applied, for example, the location and intensity. In order to modify the hockey stick blade, the material and geometry can be altered in order to affect the stiffness of the blade.

In one example, the blade may include a slot and, in another example, the blade does not include a slot. In one example, the transitions in between stiffer areas and softer areas along the blade can be smoother. This may also provide a clue to the player of where exactly the stiffest area of the hockey stick blade is.

In addition, the weight of the stick may be reduced. Stiffening or softening the stick can also be accomplished by adding layers of composite material adding small inserts of carbon fibers in specific areas of the blade, adding bridges in certain areas, or by changing the blade core density. These techniques typically increase the homogenized Young's modulus locally. Also blade geometry may be variable in order to elegantly join the shaft to the blade. But modifying the geometry of the cross-section, in certain examples, can allow for the removal of additional layers of composite material, the removal of small inserts of carbon fibers in certain areas, the removal of blade bridges, or the use of less dense cores or foam. This may lead to the reduction of weight for the entire stick and can be desirable to users and athletes and can be a critical performance factor to the game.

In one example, the geometry of the blade is modified in order to increase or decrease the second moment of area of the cross-section, while reducing the mass of the blade. For example, a lower portion of the blade thickness can be reduced in the range of approximately 10% to 60%, and an upper portion of the blade thickness may be increased by approximately 10% to 40% and in one particular example the upper portion of the blade thickness may increase by 25%. In adjusting these parameters, the mass of the blade can, in certain examples, be reduced.

Figure 43:
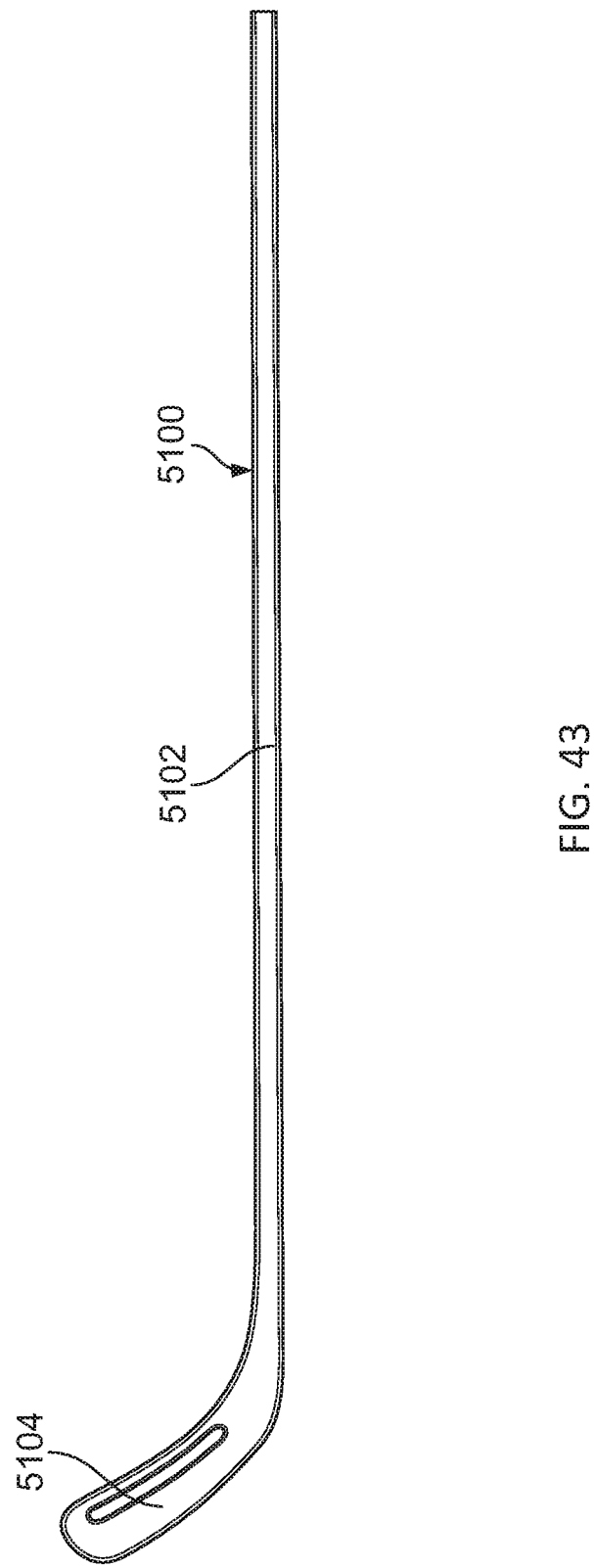
FIG. 43 depicts front side of another example hockey stick structure, according to one or more aspects described herein.

FIG. 43 depicts a front perspective view of a hockey stick structure 5100, according to one or more aspects described herein. The example hockey stick structure 5100 has a shaft structure 5102 rigidly connected to a blade 5104. A stiffness of the blade 5104 varies along the blade height by changing the shape of the blade and changing a second moment of area of the cross-section along the blade height. Like in the above examples, the shaft structure 5102 and the blade structure may be formed of the materials and techniques as are discussed herein.

Figure 44:
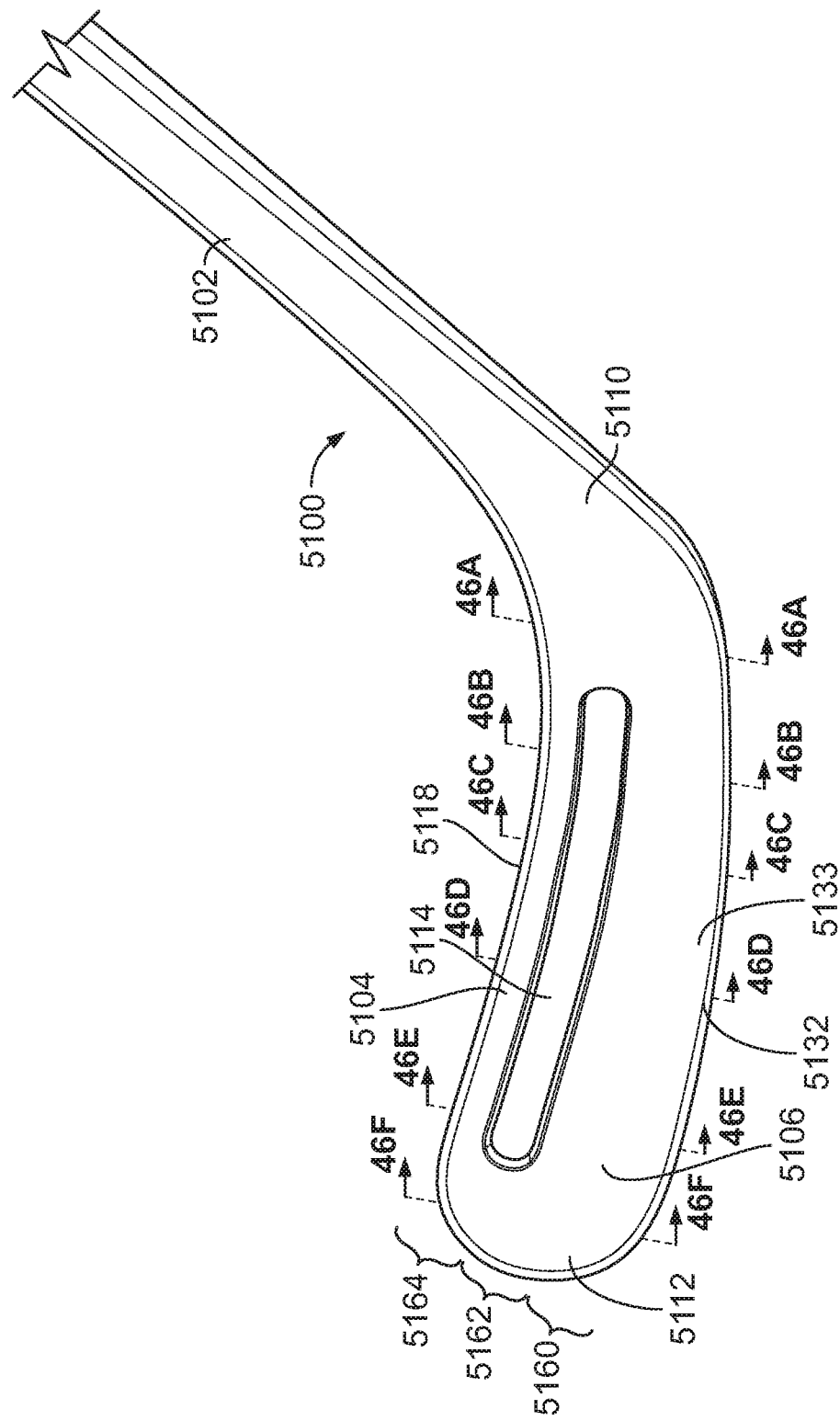
FIG. 44 depicts a more detailed view of a front side of the hockey stick blade structure and a portion of the shaft structure of FIG. 44, according to one or more aspects described herein.
Figure 46D:
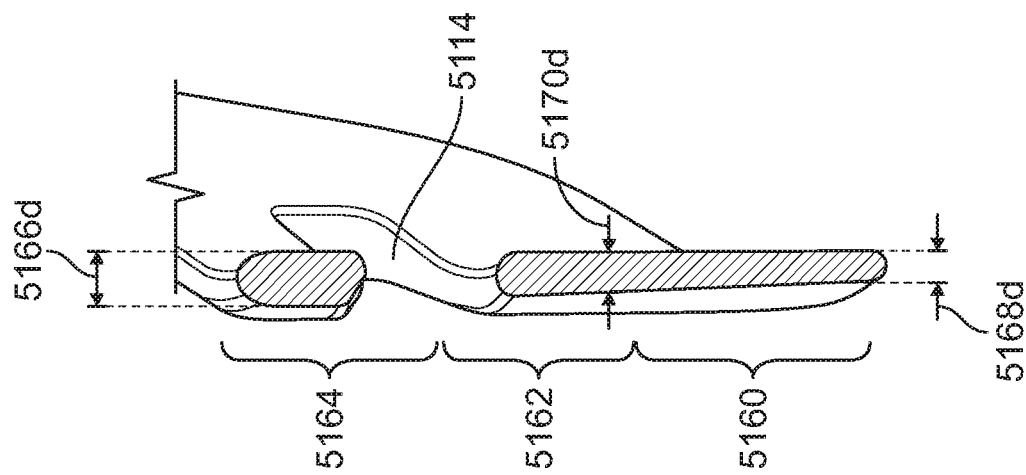
Figure 46C:
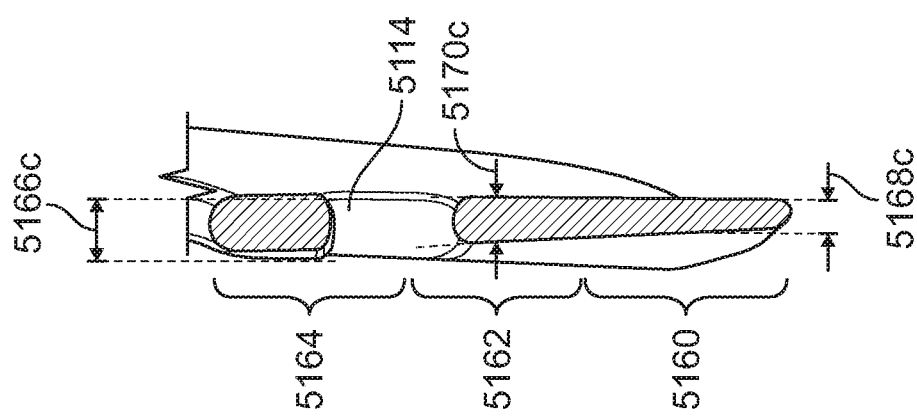
Figure 46E:
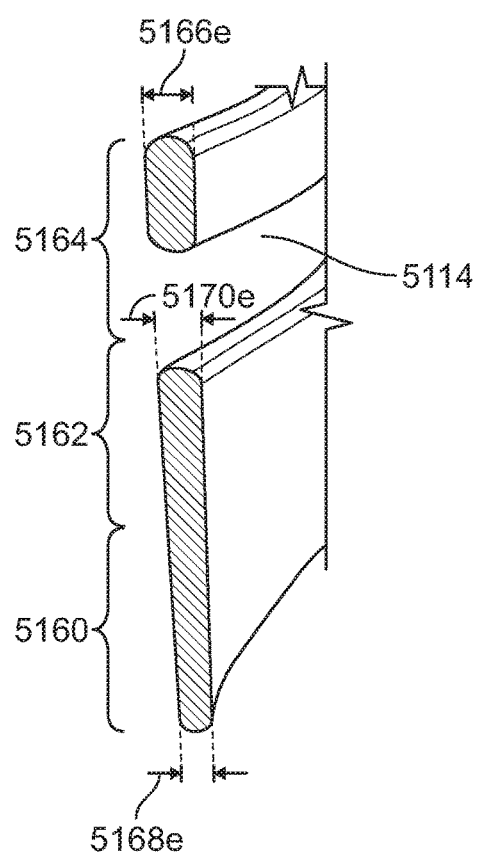
Figure 46F:
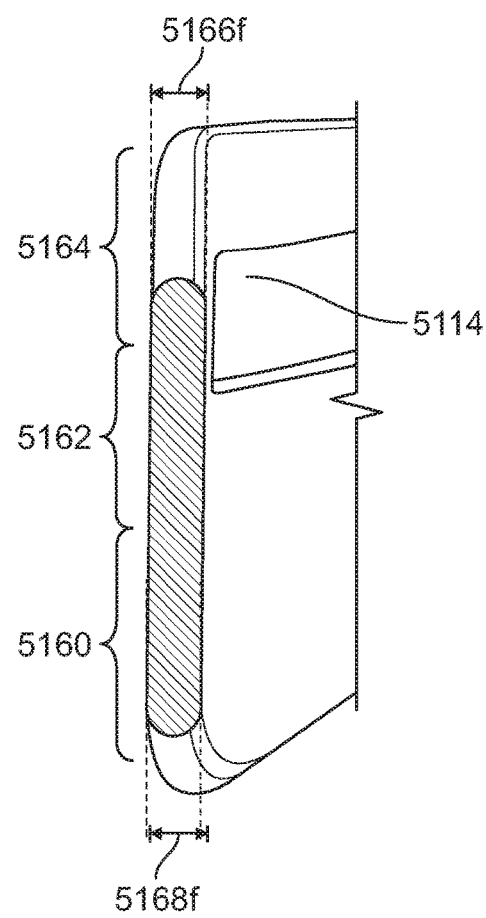

In particular, FIG. 44 depicts a detailed view of a front side of the hockey stick blade structure 5104 and a portion of the shaft structure 5102, according to one or more aspects described herein. Further, FIG. 45 depicts a more detailed view of a back side of the hockey stick blade structure 5104 and a portion of the shaft structure 5102, according to one or more aspects described herein. The hockey stick blade structure 5102 can include a top edge 5118 spaced apart from the bottom edge 5132 by a blade height. A heel 5110 spaced apart from a toe 5112 by a blade length and a front face 5106 spaced apart from a back face 5108. The blade structure 5104 can also generally include a bottom section 5160, a mid-section 5162, and a top section 5164.

Additionally, similar to the examples herein, the blade structure 5104 may include a slot 5114 that extends through the blade 5104 from the front face 5106 to the back face 5108, and extends along a portion of a length of the hockey stick blade structure 5104 between the heel side or end 5110 and the toe side or end 5112 of the blade structure 5104. The slot 5104 and surrounding blade structure may include aspects and functionality in accordance with the examples discussed herein.

In one example, the toe 5112, otherwise referred to as a toe region 5112, may be spaced apart from the heel 5110, otherwise referred to as a heel region 5110, by a central region 5133 along a length of blade structure 5104. As described in further detail below, FIGS. 46A to 46F show cross-sections of the example blade structure 5104 from the heel section 5110 of the blade structure 5104 to the toe section 5112. Accordingly, the position of the cross-sections depicted in FIGS. 46A to 46F are denoted by arrows 46A-46A, 46B-46B, 46C-46C, 46D-46D, 46E-46E, 46F-46F in FIG. 44. In one example, a second moment of area of the cross-sectional geometry of the blade structure 5104 may vary along the blade length. In one example, the blade structure 5104 may have a first value of a second moment of area at the heel section 5110 corresponding to cross-sections 46A-46A and 46B-46B, a second value of a second moment of area at a central region 5133 corresponding to one or more of cross-sections 46C-46C and 46D-46D, and a third value of a second moment of area at a toe region 5112 corresponding to one or more of cross-sections 46E-46E and 46F-46F. In one example, the second value of the second moment of area at the central region of the blade structure 5104 may be less than the second moment of area values at the heel region 5110 and toe region 5112. Accordingly, this central region 5133 may have a geometry that is more flexible that the heel region 5110 and toe region 5112. In addition, the second moment of area of the cross-sectional geometry of the blade structure 5104 may vary along the blade height in addition to the blade length. As such, a bottom section 5160 of the central region 5133 may have a second moment of area that is less than a top section 5164 of the central region 5133. Specifically, the structure of the blade above the slot 5114 may have comparatively higher rigidity than the portion of the blade below the slot 5114. As such, the top section 5164 of the central region 5133 may brace against the flexing of the bottom section 5160 of the central region 5133. It is contemplated that the variation of the second moment of area along the blade length and blade height of the blade structure 5104 may have any pattern or values. For example, a second moment of area of the heel region 5110 may be higher than the second moment of area of both the central region 5133 and the toe region 5112. In another example, a second moment of area of the heel region 5110 may be higher than the second moment of area of the central region 5133 and less than a second moment of area of the toe region 5112. Further, the blade structure 5104 may have at least six distinct second moment of area regions corresponding to a top section 5164 and a bottom section 5160 of heel region 5110, a top section 5164 and a bottom section 5160 of central region 5133, and a top section 5164 and a bottom section 5160 of toe region 5112. These six second moment of area regions may have any second moment of area values, without departing from the scope of these disclosures. Additionally, the variation in the second moment of area values of the blade structure 5104 may be more continuous than these six regions, such that there is a continuous variation in the cross-sectional geometry of the blade structure 5104 along the blade length and blade height.

FIGS. 46A to 46F show cross-sections of the example blade structure 5104 from the heel section 5110 of the blade structure 5104 to the toe section 5112. The cross-sections of FIGS. 46B to 46E may approximate an air foil shape. As shown in FIGS. 46A to 46F, top thicknesses 5166a, 5166b, 5166c, 5166d, 5166e, and 5166f of the blade remain substantially constant along the top section 5164 from the heel section 5110 to the toe section 5112. Also, as shown in the cross-sections of FIGS. 46B to 46E, the middle section 5162 thicknesses 5170b, 5170c, 5170d, and 5170e can vary from the heel section 5110 to the toe section 5112 of the blade structure 5104. The top thicknesses 5166b, 5166c, 5166d, and 5166e of the blade can be greater than the middle section 5162 thicknesses 5170b, 5170c, 5170d, and 5170e of the blade. Also as shown in FIGS. 46B to 46E, the thickness of the blade above the slot 5114 can be greater than the remaining portions of the blade underneath the slot 5114. The bottom thicknesses 5168a, 5168b, 5168c, 5168d, 5168e, and 5168f along the bottom section 5160 of the blade structure varies from the heel section 5110 to the toe section 5112. The top thicknesses 5166a, 5166b, 5166c, 5166d, 5166e, and 5166f of the blade are also greater than the bottom thicknesses 5168a, 5168b, 5168c, 5168d, 5168e, and 5168f along the bottom section 5160 of the blade structure. The middle section 5162 thicknesses 5170b, 5170c, 5170d, and 5170e of the blade may also be greater than the bottom thicknesses 5168b, 5168c, 5168d, and 5168e along the bottom section 5160 of the blade structure varies from the heel section 5110 to the toe section 5112.

The variation in thickness from the heel section 5110 to the toe section 5112 can create a plurality of first thicknesses 5166a, 5166b, 5166c, 5166d, 5166e, and 5166f at the top section 5164, a plurality of second thicknesses 5170b, 5170c, 5170d, and 5170e at the middle section 5162, and a plurality of third thicknesses 5168a, 5168b, 5168c, 5168d, 5168e, and 5168f at the bottom section 5160, where the plurality of first thicknesses are greater than the plurality of second thicknesses and the plurality of second thicknesses are greater than the plurality of third thicknesses. This creates an overall tapering effect so the blade structure 5104 tapers from the top section 5164 to the bottom section 5160 and bottom edge 5132. And also as illustrated in FIGS. 46A to 46E, the blade structure 5104 shape varies along the blade length and height between the heel section 5110 and the toe section 5112. The variation or change in the blade structure 5104 shape along the blade length and the blade height and change in a second moment of area of the cross-section along the blade length also varies the stiffness of the blade along the blade structure 5104 length and height. Having a tapered profile may in certain examples create a higher trampoline effect and increase speed of puck of the blade when the player takes a shot.

Figure 47:
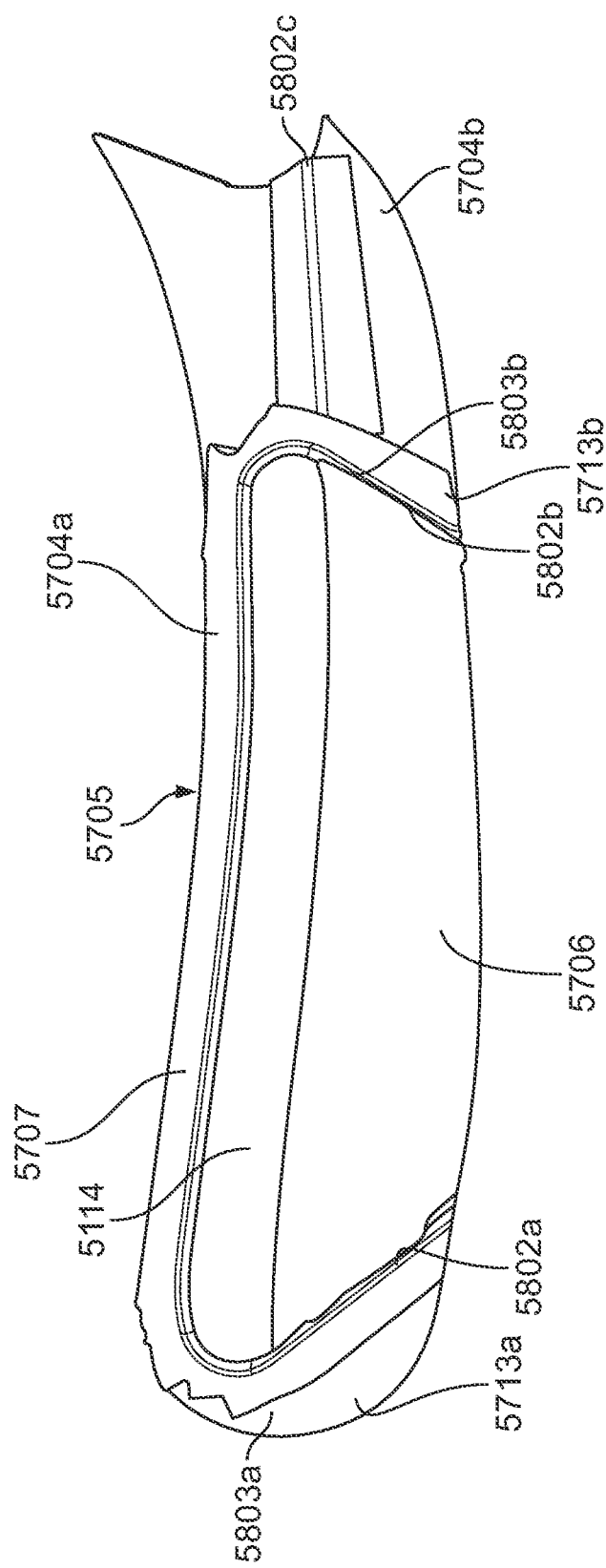
FIG. 47 shows an example core structure of the blade portion of the example hockey stick structure of FIG. 43.

FIG. 47 shows an example core 5705 that can be used in conjunction with the blade structure 5104 described in relation to FIGS. 44-46F. But it is understood that the example core 5705 could be implemented with any of the examples discussed herein. As shown in FIG. 47, the example core 5705 can be formed of three core portions, which in one example can be formed of foam. In the example, the example core 5706 can be formed of core elements 5704a, 5704b, and 5706 that are used in the hockey stick blade structure 5104. As depicted, an upper and toe core portion 5704a, and lower heel foam core portion 5704b are positioned proximate a bottom and middle foam core portion or lower core element 5706. And the geometries of the foam core portions 5704a, 5704b, and 5706 include an aperture for the slot 5114. In this example, the core elements 5704a, 5704b define a frame for receiving the lower core element 5706. In particular, the core elements 5704a, 5704b define a first leg 5713a and a second leg 5713b and the lower core element 5706 may fit in between the first leg 5713a and the second leg 5713b. As is also shown in FIG. 47, the first leg 5713a and at least portions of the second leg 5713b both extend downward at an angle and the first leg 5713a and the second leg 5713b extend toward each other. It is also contemplated that the example core 5705 can be formed of two foam core portions. For example, core elements 5704a, 5704b can be formed of a single core piece. Yet it is also contemplated that the core elements 5704a, 5704b, and 5706 can be formed of a single core element or of more than three separate core elements to form the core 5705.

Figure 48:
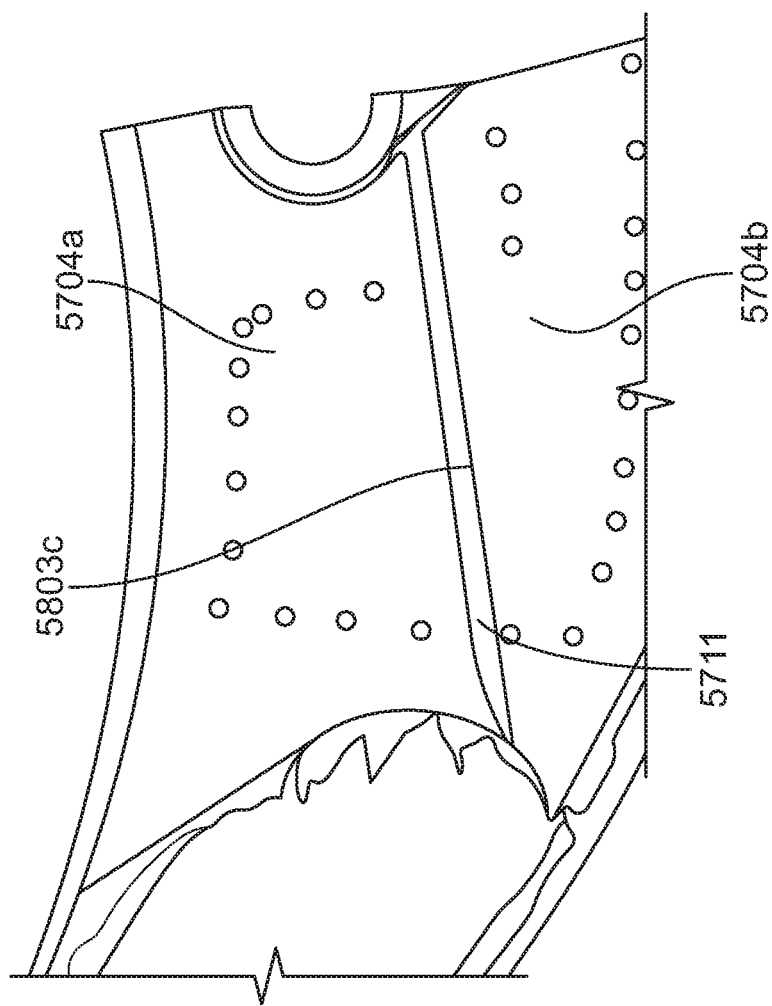
FIG. 48 shows a portion of the example core structure of the blade portion of FIG. 47.

Seams 5802a, 5802b, 5802c represent the intersections of the core portions 5704a, 5704b, 5706 with one another. Like in the above examples, in order to couple the core elements 5704a, 5704b, and 5706, bridges 5803a, 5803b, 5802c may be positioned between the foam core portions 5704a, 5704b, and 5706 along the seams 5802a, 5802b, 5802c, where FIG. 48 shows a cross-sectional view of the heel section of the core of the example blade structure 5104 to further illustrate the optional bridge 5803c. The bridges 5803a, 5803b, 5803c may, in one example, be formed from one or more layers of a fiber-reinforced material that extend between the foam core portions 5704 and 5706. In one example implementation, one or more bridge fiber layers of fiber-reinforced material may be positioned between the foam core portions 5704a, 5704b and 5706 along the core portion 5704a, and one or more bridge fiber layers of fiber-reinforced material are positioned along the seams 5802a, and 5802b. The bridges 5803a, 5803b, 5803c may be optional and can be added in order to increase strength and durability of the blade structure 5104.

Additionally or alternatively, the bridge structures 5803a, 5803b, 5803c may be formed between the foam core portions 5704a, 5704b, and 5706 using an adhesive or an epoxy (including an epoxy strip or epoxy core), among others. Further, the bridge structures may be formed between the foam core portions 5704a, 5704b, and 5706 using one or more materials in addition to or as an alternative to the fiber-reinforced material described above. These additional or alternative materials may include one or more polymers, ceramics, metals or alloys, among others.

Additionally, one or more layers of fiber-reinforced material, such as pre-preg, can be wrapped or partially wrapped around the core elements 5704a, 5704b, and 5706. In this example, pre-preg 5707 can be partially wrapped about the upper core element 5704a. Pre-preg 5707 can comprise one or multiple pieces of pre-preg. Additionally, pre-preg 5709 can be added over seam 5802c in order to help avoid delamination of the core elements 5704a, 5704b and increase strength and stiffness of the core elements 5704a, 5704b in that area. Also subsequently, additional layers of fiber-reinforced material may be added to the foam core portions 5704a, 5704b and 5706. And the resulting pre-mold structure, otherwise referred to as a wrapped preform blade structure, may be molded to form the final geometry of the blade structure 5104. Yet in this example, less or no stiffening layers of fiber-reinforced material may be used, and in this example, layers can be wrapped around a core in order to provide the composite blade a preform before molding. In this example, the blade structure may be compress-molded. And the core will provide some internal pressure on the composite wall during curing. The use of a core may help to form the blade structure because the geometry of the blade changes along the length. And in one example, the shape of the blade structure is provided by a female to female steel mold.

It is contemplated that the foam core portions 5704a, 5704b, and 5706 may be formed of any foam material with any foam density, which can be the same or different throughout the core. In one example, the core portions 5704a, 5704b can both have a lower density and a higher stiffness than the lower core element 5706. And in one particular example the lower core element 5706 can be an epoxy core element. A suitable epoxy core element that may be used in conjunction with the lower core element is shown and described in U.S. Pat. No. 10,513,083, which is incorporated fully herein for all non-limiting purposes. Yet other epoxy cores are also contemplated. And in one example, the core portions 5704a, 5704b can be formed of a PMI foam, PU foam, syntactic foam or any other types of foam of the same density or of different densities. It is contemplated that the core may have single, dual, triple, quadruple, etc. density depending on the desired feel and characteristics of the blade. The core may be provided with different foams with different densities or could use the same density everywhere.

In another example, the blade structure 5104 may be constructed without seams 5802a, 5802b, 5802c and the bridge structures. Alternatively, the blade structure 5104 may be constructed with the seams 5802a, 5802b, 5802c but without a bridge structure. The blade structure 5104 may alternatively include a partially or fully hollow core, such that one or more of the foam core potions 5704a, 5704b, and 5706 are not utilized. Accordingly, the blade structure 5104 may be constructed by wrapping fiber-reinforced material around an inflatable bladder element. As such, the bladder element may be inflated during a molding process to urge the sidewalls of the blade structure 5104 to conform to the geometries of the mold. The bladder may be removed or deflated and left within the molded blade structure 5104 after one or more molding processes have been completed.

Figure 49:
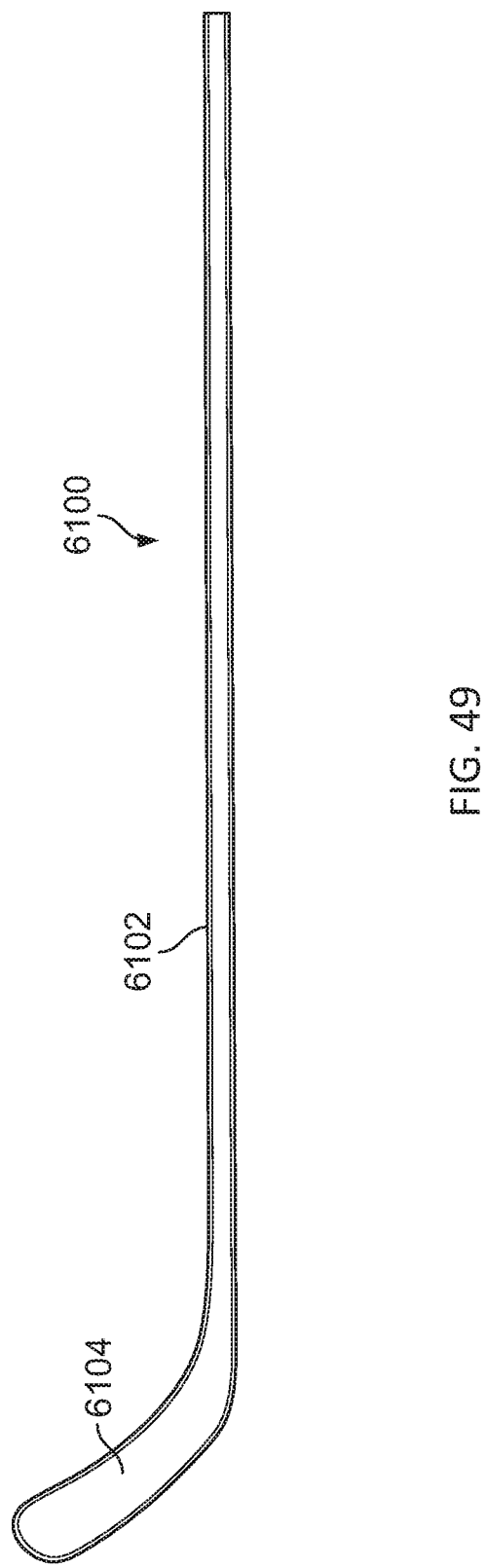
FIG. 49 depicts front side of another example hockey stick structure, according to one or more aspects described herein.

FIG. 49 depicts a front perspective view of another hockey stick structure 6100, according to one or more aspects described herein. The example hockey stick structure is similar to the example discussed in relation to FIGS. 43-48 where similar reference numerals represent similar components with similar functionality and features. Yet in this example, the blade 6104 does not include a slot. Like in the above example, a stiffness of the blade 6104 varies along the blade height by changing the shape of the blade and changing a second moment of area of the cross-section along the blade height. Like in the above examples, the shaft structure 6102 and the blade structure may be formed of the materials and techniques as are discussed herein.

Figure 50A:
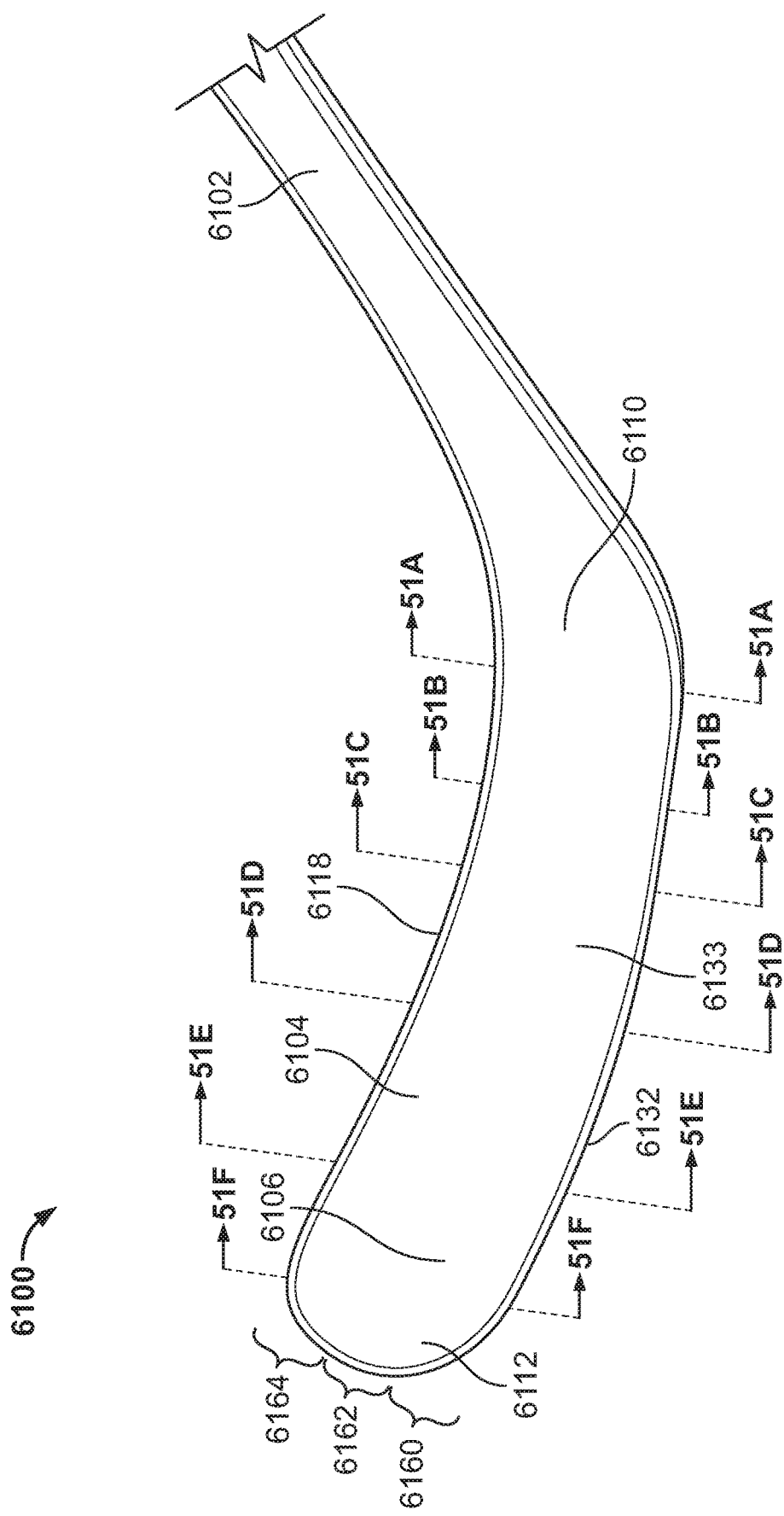
FIG. 50A depicts a more detailed view of a front side of the hockey stick blade structure and a portion of the shaft structure of FIG. 49, according to one or more aspects described herein.
Figure 51B:
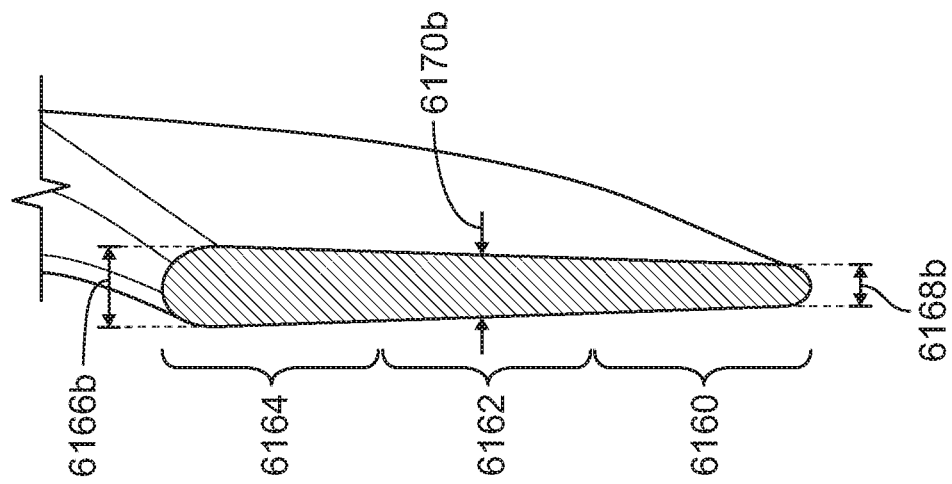
FIGS. 51A-51F show various cross-sections of the example hockey stick structure of FIG. 49.
Figure 51A:
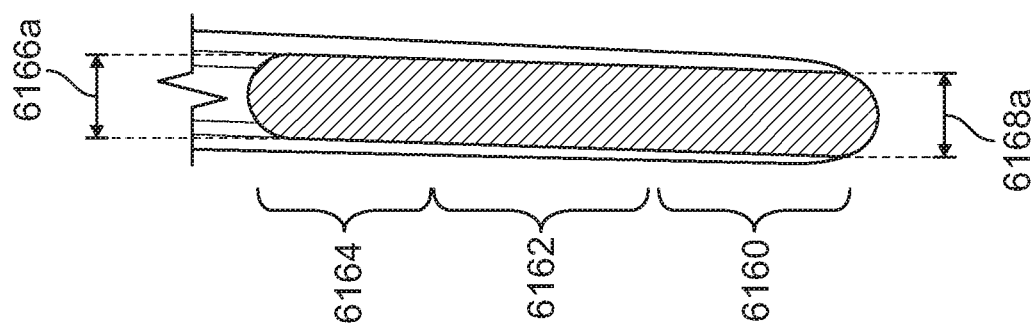
Figure 51D:
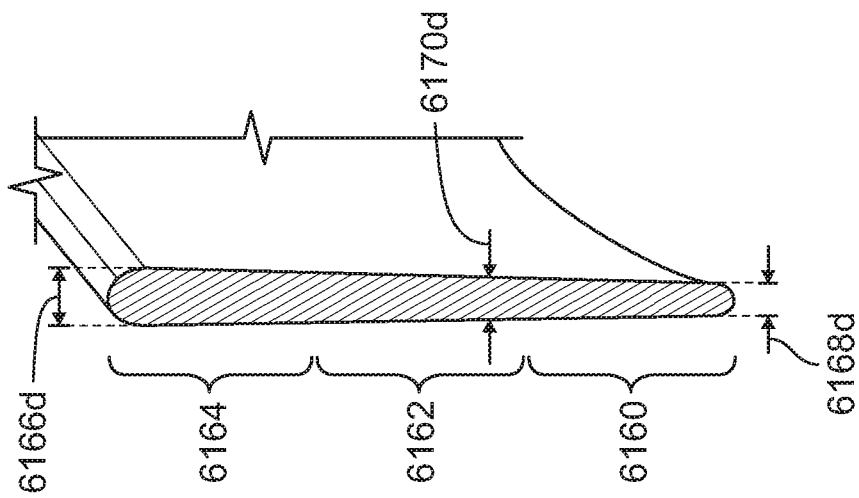
Figure 51C:
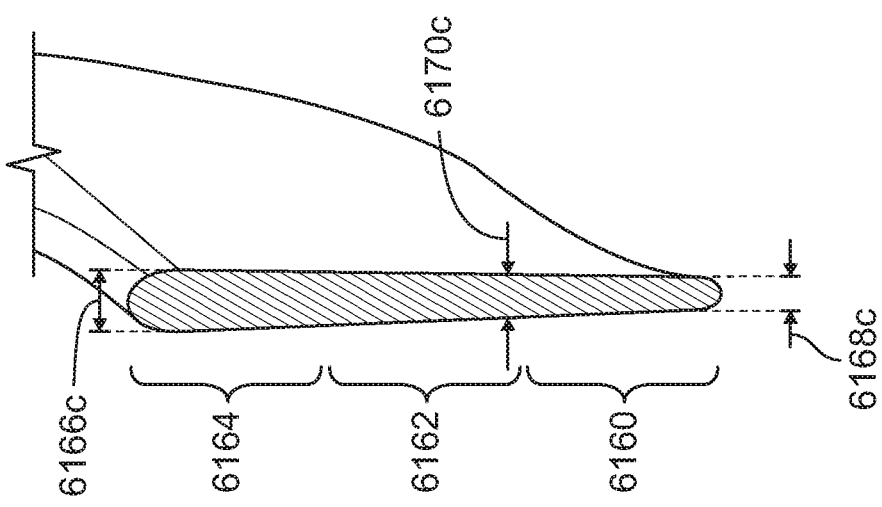
Figure 51F:
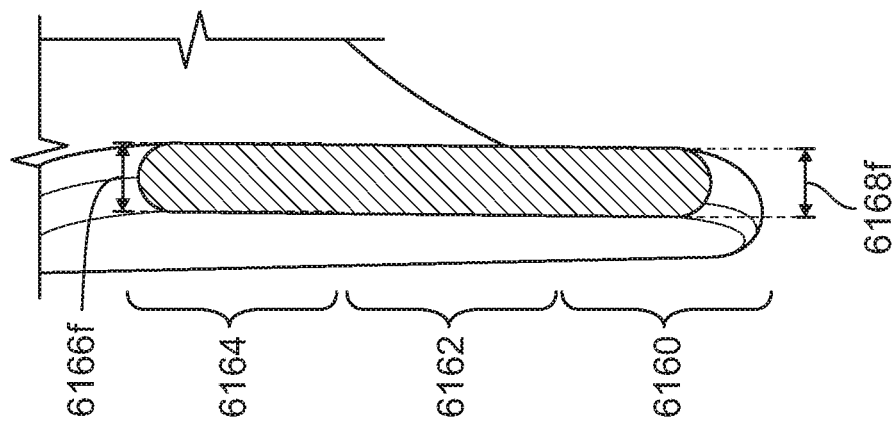
Figure 51E:
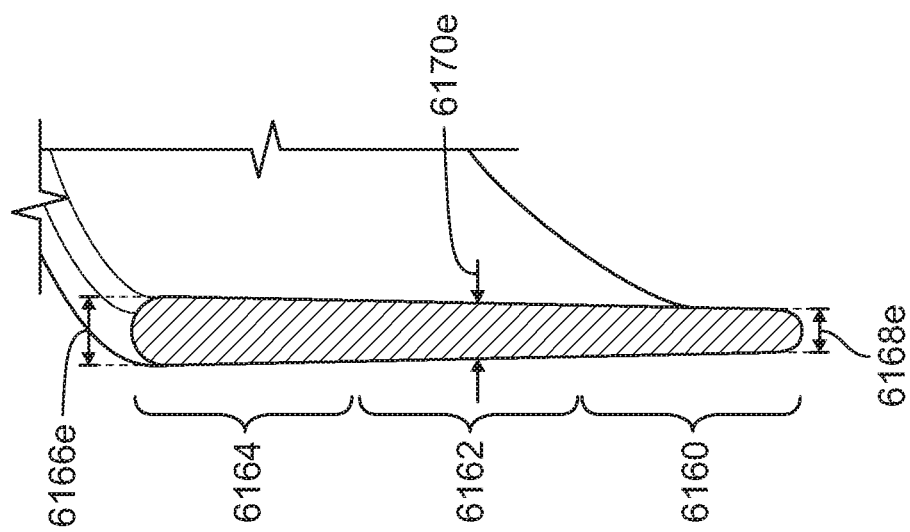

FIG. 50A depicts a more detailed view of a front side of the hockey stick blade structure 6104 and a portion of the shaft structure 6102, according to one or more aspects described herein. Further, FIG. 50B depicts a more detailed view of a back side of the hockey stick blade structure 6104 and a portion of the shaft structure 6102, according to one or more aspects described herein. Like in the above examples, the hockey stick blade structure 6102 can include a top edge 6118 spaced apart from the bottom edge 6132 by a blade height. The blade structure 6104 can include a heel 6110 spaced apart from a toe 6112 by a blade length and a front face 6106 spaced apart from a back face 6108. The blade structure 6104 can also generally include a bottom section 6160, a mid-section 6162, and a top section 6164.

In one example, the toe 6112, otherwise referred to as a toe region 6112, may be spaced apart from the heel 6110, otherwise referred to as a heel region 6110, by a central region 6133 along a length of blade structure 6104. As described in further detail below, FIGS. 51A to 51F depict cross-sections of the example blade structure 6104 from the heel section 6110 of the blade structure 6104 to the toe section 6112. Accordingly, the position of the cross-sections depicted in FIGS. 51A to 51F are denoted by arrows 51A-51A, 51B-51B, 51C-51C, 51D-51D, 51E-51E, 51F-51F in FIG. 51. In one example, a second moment of area of the cross-sectional geometry of the blade structure 6104 may vary along the blade length. In one example, the blade structure 6104 may have a first value of a second moment of area at the heel section 6110 corresponding to cross-sections 51A-51A and 51B-51B, a second value of a second moment of area at a central region 6133 corresponding to one or more of cross-sections 51C-51C and 51D-51D, and a third value of a second moment of area at a toe region 6112 corresponding to one or more of cross-sections 51E-51E and 51F-51F. In one example, the second value of the second moment of area at the central region of the blade structure 6104 may be less than the second moment of area values at the heel region 6110 and toe region 6112. Accordingly, this central region 6133 may have a geometry that is more flexible that the heel region 6110 and toe region 6112. In addition, the second moment of area of the cross-sectional geometry of the blade structure 6104 may vary along the blade height in addition to the blade length. As such, a bottom section 6160 of the central region 6133 may have a second moment of area that is less than a top section 6164 of the central region 6133. As such, the top section 6164 of the central region 6133 may brace against the flexing of the bottom section 6160 of the central region 6133. It is contemplated that the variation of the second moment of area along the blade length and blade height of the blade structure 6104 may have any pattern or values. For example, a second moment of area of the heel region 6110 may be higher than the second moment of area of both the central region 6133 and the toe region 6112. In another example, a second moment of area of the heel region 6110 may be higher than the second moment of area of the central region 6133 and less than a second moment of area of the toe region 6112. Further, the blade structure 6104 may have at least six distinct second moment of area regions corresponding to a top section 6164 and a bottom section 6160 of heel region 6110, a top section 6164 and a bottom section 6160 of central region 6133, and a top section 6164 and a bottom section 6160 of toe region 6112. These six second moment of area regions may have any second moment of area values, without departing from the scope of these disclosures. Additionally, the variation in the second moment of area values of the blade structure 6104 may be more continuous than these six regions, such that there is a continuous variation in the cross-sectional geometry of the blade structure 6104 along the blade length and blade height.

FIGS. 51A to 51F show cross-sections of the example blade structure 6104 from the heel section 6110 of the blade structure 6104 to the toe section 6112. The cross-sections of FIGS. 51B to 51E may approximate an air foil shape. As shown in FIGS. 51A to 51F, top thicknesses 6166a, 6166b, 6166c, 6166d, 6166e, and 6166f of the blade remain substantially constant along the top section 6164 from the heel section 6110 to the toe section 6112. Also, as shown in the cross-sections of FIGS. 51B to 51E, the middle section 6162 thicknesses 6170b, 6170c, 6170d, and 6170e can vary from the heel section 6110 to the toe section 6112 of the blade structure 6104. The top thicknesses 6166b, 6166c, 6166d, and 6166e of the blade can be greater than the middle section 6162 thicknesses 6170b, 6170c, 6170d, and 6170e of the blade. The bottom thicknesses 6168a, 6168b, 6168c, 6168d, 6168e, and 6168f along the bottom section 6160 of the blade structure may also vary from the heel section 6110 to the toe section 6112. The top thicknesses 6166a, 6166b, 6166c, 6166d, 6166e, and 6166f of the blade are also greater than the bottom thicknesses 6168a, 6168b, 6168c, 6168d, 6168e, and 6168f along the bottom section 6160 of the blade structure. The middle section 6162 thicknesses 6170b, 6170c, 6170d, and 6170e of the blade may also be greater than the bottom thicknesses 6168b, 6168c, 6168d, and 6168e along the bottom section 6160 of the blade structure.

The variation in thickness from the heel section 6110 to the toe section 6112 can create a plurality of first thicknesses 6166a, 6166b, 6166c, 6166d, 6166e, and 6166f at the top section 6164, a plurality of second thicknesses 6170b, 6170c, 6170d, and 6170e at the middle section 6162, and a plurality of third thicknesses 6168a, 6168b, 6168c, 6168d, 6168e, and 6168f at the bottom section 6160 where the plurality of first thicknesses are greater than the plurality of second thicknesses and the plurality of second thicknesses are greater than the plurality of third thicknesses. This creates an overall tapering effect so the blade structure 6104 tapers from the top section 6164 to the bottom section 6160 and bottom edge 6132. And also as illustrated in FIGS. 51A to 51E, the blade structure 6104 shape varies along the blade length and height between the heel section 6110 and the toe section 6112. The variation or change in the blade structure 6104 shape along the blade length and the blade height and change in a second moment of area of the cross-section along the blade length also varies the stiffness of the blade along the blade structure 6104 length and height. Having a tapered profile may in certain examples create a higher trampoline effect and increase speed of puck of the blade when the player takes a shot.

Figure 52A:
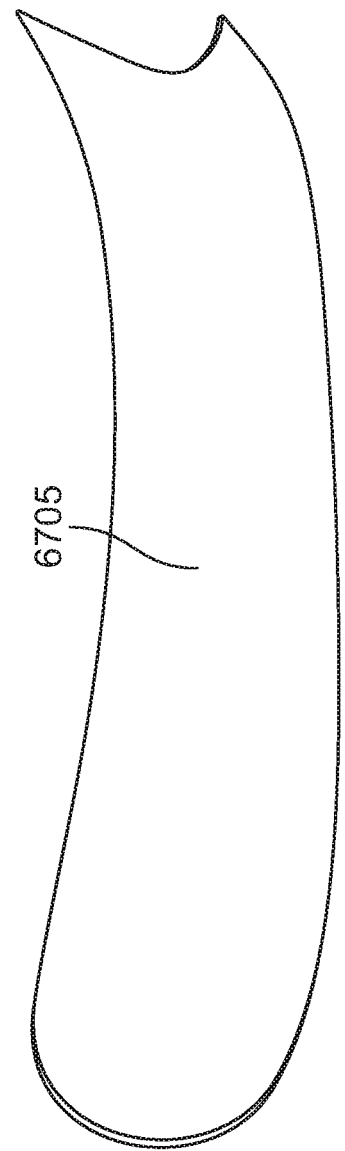
FIGS. 52A-52C show various views of an example core structure of the blade portion of the example hockey stick structure of FIG. 49.
Figure 52B:
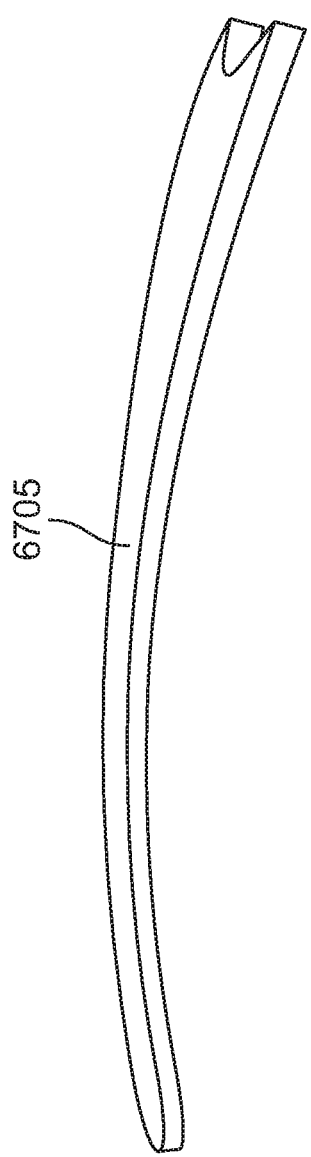
Figure 52C:
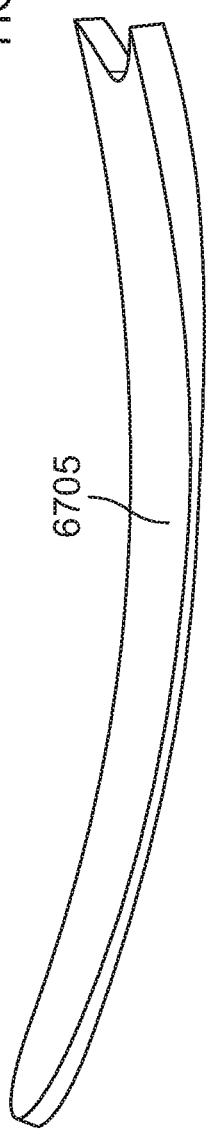

FIGS. 52-54 show an example core 6705 that can be used in conjunction with the blade structure 6104 described in relation to FIGS. 49-51F, where FIG. 52A shows a front view, FIG. 52B shows a top perspective view and FIG. 52C shows a bottom perspective view. But it is understood that the example core 6705 could be implemented with any of the examples discussed herein. As shown in FIGS. 52-54, the example core 6705 can be formed of a single core portion, which in one example can be formed of foam. It is also contemplated that the example core 6705 can be formed of multiple core elements as discussed herein, e.g. two, three, or more core elements and each of these core elements can be formed of differing foams and different density foams.

Like in the above examples, various bridges may be positioned within the foam core 6705. For example, bridges may, in one example, be formed from one or more layers of a fiber-reinforced material that extend between foam core portions or within the foam core itself. Such bridges can be optional and can be added in order to increase strength and durability of the blade structure 6104.

Additionally or alternatively, bridge structures may be formed between the foam core 6705 or foam core portions using an adhesive or an epoxy (including an epoxy strip or epoxy core), among others. Further, the bridge structures may be formed between the foam core or foam core portions using one or more materials in addition to or as an alternative to the fiber-reinforced material described above. These additional or alternative materials may include one or more polymers, ceramics, metals or alloys, among others.

Additionally, one or more layers of fiber-reinforced material, such as pre-preg, can be wrapped or partially wrapped around the foam core 6705 or core elements. Pre-preg can comprise one or multiple pieces of pre-preg. Additionally, pre-preg can be added over any seams in order to help avoid delamination of the core elements and increase strength and stiffness of the core elements in that area. Also subsequently, additional layers of fiber-reinforced material may be added to the foam core portions. And the resulting pre-mold structure, otherwise referred to as a wrapped preform blade structure, may be molded to form the final geometry of the blade structure 6104. Yet in this example, less or no stiffening layers of fiber-reinforced material may be used, and in this example, layers can be wrapped around a core in order to provide the composite blade a preform before molding. In this example, the blade structure may be compress-molded. And the core will provide some internal pressure on the composite wall during curing. The use of a core may help to form the blade structure because the geometry of the blade changes along the length. And in one example, the shape of the blade structure is provided by a female to female steel mold.

It is contemplated that the foam core 6705 or foam core portions may be formed of any foam material with any foam density, which can be the same or different throughout the core. And in one particular example the foam core element 6705 can be an epoxy core element. A suitable epoxy core element that may be used in conjunction with the lower core element is shown and described in U.S. Pat. No. 10,513,083, which is again incorporated fully herein for all non-limiting purposes. Yet other epoxy cores are also contemplated. And in one example, the foam core or core portions can be formed of a PMI foam, PU foam, syntactic foam or any other types of foam of the same density or of different densities. It is contemplated that the core may have single, dual, triple, quadruple, etc. density depending on the desired feel and characteristics of the blade. The core may be provided with different foams with different densities or could use the same density everywhere.

The blade structure 6104 may alternatively include a partially or fully hollow core, such that one or more of the foam core 6705 is not utilized. Accordingly, the blade structure 6104 may be constructed by wrapping fiber-reinforced material around an inflatable bladder element. As such, the bladder element may be inflated during a molding process to urge the sidewalls of the blade structure 6104 to conform to the geometries of the mold. The bladder may be removed or deflated and left within the molded blade structure 6104 after one or more molding processes have been completed.

In certain examples, the various structures described throughout this disclosure may be manufactured using additional or alternative manufacturing techniques. In one implementation, one or more of the structures of the hockey stick structure 100 may be manufactured using one or more resin transfer molding processes. In particular, one or more of the molded structures of the hockey stick structure 100 may be formed by positioning fiber-reinforced material (e.g., fiber braids or woven elements) into a mold, whereby the fiber-reinforced material is referred to as "dry fiber," and has not been preimpregnated with resin or had resin or another bonding agent applied. Subsequently, resin is injected into the tooling to complete the molding processing.

In another example, one or more of the structures of the hockey stick 100 may be manufactured using additive manufacturing processes. In certain examples implementations, these additive manufacturing processes may be referred to as 3-D printing processes. For example, the blade structure 104, or another portion of the hockey stick 100, may be formed using one or more additive manufacturing techniques that facilitate the production of complex internal lattice structures within the blade structure 104, or another portion of the hockey stick structure 100. These additive manufacturing processes may include one or more of the following types of processes, including: VAT polymerization, material jetting, binder jetting, material extrusion, powder fusion, sheet lamination, or directed energy deposition. The various manufacturing processes described throughout this disclosure may additionally be used to form microlattice structures within the hockey stick structure 100, such as with the blade structure 104. These microlattice structures are described in further detail in U.S. Pat. No. 9,925,440, filed 13 May 2014, the entire contents of which are incorporated herein by reference.

It is contemplated that any combination of the various manufacturing processes and techniques described in this disclosure may be used to form any of the blades or shafts discussed herein including the hockey stick structure 100, or portions thereof. In particular, the described manufacturing processes may be utilized to impart variable flexing characteristics on the blade structure 104 by defining the stiffness characteristics of one or more portions of the blade structure (e.g., portions 3120 and 3122, among others). Further, any combination of the described manufacturing processes may be used to produce the bridge structures of the described blade 104. In one specific implementation, a microlattice structure or another structural geometry may be formed as a bridge element within the blade 104, similar to bridge 3902. The structural features (e.g., microlattice structure) formed by the use of, among others, additive manufacturing processes, may allow for the stiffness characteristics of the blade structure 104 to be varied between different portions of the blade 104, and in some cases may allow the stiffness to be increased without an increase in structural mass, when compared to structures formed by alternative processes. Additionally, the use of additive manufacturing may facilitate mass reduction in combination with increased stiffness by forming internal supports scaffolding (lattices) within, for example, the blade 104, that are stiffer and lighter than alternative structures.

A formed hockey stick structure may include a shaft that has a variable cross-sectional geometry. In one aspect, a method of fabricating a formed hockey stick structure that has variable shaft geometry may include forming a shaft structure. The formation of the shaft structure may include wrapping a mandrel with fiber tape to form a wrapped shaft structure, removing the mandrel from the wrapped shaft structure to form an internal shaft cavity, and inserting an inflatable bladder into the shaft cavity. The wrapped shaft structure may be positioned within a mold, and the mold may be heated and the bladder may be expanded within the cavity to exert an internal pressure on the cavity to urge the fiber tape toward the walls of the mold. The mold may be cooled and the bladder contracted and removed. The method of fabricating a formed hockey stick structure may additionally include forming a hockey stick blade structure, and coupling the shaft structure to the blade structure. The walls of the mold may impart an outer geometry on the shaft structure that includes a first portion having a cross-sectional geometry with at least five sides along a length of the shaft structure, and the second portion. The first portion of the shaft structure may have a first bending stiffness that is greater than a second bending stiffness of the second portion, due to the first portion having a greater second moment of inertia than the second portion.

In one example, the first portion of the shaft structure may have a first shaft sidewall thickness and the shaft structure may also include a third portion with a second shaft sidewall thickness, less than the first shaft sidewall thickness.

In one example, the cross-sectional geometry of the first portion of a hockey stick shaft structure with at least five sides includes a flat surface facing a front of the hockey stick, and an apex facing a back of the hockey stick.

In another example, the second portion of the shaft structure may have a rectangular cross-section along the length of the shaft structure.

In one example, the first portion and the second portion of the shaft structure may have approximately a same elastic modulus.

In another example, the first portion and the second portion of the shaft structure may have approximately a same sidewall thickness.

In another example, the first portion may have a heptagonal cross-sectional geometry.

In another example, the hockey stick blade structure may include a slot extending from a front face to a back face along a portion of the length of the hockey stick blade structure.

In one example, the slot may be substantially parallel to a top edge of the hockey stick blade structure.

In another aspect, a shaft structure of a hockey stick may be formed by a method that includes the steps of wrapping a mandrel with fiber tape to form a wrapped shaft structure, and removing the mandrel from the wrapped shaft structure to reveal an internal shaft cavity. An inflatable bladder may be inserted into the internal shaft cavity, and the wrapped shaft structure may be positioned within a mold. The mold may be heated and the bladder expanded within the cavity to urge the fiber tape toward the walls of the mold. The mold may be cooled, the bladder contracted, and the bladder removed from the shaft structure. The walls of the mold may impart an outer geometry on the shaft structure that includes a first portion having a cross-sectional geometry with at least five sides along a length of the shaft structure, and a second portion. The first portion of the shaft structure may have a first bending stiffness that is greater than a second bending stiffness of the second portion, due to the first portion having a greater second moment of inertia than the second portion.

In one example, the first portion of the shaft structure may have a first shaft sidewall thickness and the shaft structure further includes a third portion with a second shaft sidewall thickness, less than the first shaft sidewall thickness.

In one example, the cross-sectional geometry of the first portion of the shaft structure with at least five sides includes a flat surface facing a front of the hockey stick, and an apex facing a back of the hockey stick.

In another example, the second portion of the shaft structure has a rectangular cross-section.

In another example, the first portion and the second portion of the shaft structure may have approximately a same elastic modulus.

In another example, the first portion and the second portion of the shaft structure have approximately a same sidewall thickness.

In one example, the first portion may have a heptagonal cross-sectional geometry.

In another aspect, a hockey stick apparatus may include a hollow shaft structure molded from wrapped fiber tape, with the hollow shaft structure further including a longitudinal length of first portion of which may have a cross-sectional geometry with at least five sides and a first flexural rigidity. A second portion of the longitudinal length of the hollow shaft structure may have a second flexural rigidity less than the first flexural rigidity. A molded blade structure may be rigidly coupled to a proximal end of the hollow shaft structure.

In one example, the first flexural rigidity of the first portion may be higher than the second flexural rigidity due to a higher second moment of area of the cross-sectional geometry of the first portion, and the elastic moduli of the materials of the first portion and the second portion may be approximately the same.

In another example, the first portion and the second portion of the hollow shaft structure may have an approximately same sidewall thickness.

In yet another example, the first portion may have a heptagonal cross-sectional geometry.

In another example, the molded blade structure may include a slot extending from a front face to a back face along a portion of a length of the molded blade structure.

In another example, the slot may be substantially parallel to a top edge of the molded blade structure.

In another aspect, a hockey stick apparatus may include a hollow shaft structure that has a proximal end and a distal end. The hockey stick apparatus may additionally include a molded blade structure that is coupled to the proximal end of the hollow shaft structure. The molded blade structure may additionally include a top edge that is spaced apart from a bottom edge by a blade height, a heel that is spaced apart from a toll by a blade length, a front face that is spaced apart from a back face by a blade thickness, and a slot that defines an aperture that extends through the blade thickness between the front face and the back face. The slot may extend along a portion of the blade length, and the slot may have a top edge, a bottom edge, a toe end and a heel end. The molded blade structure may additionally include a stiffened top portion that extends between the top edge of the blade structure and the top edge of the slot along a portion of the blade length. The molded blade structure may also include a flexible bottom portion that extends between the bottom edge of the blade structure and the bottom edge of the slot along a portion of the blade length. The stiffened top portion may have a first stiffness and the flexible bottom portion may have a second stiffness that is different to the first stiffness. The stiffened top portion may brace against flexing of the flexible bottom portion of the blade structure.

In one example, the stiffened top portion extends along a fold length of the blade.

In another example, the stiffened top portion has a toe portion that extends between the top edge of the blade and the bottom edge of the blade structure at a toe of the blade structure. The stiffened top portion may additionally have a heel portion that extends between the top edge of the blade structure and the bottom edge of the blade structure at the heel of the blade structure.

The molded blade structure may be formed from layers of fiber-reinforced tape, and the flexible bottom portion of the blade structure may include fewer layers than the stiffened top portion of the blade structure.

The top edge, the bottom edge, the toe end, and the heel end of the slot may include an edge reinforcement material.

The top edge of the slot may be substantially parallel to a top edge of the hockey stick blade structure.

The slot may extend along at least 60% of the blade length.

The slot height between the top edge and the bottom edge of the slot may measure at least 10% of the blade height.

The molded blade structure may include a foam core, and the foam core may extend through the flexible bottom portion and the stiffened top portion of the blade structure.

In another aspect, a hockey stick blade may include a top edge spaced apart from a bottom edge by a blade height, a heel spaced apart from a toe by a blade length, a front face spaced apart from a back face by a blade thickness, and a slot that defines an aperture that extends through the blade thickness between the front face and the back face. The slot may extend along a portion of the blade length, and have a top edge, a bottom edge, a toe end and a heel end. A top portion of the blade structure may extend between the top edge of the blade structure and the top edge of the slot along a portion of the blade length. A bottom portion of the blade structure may extend between the bottom edge of the blade structure and the bottom edge of the slot along a portion of the blade length.

The slot may extend along at least 60% of the blade length.

A slot height between the top edge and the bottom edge of the slot may measure at least 10% of the blade height.

The top portion may have a first stiffness and the bottom portion may have a second stiffness, different to the first stiffness, and the top portion may brace against flexing of the bottom portion of the blade structure.

The first and second stiffness values may differ by at least 2%, or at least 1%, or at least 5%, or at least 10%.

The top portion may extend along the full blade length.

In another aspect, a method of fabricating a formed hockey stick blade structure may include forming a pre-mold blade structure by adding layers of fiber tape to a foam core. The pre-mold blade geometry may have a bottom edge spaced apart from a top edge by a blade height, a heel spaced apart from a toe by a blade length, a front face spaced apart from a back face by a blade thickness, and a slot defining an aperture that extends between the front face and the back face through the full blade thickness. The slot may have a top edge, a bottom edge, a toe end and a heel end. The method may additionally include positioning the pre-mold blade structure within a mold, heating and cooling the mold, and removing the formed hockey stick blade structure from the mold.

In another example, a hockey stick apparatus may include a molded blade structure coupled to the proximal end of a hollow shaft structure. The molded blade structure can include: a top edge spaced apart from a bottom edge by a blade height, a heel spaced apart from a toe by a blade length, a front face spaced apart from a back face, and a slot defining an aperture extending through front face and the back face, the slot further extending along a portion of the blade length and having a top edge, a bottom edge, a toe end and a heel end. A stiffness of the blade may vary along the blade height by changing the shape of the blade and changing a quadratic momentum of the cross-section along the blade height.

In certain examples, the blade may include an upper core element and a lower core element, and the upper core element may have a lower density and a higher stiffness than the lower core element. The upper core element can define a frame for receiving the lower core element. And the upper core element may define a first leg and a second leg and the lower core element fits in between the first leg and the second leg. The first leg and the second leg may both extend downward at an angle and at least portions of the first leg and the second leg extend toward each other.

In certain examples, the blade may include a first thickness at the bottom and a second thickness at the top, and the second thickness is greater than the first thickness. The blade can taper from the top portion to the bottom portion at least a portion of the cross section is an air foil shape.

In another example, a hockey stick apparatus can include a molded blade structure coupled to the proximal end of a hollow shaft structure. The molded blade structure may also include a top edge spaced apart from a bottom edge by a blade height, a heel spaced apart from a toe by a blade length, a front face spaced apart from a back face, a top portion defining a first thickness, a middle portion defining a second thickness, and a bottom portion defining a third thickness. In one example, the first thickness is greater than the second thickness and the second thickness is greater than the third thickness. And a stiffness of the blade may vary along the blade length and the blade height by changing the shape of the blade and changing a quadratic momentum of the cross-section along the blade length.

In one example, the blade comprises an upper core element and a lower core element.

The upper core element may have a lower density and a higher stiffness than the lower core element. Also the upper core element may define a frame for receiving the lower core element. The upper core element may also define a first leg and a second leg and the lower core element may fit in between the first leg and the second leg. The first leg and the second leg may both extend downward at an angle and the first leg and the second leg extend toward each other.

In certain examples, the blade may taper from the top portion to the bottom portion.

And in one example, at least a portion of a cross section of the blade may resemble an air foil shape.

In another example, a hockey stick apparatus may include a molded blade structure coupled to the proximal end of a hollow shaft structure. The molded blade structure can include a top edge spaced apart from a bottom edge by a blade height, a heel spaced apart from a toe by a blade length, a front face spaced apart from a back face. A stiffness of the blade can vary along the blade length and the blade height by changing the shape of the blade and changing a quadratic momentum of the cross-section along the blade length. The blade may include a top portion defining a first thickness, a middle portion defining a second thickness, and a bottom portion defining a third thickness. And in one example, the first thickness can be greater than the second thickness and the second thickness can be greater than the third thickness. The blade in one example may include a slot defining an aperture extending through the front face and the back face. The slot may further extend along a portion of the blade length and having a top edge, a bottom edge, a toe end and a heel end. The blade may include an upper core element and a lower core element and the upper core element may have a lower density and a higher stiffness than the lower core element.

In another example, a hockey stick apparatus may include a molded blade structure coupled to the proximal end of a hollow shaft structure. The molded blade structure can include a top edge spaced apart from a bottom edge by a blade height, a Central region space between a heel region and a toe region along a blade length, a front face spaced apart from a back face. A cross-section of the central region may have a second moment of area that is less than a second moment of area of a cross-section of the heel region and a second moment of area of a cross-section of the toe region.

In another example, a stiffness of the central region may be less than a stiffness of the heel region and a stiffness of the toe region.

The hockey stick apparatus may include a slot that defines an aperture that extends through the front face and the back face, with the slot further extending along a portion of the blade length and having a top edge, bottom edge, a toe end, and a heel end.

The portion of the central region above the top edge of the slot may have a second moment of area that is greater than a portion of the central region below the slot.

In another example, a portion of the central region above the slot has a material stiffness that is greater than a material stiffness of a portion of the central region that is below the slot.

In another example, a portion of the central region above the slot has a geometrical resistance to bending that is greater than a geometrical resistance to bending of a portion of the central region that is below the slot.

A stiffness of the blade can vary along the blade length and the blade height by changing the shape of the blade and changing a quadratic momentum of the cross-section along the blade length. The blade may include a top portion defining a first thickness, a middle portion defining a second thickness, and a bottom portion defining a third thickness. And in one example, the first thickness can be greater than the second thickness and the second thickness can be greater than the third thickness. The blade in one example may include a slot defining an aperture extending through the front face and the back face. The slot may further extend along a portion of the blade length and having a top edge, a bottom edge, a toe end and a heel end. The blade may include an upper core element and a lower core element and the upper core element may have a lower density and a higher stiffness than the lower core element.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

We claim:

1. A hockey stick apparatus, comprising:
   a hollow shaft structure comprising a proximal end and a distal end;
   a molded blade structure coupled to the proximal end of the hollow shaft structure, the molded blade structure further comprising:
   a top edge spaced apart from a bottom edge by a blade height;
   a heel spaced apart from a toe by a blade length;
   a front face spaced apart from a back face;
   a slot defining an aperture extending through the front face and the back face, wherein the slot comprises an edge reinforcing material extending around an interior perimeter of the slot, wherein a first side proximate the molded blade structure and a second side wherein the second side is opposite the first side and proximate the aperture comprise the edge reinforcing material, the slot further extending along a portion of the blade length and having a top edge, a bottom edge, a toe end and a heel end, wherein a bottom edge of the slot is positioned closer to the top edge of the molded blade structure than the bottom edge of the molded blade structure;

an upper core element separated from a lower core element by a bridge, the bridge further comprising:

a top bridge layer and a bottom bridge layer of fiber-reinforced material, wherein the top bridge layer is spaced apart from the bottom bridge layer to form the slot, and wherein the top bridge layer abuts the bottom bridge layer at a seam that extends backward from a center of the heel end of the slot and extends forward from a center of the toe end of the slot.

2. The hockey stick apparatus of claim 1, wherein the upper core element has a lower density and a higher stiffness than the lower core element.

3. The hockey stick apparatus of claim 1 wherein the molded blade structure has a first thickness at the bottom edge and a second thickness at the top edge and wherein the second thickness is greater than the first thickness.

4. The hockey stick apparatus of claim 1 wherein the molded blade structure tapers from the top edge to the bottom edge.

5. The hockey stick apparatus of claim 1 wherein at least a portion of a cross section of the molded blade structure has an air foil shape.

6. A hockey stick apparatus, comprising:
a shaft structure comprising a proximal end and a distal end;
a molded blade structure coupled to the proximal end of the shaft structure, the molded blade structure further comprising:
a top edge spaced apart from a bottom edge by a blade height;
a heel spaced apart from a toe by a blade length;
a front face spaced apart from a back face;
a slot defining an aperture extending through the front face and the back face, wherein the slot comprises an edge reinforcing material extending around an interior perimeter of the slot, wherein a first side proximate the molded blade structure and a second side wherein the second side is opposite the first side and proximate the aperture comprise the edge reinforcing material, the slot further extending along a portion of the blade length and having a top edge, a bottom edge, a toe end and a heel end, wherein a bottom edge of the slot is positioned closer to the top edge of the molded blade structure than the bottom edge of the molded blade structure;
a top portion defining a first thickness, a middle portion defining a second thickness, and a bottom portion defining a third thickness; and
an upper core element and a lower core element, wherein the upper core element defines a first leg and a second leg and the lower core element fits in between the first leg and the second leg, wherein the lower core element is separated from the toe by the first leg and from the heel by the second leg, wherein the first leg and the second leg both extend downward from an upper half to a lower half of a total blade height, and toward each other, such that a top of the first leg is spaced apart from a top of the second leg by a first distance, and a bottom of the first leg is spaced apart from a bottom of the second leg by a second distance, wherein the second distance is less than the first distance,
wherein the first thickness is greater than the second thickness and the second thickness is greater than the third thickness.

7. The hockey stick apparatus of claim 6, wherein the molded blade structure has multiple different stiffness values at multiple respective points along the blade length and the blade height as a result of a non-uniform shape of the molded blade structure and as a result of multiple different second moment of area values along the blade length.

8. The hockey stick apparatus of claim 6, wherein the upper core element has a lower density and a higher stiffness than the lower core element.

9. The hockey stick apparatus of claim 6 wherein the molded blade structure tapers from the top portion to the bottom portion.

10. The hockey stick apparatus of claim 6 wherein at least a portion of a cross section of the molded blade structure has an air foil shape.

11. The hockey stick apparatus of claim 6, wherein the upper core element defines a frame for receiving the lower core element.

12. A hockey stick apparatus, comprising:
a molded blade structure coupled to an end of a shaft structure, the molded blade structure further comprising:
a top edge spaced apart from a bottom edge by a blade height;
a heel spaced apart from a toe by a blade length;
a front face spaced apart from a back face;
a slot defining an aperture extending through the front face and the back face, wherein the slot comprises an edge reinforcing material extending around an interior perimeter of the slot wherein a first side proximate the molded blade structure and a second side wherein the second side is opposite the first side and proximate the aperture comprise the edge reinforcing material, the slot further extending along a portion of the blade length and having a top edge, a bottom edge, a toe end and a heel end, wherein a bottom edge of the slot is positioned closer to the top edge of the molded blade structure than the bottom edge of the molded blade structure; and
an upper core element and a lower core element, wherein the upper core element defines a first leg and a second leg, wherein the first leg and the second leg both extend downward from an upper half to a lower half of a total blade height and toward each other, wherein the lower core element is separated from the toe by the first leg and from the heel by the second leg,
wherein the molded blade structure has multiple different stiffness values at multiple respective points along the blade length and the blade height as a result of a non-uniform shape of the molded blade structure and as a result of multiple different second moment of area values along the blade length.

13. The hockey stick apparatus of claim 12, further comprising a top portion defining a first thickness, a middle portion defining a second thickness, and a bottom portion defining a third thickness; wherein the first thickness is greater than the second thickness and the second thickness is greater than the third thickness.

14. The hockey stick apparatus of claim 12, wherein the slot further extends along a portion of the blade length and having a top edge, a bottom edge, a toe end and a heel end.

15. The hockey stick apparatus of claim 12, wherein the molded blade structure comprises an upper core element and a lower core element and wherein the upper core element has a lower density and a higher stiffness than the lower core element.

16. A hockey stick apparatus, comprising:
- a molded blade structure coupled to an end of a hollow shaft structure, the molded blade structure further comprising:
  - a top edge spaced apart from a bottom edge by a blade height;
  - a central region spaced between a heel region and a toe region along a blade length;
  - a front face spaced apart from a back face;
  - a slot defining an aperture extending through the front face and the back face, wherein the slot comprises an edge reinforcing material extending around an interior perimeter of the slot, wherein a first side proximate the molded blade structure and a second side wherein the second side is opposite the first side and proximate the aperture comprise the edge reinforcing material, the slot further extending along a portion of the blade length and having a top edge, a bottom edge, a toe end and a heel end, wherein a bottom edge of the slot is positioned closer to the top edge of the molded blade structure than the bottom edge of the molded blade structure; and
  - an upper core element and a lower core element, wherein the upper core element defines a first leg and a second leg, wherein the first leg and the second leg both extend downward from an upper half to a lower half of a total blade height and toward each other, and the lower core element fits in between the first leg and the second leg, wherein the lower core element is separated from the toe by the first leg and from the heel by the second leg,
  - wherein a cross section of the central region has a second moment of area that is less than both of a second moment of area of a cross section of the heel region and a second moment of area of a cross section of the toe region.

17. The hockey stick apparatus of claim 16, wherein a stiffness of the central region is less than a stiffness of the heel region and a stiffness of the toe region.

18. The hockey stick apparatus of claim 16, wherein the slot further extends along a portion of the blade length and having a top edge, a bottom edge, a toe end and a heel end.

19. The hockey stick apparatus of claim 18, wherein a portion of the central region above the top edge of the slot has a second moment of area that is greater than a portion of the central region below the slot.

20. The hockey stick apparatus of claim 18, wherein a portion of the central region above the slot has a material stiffness that is greater than a material stiffness of a portion of the central region that is below the slot.

* * * * *